(12) United States Patent
Regan

(10) Patent No.: US 7,234,103 B1
(45) Date of Patent: Jun. 19, 2007

(54) NETWORK-BASED TAX FRAMEWORK DATABASE

(75) Inventor: David Regan, Blackrock (IE)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/559,204

(22) Filed: Apr. 26, 2000

(51) Int. Cl.
*G06F 17/00* (2006.01)
(52) U.S. Cl. ............ 715/500; 705/19; 705/31; 715/505; 715/506; 715/507
(58) Field of Classification Search .......... 705/31, 705/19, 39; 707/10, 200; 715/506, 501.1, 715/505, 507, 508, 500
See application file for complete search history.

(56) References Cited

U.S. PATENT DOCUMENTS

| | | |
|---|---|---|
| 4,837,798 A | 6/1989 | Cohen et al. |
| 4,890,228 A | 12/1989 | Longfield |
| 4,949,278 A | 8/1990 | Davies et al. |
| 4,989,141 A | 1/1991 | Lyons et al. |
| 5,138,549 A | 8/1992 | Bern |
| 5,193,057 A | 3/1993 | Longfield |
| 5,335,169 A | 8/1994 | Chong |
| 5,509,071 A | 4/1996 | Petrie et al. |
| 5,535,322 A | 7/1996 | Hecht |
| 5,548,753 A | 8/1996 | Linstead et al. |
| 5,590,197 A | 12/1996 | Chen et al. |
| 5,644,724 A | 7/1997 | Cretzler |
| 5,724,523 A | 3/1998 | Longfield |
| 5,739,512 A | 4/1998 | Tognazzini |
| 5,799,283 A | 8/1998 | Francisco et al. |
| 5,819,249 A | 10/1998 | Dohanich et al. |
| 5,852,722 A | 12/1998 | Hamilton |
| 5,875,433 A | 2/1999 | Francisco et al. |
| 5,892,900 A | 4/1999 | Ginter |
| 5,903,651 A | 5/1999 | Kocher |
| 5,911,776 A | 6/1999 | Guck |
| 5,915,022 A | 6/1999 | Robinson et al. |
| 5,920,848 A | 7/1999 | Schutzer et al. |
| 5,924,094 A * | 7/1999 | Sutter .................. 707/10 |
| 5,963,921 A | 10/1999 | Longfield |
| 5,970,501 A * | 10/1999 | Hunkins et al. ............ 707/200 |
| 5,978,799 A | 11/1999 | Hirsch |

(Continued)

FOREIGN PATENT DOCUMENTS

WO    WO99/06931    2/1999

(Continued)

OTHER PUBLICATIONS

Intuit,"TurboTax User's Guide, Version 95.0, Tax Year 1995", 1995 Intuit, pp. 13-15, 70-79.*

(Continued)

*Primary Examiner*—William Bashore
*Assistant Examiner*—James Blackwell
(74) *Attorney, Agent, or Firm*—Oppenheimer Wolff & Donnelly LLP

(57) ABSTRACT

The present disclosure provides for affording a network-based tax service database interface. First, tax-related forms are first retrieved in a database. Next, the retrieved tax-related forms are formatted, and the formatted tax-related forms are sent to a governmental entity. Such formatting is based on rules associated with the governmental entity.

15 Claims, 42 Drawing Sheets

U.S. PATENT DOCUMENTS

| | | | |
|---|---|---|---|
| 6,016,479 A | 1/2000 | Taricani, Jr. | |
| 6,035,398 A | 3/2000 | Bjorn | |
| 6,041,313 A | 3/2000 | Gilbert | |
| 6,044,462 A | 3/2000 | Zubeldia et al. | |
| 6,047,264 A | 4/2000 | Fisher et al. | |
| 6,061,570 A | 5/2000 | Janow | |
| 6,064,983 A | 5/2000 | Koehler | |
| 6,081,610 A | 6/2000 | Dwork | |
| 6,112,305 A | 8/2000 | Dancs et al. | |
| 6,137,865 A | 10/2000 | Ripy et al. | |
| 6,169,979 B1 | 1/2001 | Johnson | |
| 6,185,683 B1 | 2/2001 | Ginter | |
| 6,202,052 B1 * | 3/2001 | Miller | 705/31 |
| 6,223,168 B1 | 4/2001 | McGurl et al. | |
| 6,223,291 B1 | 4/2001 | Puhl et al. | |
| 6,285,991 B1 | 9/2001 | Powar | |
| 6,292,811 B1 | 9/2001 | Clancey et al. | |
| 6,321,339 B1 | 11/2001 | French et al. | |
| 6,327,576 B1 | 12/2001 | Ogasawara | |
| 6,341,353 B1 | 1/2002 | Herman et al. | |
| 6,347,304 B1 | 2/2002 | Taricani, Jr. | |
| 6,353,608 B1 | 3/2002 | Cullers et al. | |
| 6,360,208 B1 | 3/2002 | Ohanian et al. | |
| 6,442,689 B1 | 8/2002 | Kocher | |
| 6,473,741 B1 | 10/2002 | Baker | |
| 6,510,513 B1 | 1/2003 | Danieli | |
| 6,526,581 B1 | 2/2003 | Edson | |
| 6,553,108 B1 | 4/2003 | Felger | |
| 6,567,789 B1 | 5/2003 | Baker | |
| 6,571,221 B1 | 5/2003 | Stewart | |
| 6,584,096 B1 | 6/2003 | Allan | |
| 6,609,114 B1 | 8/2003 | Gressel et al. | |
| 6,618,764 B1 | 9/2003 | Shteyn | |
| 6,658,474 B2 | 12/2003 | Kang | |
| 6,735,619 B1 | 5/2004 | Sawada | |
| 6,778,646 B1 | 8/2004 | Sun | |
| 6,785,720 B1 | 8/2004 | Seong | |
| 6,829,333 B1 | 12/2004 | Frazier | |

2002/0013747 A1    1/2002   Valentine et al.

FOREIGN PATENT DOCUMENTS

WO        WO99/40528        8/1999

OTHER PUBLICATIONS

In Certificates We Trust, web page, Mar. 1998.
Intuit Press Release, "Intuit Launches E-Tax Season with Quicken TurboTax for the Web", Jan. 2000.
Intuit Press Release, Turbotax State Offers Help with New State Tax Law Changes and Electronic Filing in 30 States, Jan. 1999.
Intuit Press Release, "TurboTax Streamlines Tax Preparation with Customized Interview for the 1998 Tax Year", Dec. 1998.
Intuit Press Release, "WebTurbo Tax Brings the Full Power of TurboTax to the Web", Jan. 1999.
Digital Certificates & Encryption, web page Oct. 1999.
*Dayco* Statement Regarding Related Applications.
Arar, Yardenam, TaxCut Turbo Tax Offer More; Microsoft's Tax Saver Falls Short. (Software Review) (Evaluation) PC World v18, n2, p. 66, Feb. 2000, ISSN: 0737-8939.
Prime Financial New Year's Resolutions: Hire a Good Financial Planner, Stick to a Good Investment Strategy. PR Newswire, p. 9442, Dec. 15, 1998.
Rankin, Robert A., IRS Gets in Holiday Spirit, Delays Tax Forms—San Jose Mercury Mews (SJ), Mercury News Washington Bureau, Edition: Morning Final, Section: Business Page: 1F, Wednesday Dec. 26, 1990.
User's guide for TurboTax and TurboTax Deluxe, Dec. 1998.
"Internal Revenue Service Selects VeriSign to Secure Electronic Tax Filing", PR Newswire, Sep. 8, 1998, p. 1.
The United States, Internal Revenue Bulletin Rec. Proc. 98-51, Sep. 21, 1998; 1998-38.
The United States, Internal Revenue Bulletin Announcement 99-79, Aug. 2, 1999, 1999-31.
"Web TurboTax Brings The Full Power of TurboTax to the Web", Press Release, Jan. 20, 1999.

* cited by examiner

NETWORK-BASED TAX FRAMEWORK DATABASE

FIELD OF THE INVENTION

The present invention relates to computer software and more particularly to tax-related software.

BACKGROUND OF THE INVENTION

The preparation of individual state and federal income tax returns is an annual occurrence of great importance to the individual taxpayer as well as to the federal government and the various state governments. Each year, millions of taxpayers meet with a tax return preparer for the purpose of providing relevant tax information needed in the preparation of the tax return. For convenience, this tax information is frequently provided to the tax preparer by mail or other form of delivery. When this occurs, the tax preparer typically first asks for and receives a copy of the individual's tax return for the previous year. This permits the tax preparer to solicit the relevant tax information for the current year in a form using a format specifically designed for the individual taxpayer.

In recent years, taxing authorities have increasingly automated the tax collecting and tax return filing process. In particular, the United States Internal Revenue Service (IRS) has instituted a system for the electronic filing of tax return data. In conjunction with that system, the IRS has arranged to pay refunds by electronic funds transfer using the United States' Treasury automated clearing house (ACH) origination system. While this has greatly improved the tax filing and refund process it still requires a period of three to six weeks from the filing of an individual's tax return to the time of receipt of a refund check. In contrast, the system of the invention shortens the time from filing to receipt of a refund to as little as one day. There is still a growing need, however, for a more comprehensive on-line system that facilitates the tax-filing process.

SUMMARY OF THE INVENTION

The present disclosure provides for affording a network-based tax service database interface. First, tax-related forms are first retrieved in a database. Next, the retrieved tax-related forms are formatted, and the formatted tax-related forms are sent to a governmental entity. Such formatting is based on rules associated with the governmental entity.

In one aspect of the present invention, updates to the tax-related forms may be received, wherein the updates are stored in the database. The retrieved tax-related forms may also be sent to a processor utilizing a network for processing. Such processed tax-related forms may then be received utilizing the network for storage in the database.

BRIEF DESCRIPTION OF THE DRAWINGS

The invention may be better understood when consideration is given to the following detailed description thereof. Such description makes reference to the annexed drawings wherein:

FIG. 22 shows an initial display of the VAT3 return page, with the information automatically completed by the ROS system;

FIG. 35 illustrates a Form FR-800M for sales tax reporting services in the United States;

FIG. 36 is an illustration of the Washington D.C. Individual Income Tax Form D-40;

FIG. 37 is an illustration of the Washington D.C. Individual Income Tax Form D-2D;

DETAILED DESCRIPTION OF THE PREFERRED EMBODIMENTS

Figure 1:
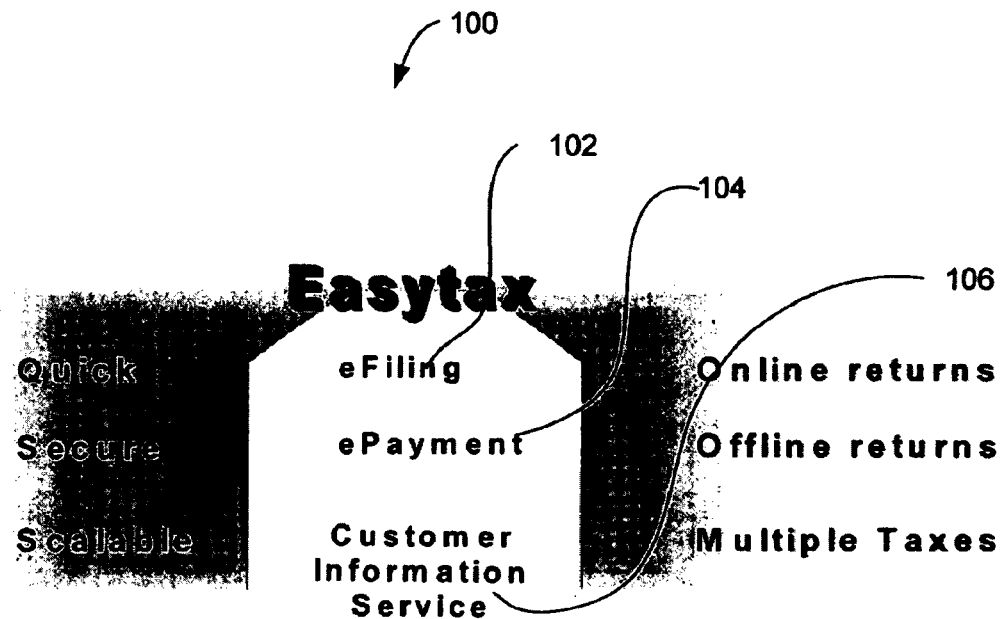
FIG. 1 illustrates an overall conceptual diagram showing the various services provided by the present invention.

FIG. 1 illustrates an overall conceptual diagram showing the various services 100 provided by the present invention. As shown, the present invention provides a comprehensive solution for Revenue Agencies planning to go online. It should be noted that, in the present description, Revenue Agencies may refer to any private and/or public collection agencies including, but not limited to the IRS, Revenue (Irish tax collection establishment), etc. Further, it should be understood that the present invention is a network-based solution, thus offering Revenue On-line Services (ROS). As shown in FIG. 1, the present invention includes:

eFiling of Returns 102 ePayments (by direct debit) 104 a comprehensive customer information system 106

This solution draws on a wide experience of both integrated taxation processing and eCommerce type solutions. Key advantages of the solution are as follows:

Speed. The system has been specifically designed to enable Revenue Agencies to go online at "eSpeed". The interfaces required to legacy systems are minimal. The system only requires key registration data from the taxes to be supported.

Secure. This solution is fully secure. Access to this solution is via digital certificates. Messages are fully encrypted and secured. Customers can trust the solution. The database of the present invention is separate and distinct from the core tax processing databases.

Open. The solution can be supported by any browser that supports digital certificates (e.g. Netscape Communicator 4.0 and beyond, Internet Explorer version 4.0 and beyond). The system itself is built using platform independent components. This solution may be based on either a Unix or NT environment.

Adaptable. The entire technical architecture has been designed to enable the solution to adopt new technology as internet technology evolves. The online solution makes use of leading edge technology in the form of Java Server Pages, Enterprise Java Beans and Digital Signature Applets written in Java.

Scalable. The solution of the present invention is designed with scalability in mind. The application server that was chosen is an industrial strength application server for high volume transaction processing websites.

The present invention is a comprehensive solution for Revenue Agencies who want to provide services on-line to their customers. The present invention is essentially a pre-built solution which includes:

Electronic filing of tax returns for multiple taxes

Electronic payment of tax liabilities (by direct debit)

A comprehensive customer information system for citizens, businesses and their agents on the status of their tax affairs with Revenue.

The entire environment is secure. Access to the site is via digital certificate and password. A full audit trail is retained of all transactions on the system.

Key functionality of the solution is:

System
  Online Help and Tutorials
  Error-handling
  Menu-driven system.
eFiling of Tax Returns
  Customers or agents may work both online and offline
  The user is only presented with the tax returns that s/he is registered to file with the Revenue Agency
  More complex returns can be downloaded to the users' PC and completed offline
  Agents can complete multiple forms offline and then submit all of these returns in one batch upload
  The site supports customers with multiple registrations for a single tax
  Offers the customer the facility to file a supplementary and amended return for periods in which they have already filed
  Users can print and/or save returns and statements.
ePayments (by Direct Debit)
  Those who have direct debits set up with the Revenue Agency can file and pay tax returns
  Users can submit payments in one easy and secure step.
Customer Information Service
  The present invention supports Revenue authorities wishing to issue correspondence to customers electronically The user may access a copy of the returns submitted to the Revenue Agency Users can submit a request for a Statement of Account Multiple documents and document types are supported.

Figure 1A:
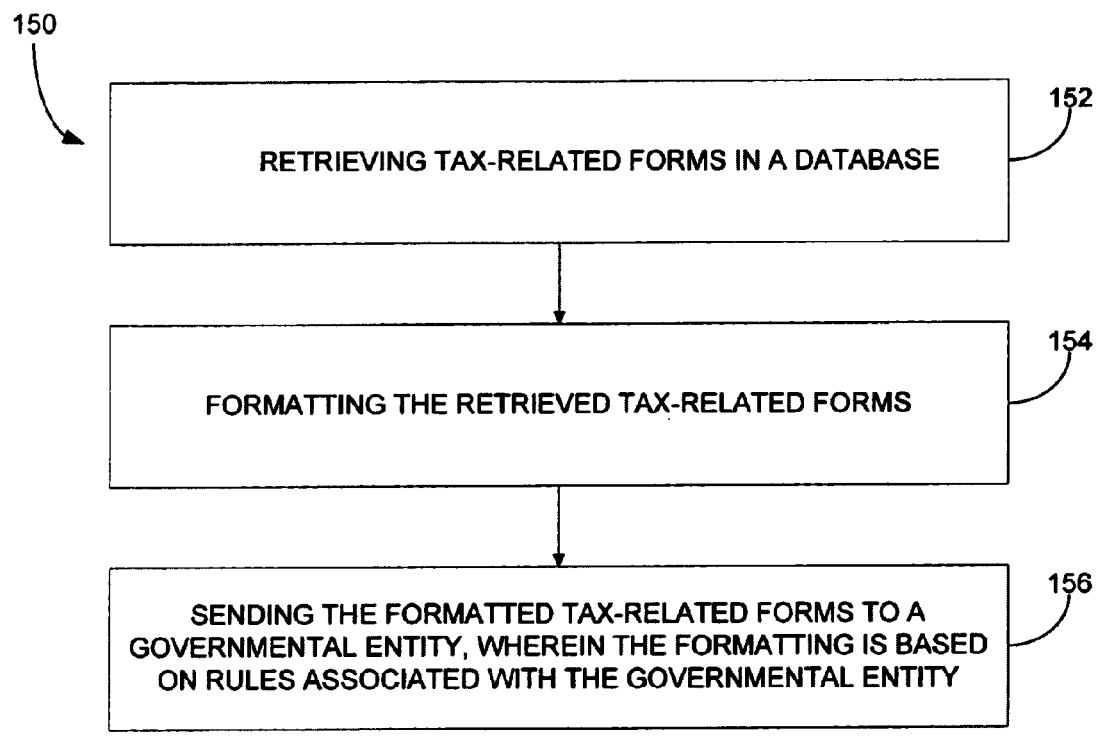
FIG. 1A is a flowchart illustrating a method for affording a network-based tax service database interface in accordance with one embodiment of the present invention.

FIG. 1A is a flowchart illustrating a method 150 for affording a network-based tax service database interface in accordance with one embodiment of the present invention. First, in operation 152, tax-related forms are first retrieved in a database. Next, in operation 154, the retrieved tax-related forms are formatted, and the formatted tax-related forms are sent to a governmental entity. Note operation 156. Such formatting is based on rules associated with the governmental entity.

Figure 2:
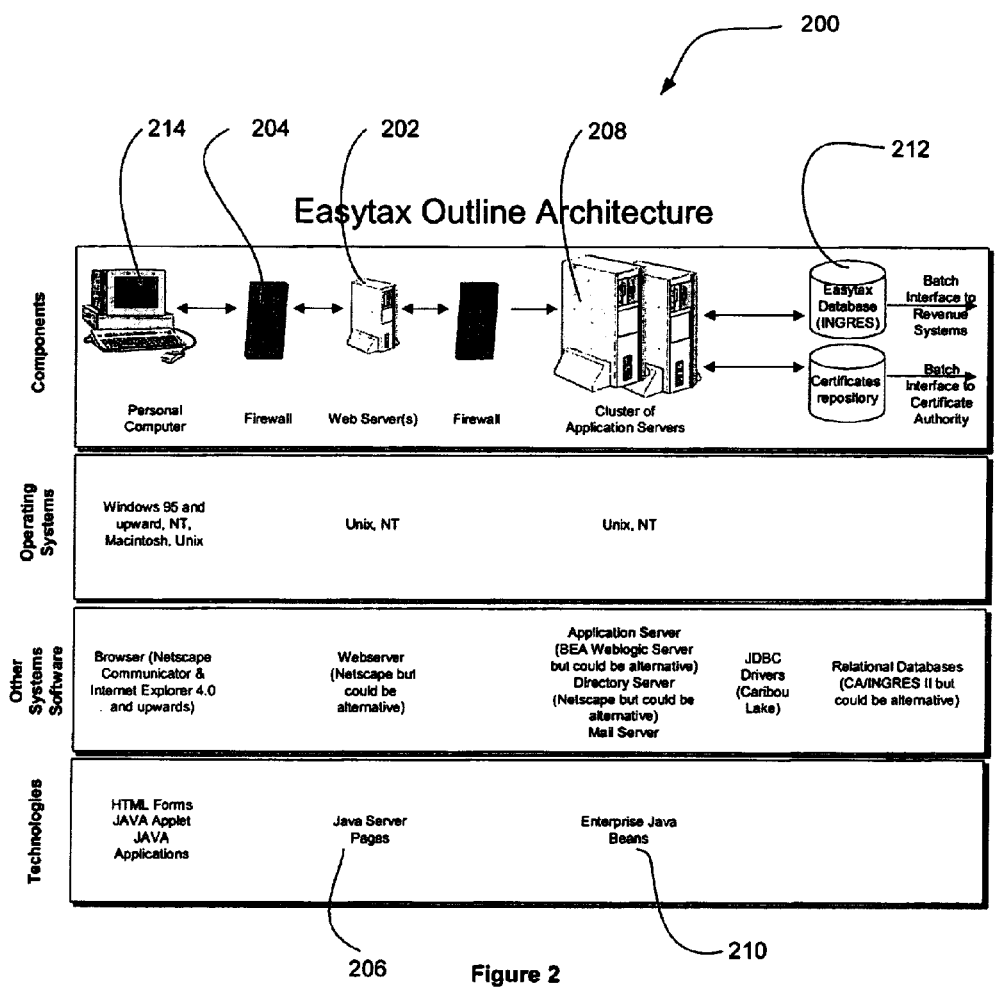
FIG. 2 illustrates a schematic diagram of an exemplary system architecture adapted for implementing the present invention.

FIG. 2 illustrates a schematic diagram of an exemplary system architecture 200 adapted for implementing the present invention. The present invention has been developed to be accessible from a broad range of technical platforms at the client level. The system itself can run on either Unix or NT.

Pages are displayed on the client machine using HTML. The use of this well proven technology minimizes the potential customer support overhead for the online system. In addition, Adobe Acrobat Reader is used to view documents in the .pdf format received from existing Revenue processing systems. No plug-ins are required to use the present invention.

The present invention offers customers the facility to complete returns offline. The offline applications are written in Java to allow for platform independence. A custom security function has been developed to secure transmission of the data via a Java applet to the backend server of the present invention. Each file being uploaded from the Java applet is digitally signed. Currently a Baltimore toolkit, J-PKI PLUS, is used to attach the digital signature. This feature ensures the security of returns whether they are entered online or offline. The technical architecture of the present invention has been designed to enable the solution to evolve as Internet technology evolves.

The main components of the Server architecture are:
Web Server 202
Firewall 204
Java Server Pages 206
Application Server 208
Enterprise Java Beans (EJBs) 210
Database 212
Personal Computer 214

The present invention has been built using Java technology. This enables the server to be deployed on many different platforms. The application code of the present invention has been developed using HTML, Java Server Pages (JSPs) and Enterprise Java Beans (EJBs) running on BEA's Weblogic server. Weblogic server is an industrial strength web application server for high volume transaction processing websites (e.g. Amazon.com, eTrade, eSchwab, etc.). At the backend, the system of the present invention is built to operate with Oracle and Ingres databases using JDBC drivers.

Weblogic's application server underpins the scalability of the present invention. Weblogic has a proven capacity to run on clustered configuration. It includes built-in load balancing features to support peak processing requirements. The present invention currently may operate using a Consulting Test Certificate Authority. However, the present invention may operate with any approved certification authority, offering the industry standard X509 certificates.

The design of the database follows the well established integrated approach of integrated taxation processing solutions.

The database of the present invention is separate and distinct from the core Revenue processing. It receives regular update via batch interfaces from the existing systems. Extracts of returns and payment details are interfaced back for processing by the core processing systems on a regular basis. The extract from the present invention to the existing systems contains both returns details and payment details. The extract specifically formats the payment and return data to match the normal input formats for the payments and returns reception systems in existing Revenue Agency systems.

The application level security for the present invention includes the following:
Authentication: Ensuring the customer is who they say they are, both client and server via digital certificates.
Encryption: Only the customer and the Revenue Agency have access to confidential information via SSL encryption.
Integrity: The information received by the present invention or the customer originated from the place declared, is unaltered and has arrived unaltered via digital signatures.

The present invention is straight-forward to implement. Implementation requires three streams of work:
Form definition
Incoming interfaces
Outgoing interfaces.

The streams may be developed in parallel.

Forms Definition. This is the customization of the online HTML return forms and the offline forms defined in Java applications. For simple forms this customization may be done in days. For complex (e.g. individual income tax) the process is more involved as design effort is required to ensure an appropriate level of usability.

Incoming Interfaces. The incoming interfaces can be divided into registration type data and basic compliance data. The data of the present invention is held on normalized data tables. The mapping process is therefore clear and easily understood. The incoming interfaces can be satisfied through straightforward extracts from the existing tax systems.

Outgoing Interfaces. The return data captured by the present invention and the associated payment data are extracted from the present invention in a format compatible with the returns and payments input files currently in operation at the Revenue site.

Figure 3:
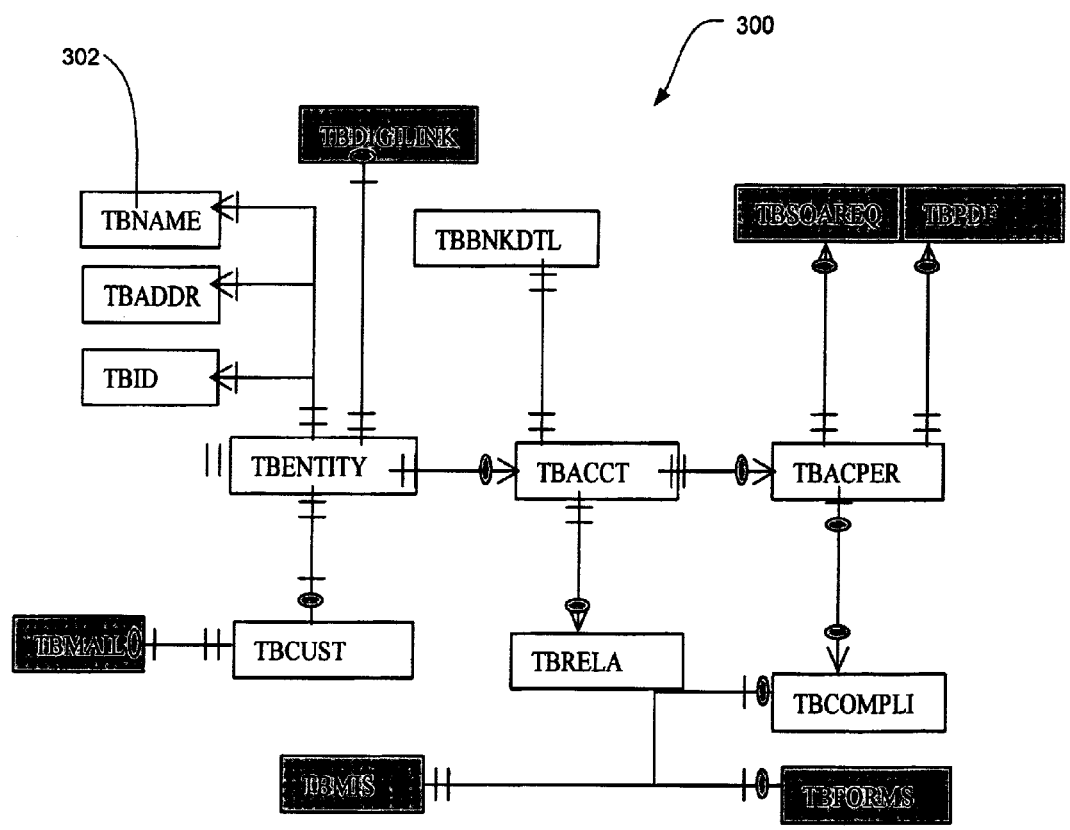
FIG. 3 is a diagram illustrating the database of the present invention.

FIG. 3 is a diagram illustrating the database 300 of the present invention. The design follows the well established integrated approach of integrated taxation processing solutions. However, the data required to actually support the implementation is limited to registration and compliance information.

The tables 302 to be populated are as follows:
TBName—customer name information
TBAddr—customer address information
TBId—customer and agent ID's
TBEntity—core table identifying entity as customer agent
TBCust—specific details regarding the customer
TBAcct—containing registration details relating to each of the customers tax heads
TBRela—specifies the relationships between customers and agents of customers
TBBnkdtl—specifies the bank details for payment
TBAcper—contains details of which period has filed TBCompli—contains details of the issue of return In addition tables are populated by data captured by the present invention. TBForms and TBMis hold the returns data captured from the system. TBSoareq holds requests that customers can make online in the present invention for particular documents to be issued.

TBMail holds the customers mailing address as maintained in the present invention. TBDigilin links the customers digital certificate with the database. The database table TBDigilin is in practice held on a separate database from the remaining tax processing tables.

Figure 4:
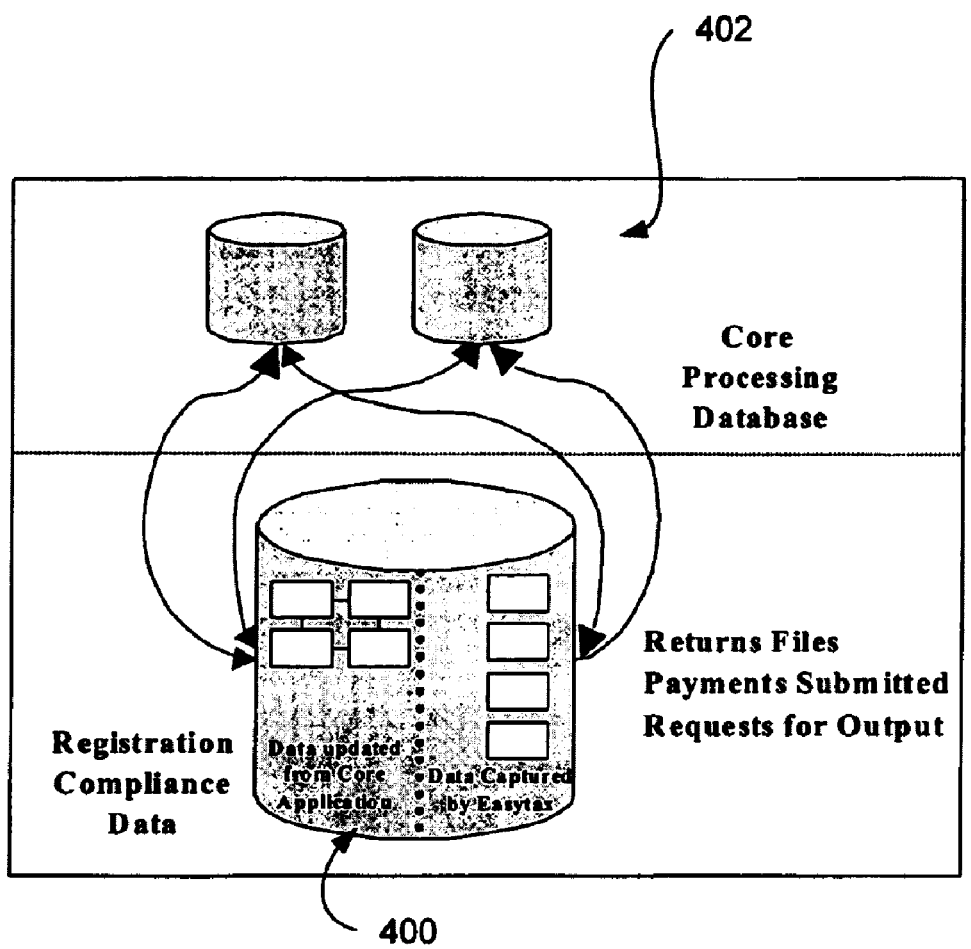
FIG. 4 illustrates the interaction of the database of the present invention with other databases adapted to operate in conjunction therewith.

FIG. 4 illustrates the interaction of the database of the present invention with other databases adapted to operate in conjunction therewith. As shown, the database 400 is separate and distinct from the core Revenue processing systems 402. It receives regular updates via batch interfaces from the existing systems. Extracts of returns and payments details are interfaced back for processing by the core processing systems on a regular (typically nightly) basis. The interfaces to and from the present invention are outlined below. The key interfaces from the existing tax processing systems to the present invention are a nightly update of registration details and compliance and returns issue activity. In addition there may be a nightly update of documents requested by customers using the present invention from the existing processing systems. The existing processing systems may also populate the database with documents they wish their online customers to view. When such documents are transmitted to the present invention, an email is automatically issued to the customer specifying that a document has been posted to their account in the present invention.

The extract from the present invention to the existing systems contains both returns details and payment details. The extract specifically formats the payment and return data to match the normal input formats for the payments and returns reception systems in the existing Revenue Agency systems.

The application level security for the present invention includes the following:

Authentication: Ensuring the customers are who they say they are, both client and server via digital certificates.

Encryption: Only the customer and the Revenue Agency have access to confidential information via SSL encryption.

Integrity: The information received by the present invention or the customer originated from the place declared, is unaltered and arrives unaltered via digital signatures.

Figure 5:
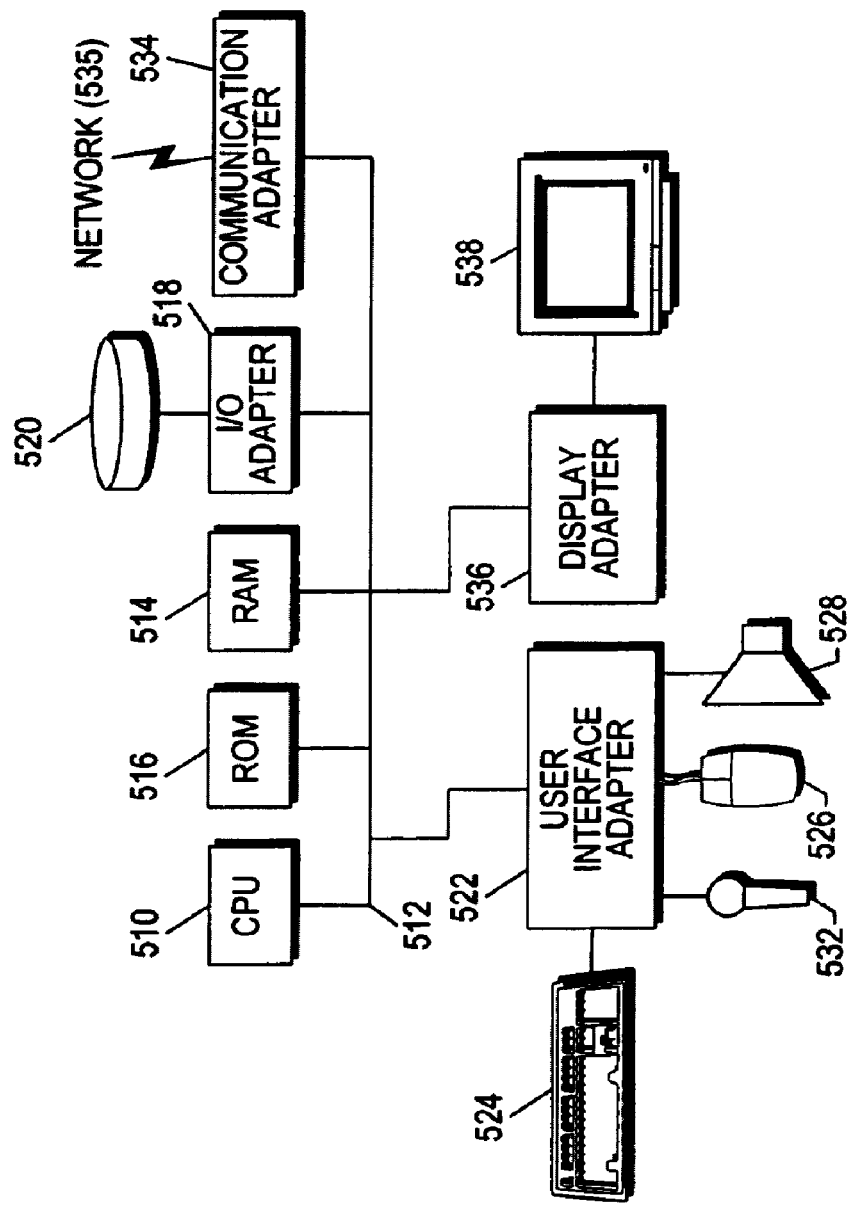
FIG. 5 is a schematic diagram of a hardware implementation of one embodiment of the present invention.

A preferred embodiment of the personal computer 214 of FIG. 2 is depicted in FIG. 5, which illustrates a typical hardware configuration of a workstation in accordance with a preferred embodiment having a central processing unit 510, such as a microprocessor, and a number of other units interconnected via a system bus 512. The workstation shown in FIG. 5 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen (not shown) to the bus 112, communication adapter 534 for connecting the workstation to a communication network (e.g., a data processing network) and a display adapter 536 for connecting the bus 512 to a display device 538. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it may control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer may still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in the program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 6:
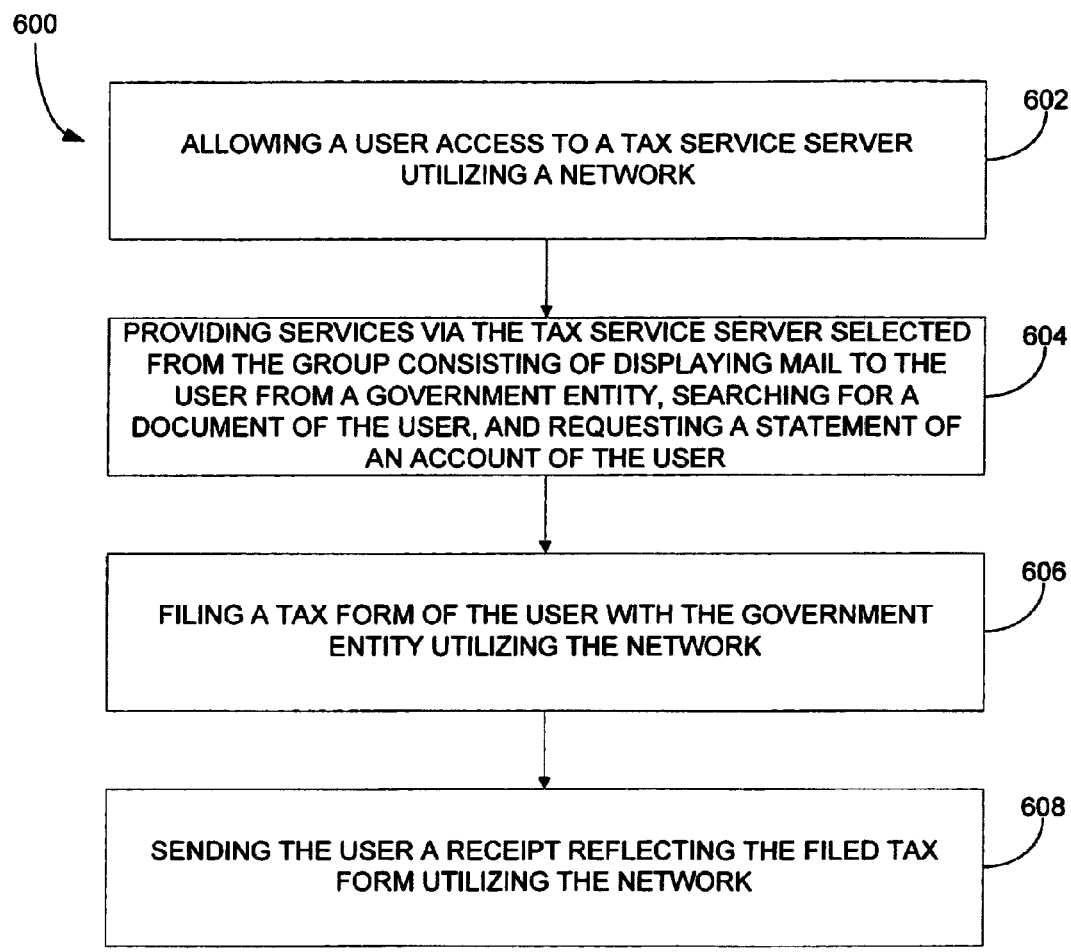
FIG. 6 is a flowchart illustrating an overall functional diagram for a tax service framework in accordance with one embodiment of the present invention.

FIG. 6 is a flowchart illustrating an overall functional diagram for a tax service framework 600 in accordance with one embodiment of the present invention. First, in operation 602, a user is allowed access to a tax service server utilizing a network. Next, services are provided via the tax service server in operation 604. Such services are selected from the group consisting of displaying mail to the user from a government entity, searching for a document of the user, and requesting a statement of an account of the user. Further, in operation 606, a tax form of the user is filed with the government entity utilizing the network. Still yet, the user is sent a receipt reflecting the filed tax form utilizing the network. Note operation 608.

The present invention relies upon digital certificates in order to provide security during operating in accordance with the method set forth in FIG. 6. Installation of digital certificates will now be set forth. One may be provided with a two digital certificates. These certificates are based on the scenarios that are outlined in this guide. The certificates have been generated by a Certificate Authority for the purposes of the development and testing of the present invention.

John Smith6

Mark Morrison6

Set two is labeled with scenario names with the number 2 after the name and so on. The present invention runs on browsers supporting digital certificates including:

Microsoft Internet Explorer 4.01+

Netscape Communicator 4.x

Netscape Communicator Professional Edition 4.x.

The remainder of this section provides instructions on how to import a digital certificate into the browser.

Two sets of instructions are provided:

Netscape Browser instructions

Internet Explorer instructions.

Netscape Browser Instructions

These are the instructions for Importing the Digital Certificates into a Netscape. The browser may be Netscape Communicator 4.x or above.

Open the Netscape browser.

On the menu bar Click on Communicator>Tools>Security Info.

Figure 7:
FIG. 7 is an illustration of an interface including a security information icon during the installation of digital certificates.

FIG. 7 is an illustration of an interface 700 including a security information icon 702 which may be selected during the installation of digital certificates as set forth hereinabove.

3. Click on Certificates>Yours 704.

Figure 8:
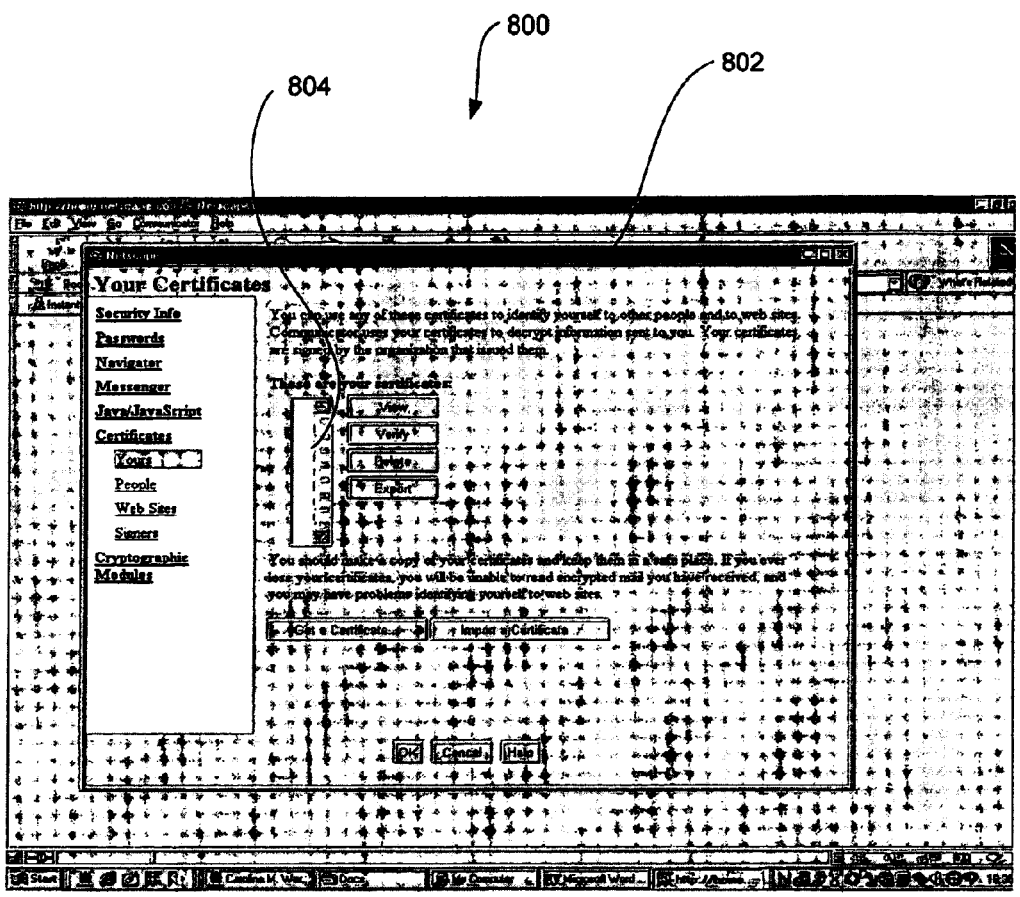
FIG. 8 is an illustration of an interface after the selection of a your certificates icon, and before importing during the installation of digital certificates as set forth hereinabove.

FIG. 8 is an illustration of an interface 800 after the selection of a your certificates icon 704, and before importing during the installation of digital certificates as set forth hereinabove. As indicated, a pop-up window 802 is displayed for providing access to certificates 804 of a user.

Figure 9:
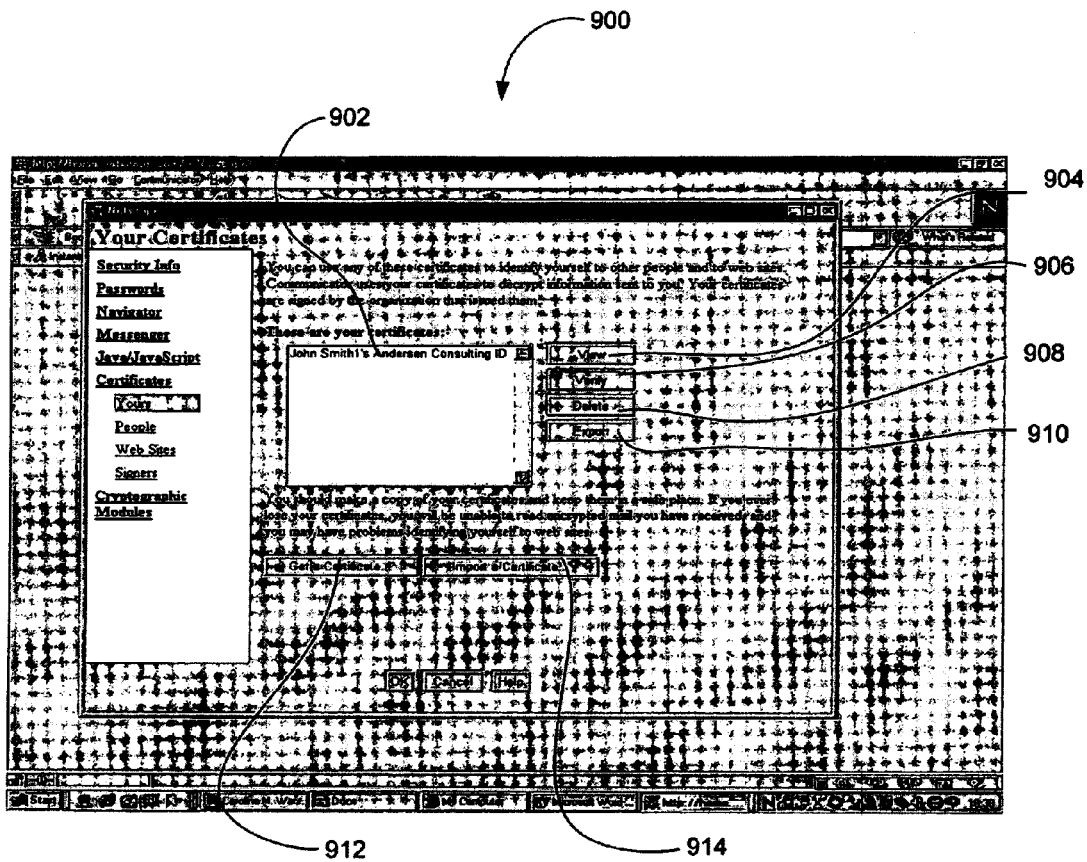
FIG. 9 is an illustration of an interface showing the selection of a your certificates icon after importing during the installation of digital certificates as set forth hereinabove.

FIG. 9 is an illustration of an interface 900 showing the selection of a your certificates icon 704 after importing during the installation of digital certificates as set forth hereinabove. As shown, at least one certificate 902 is listed. Icons include a view icon 904, a verify icon 906, a delete icon 908, an export icon 910, a get certificate icon 912, and an import certificate icon 914.

As shown, a user may click the import certificate icon 914, browse to the drive and click on the certificate that one wants to import. Provide the 'Browser password' (this password is a choice) on request and the 'Certificate password' (this password is 'easytax') when prompted.

Start the process again to import another certificate or click 'OK' to return to the browser.

Internet Explorer Instructions

These are the instructions for importing the Digital Certificates into an Internet Explorer. The browser may be version 4.01 (or above).

Open the browser.

On the menu bar (IE4) Click View>Internet Options and (IE5) Click Tools>Internet Options. The menu bar is different in Internet Explorer 4.0 (IE4) and Internet Explorer 5.0 (IE5).

Click on the 'Content' tab.

Click on the 'Personal' button.

Figure 10:
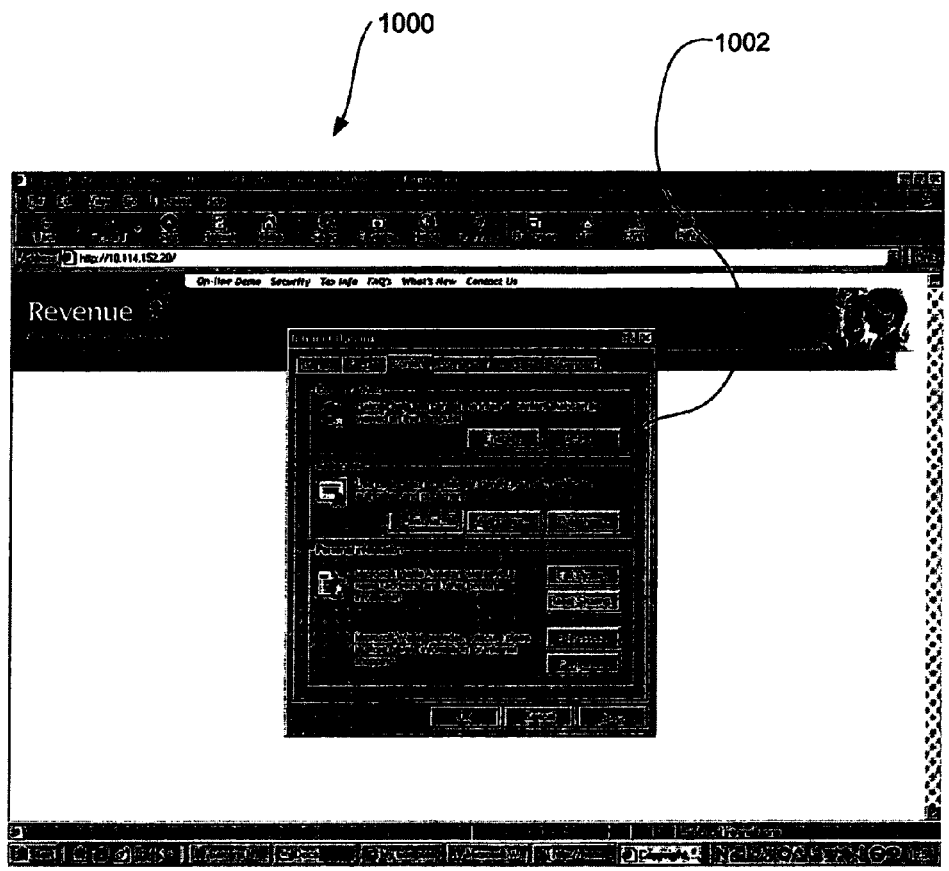
FIG. 10 is a diagram illustrating an interface for providing various Internet options during use of the present invention.

FIG. 10 is a diagram illustrating an interface 1000 for providing various Internet options 1002 during use of the present invention.

Click on the 'Import' button.

Browse to the drive and click on the certificate that you want to import.
Click 'Open'.
Enter the certificate password 'easytax'.
Click 'OK'. (In IE 5 Follow the instructions in the Cert. Wizard—Leave the check boxes unchecked).
Click 'Close'. Click 'OK' to return to the main browser window.

With the installation of digital certificates now described, case scenarios may be set forth illustrating examples of use of the present invention. It should be noted that the governmental entity set forth in the following case scenarios assumes an Irish tax system. The present invention, however, may encompass any type of tax system.

The follow case scenarios are intended to guide the user through the key functionality of the present invention. The following description is divided into two scenarios, each focusing on different areas within the site, depending on the type of user profiled in the scenario.

The user profile and current status table at the beginning of each scenario is for background illustrative purposes, for example, occasional System user or Tax Agent, who may both seek to perform different tasks within the present invention.

The following case scenarios enable one to experience the full functionality of the present invention by performing specific tasks, filing real returns, receiving Customer Information Service notifications and paying taxes on-line. However, all customer details and data in the guide are merely for test purposes and the evaluator can enter alternative data wherever bold print appears in the description, or in any other area. Alternatively the evaluator may entirely depart from the instructions in the guide and explore the system. Moving from one digital certificate to another is not a normal business scenario. Customers would be expected to have one rather than many digital certificates. Browsers are built with this understanding in mind. Therefore in evaluating the present invention when one moves from one certificate to another he or she may need to reboot the PC.

Summary of Scenarios

Scenario #1—John Smith

The present description includes six scenarios, which are based on several cases of typical System users. These cases fall into the categories of occasional users, business users, Tax Agents and Revenue staff. A registered Revenue On-Line Customer, an occasional user filing two bi-monthly VAT 3 forms on-line and subsequently viewing the items updated in the Customer Information Service.

Scenario #2—Mark Morrison

Registered Tax Agent who regularly files returns on behalf of three clients. The Agent may:

File a form P30 on behalf of a taxpayer

File an amended form P35 on behalf of a (third) taxpayer.

ACCESSING THE PRESENT INVENTION

Follow the instructions below to enter the system.

| Action | Comments |
| --- | --- |
| Type the following URL address in the Browser: http://www.revenuesonline.net | If this is the first time attempting to access the site, you will receive a standard message informing you that the site requested uses encryption to protect transmitted information and does not recognize the author who signed the certificate. Details of the digital certificate are provided and you may be given the option to accept the certificate for this session or forever (until the certificate expires). In order to avoid receiving this security message, click on the link provided on the Easytax Home Page. This link is located under the 'Enter On-Line Services' button. Once you have accepted the security message you may be brought to a temporary login page. |

Note:
A first time user of the Easytax System will need to perform this action in order to register the Certificate Authority used by Revenue with the Browser. If the user does not perform this action he/she may receive a warning that the Digital Certificate is not recognized by the system and may be unable to digitally sign a return.
If you are using a Netscape Browser to access Easytax and file a return, you may follow the following steps upon entering the site:
1. Click on <SECURITY> in the Browser
2. Click on 'Signers'
3. Select Root CA-from the displayed list of CA's
4. Click on <EDIT>
5. Check the three boxes that accept this Certificate Authority for Certifying Network Sites, e-mail users, Software Developers.
6. Click OK
7. Click OK

| | |
| --- | --- |
| Log into the Easytax system using the User Name 'rosnt'. Enter the Password 'easytax'. Press <Enter> to continue. | This will result in a copyright notice appearing automatically. This Login step is for tender evaluation purposes only and will not be part of the final Easytax System. |
| Agree with the Copyright notice to proceed with the Easytax Service. Click <I Agree>. | This will bring you through to the Easytax Home Page |
| Guidelines for viewing the Easytax System. | It is recommended that the Easytax system is viewed in conjunction with this guide, however all buttons, fields, and links can be selected without causing runtime errors. |

Scenario #1

John Smith, a registered occasional user of the instant service wishes to file two bi-monthly VAT 3 forms on-line and subsequently view the items updated in the Customer Information Service. John has obtained his valid digital certificate from the third party Certification Authority which contains his unique identifier. He is granted access to the present invention upon validation of the digital certificate and password as he attempts to enter the Online Services section. John has registered to file his form VAT 3 in Euros, however he now wishes to file in Irish Punts. John wishes to file one bi-monthly form VAT3 with a net payable, attach a digital signature to the return and submit it to Revenue. He also wishes to print this submitted return and receive a receipt of payment.

John wishes to perform the following functions within Customer Information Service:

View his Customer Information Service inbox, which details all recently filed returns and all recent activity with Revenue.

Request a Statement of Account for VAT 3.

Search his archive for a particular VAT 3 return he filed through the present invention.

John also has an outstanding return from another bi-monthly period. He wishes to complete this form VAT 3, alter his Bank Repayment details and submit it to Revenue.

(Note: The following table is a summary of the current status of the scenario individual with full Revenue details and personal profile. This table may be included in all scenarios for each Revenue Customer).

Personal Profile and Current Status of John Smith—Scenario#1

| | Personal Profile | |
|---|---|---|
| | Name | John Smith |
| | Registered Address | 28 Oaklands Park Ballsbridge, Dublin 4 |
| | Contact Telephone No. | 01-8482496 |
| | E-mail address | johnsmith@mail.com |
| | Status of Taxes Customer is Registered for: | |
| VAT | GCD | 12 |
| | Unit | 231 |
| | VAT Reg. Number | 00259643P |
| | VAT Start Period | Jan. 1, 1999 (hypothetical) |
| | VAT End Period | N/A |
| | VAT Returns previously filed | VAT 3: May-June 1999 (filed via Easytax) VAT 3: March-April 1999 VAT 3: January-Feburary 1999 |
| | VAT Returns issued but not filed | VAT 3: September-October 1999 VAT 3: July-August 1999 |
| | Agent Name | None |
| | Agent Start Date | N/A |
| | Agent End Date | N/A |
| | Elected Filing Currency | Euro |
| | Direct Debit Payment Bank Details | Sort Code: 93-12-25 Account Number: 00835076 |
| | Direct Repayment Bank Details | Sort Code: 94-24-98 Account Number: 00835077 |
| PAYE-Employer | GCD | 21 |
| | Unit | 41 |
| | PAYE-Employer Reg. Number | 00019000E |
| | PAYE-Employer Start Period | Jan. 3, 1999 |
| | PAYE-Employer End Period | N/A |
| | PAYE-Employer Returns previously filed | P35: 6th Apr. 1998-5th Apr. 1999 (filed via Easytax) P30: 6th Jul. 1999-5th Aug. 1999 (filed via Easytax) P30: 6th Aug. 1999-5th Sep. 1999 |
| | PAYE-Employer Returns issued but not filed | None |
| | Agent Name | None |
| | Agent Start Date | N/A |
| | Agent End Date | N/A |
| | Elected Filing Currency | Euro |
| | Direct Debit Payment Details | Sort Code: 93-12-25 Account Number: 00835076 |
| | Direct Repayment Bank Details | Sort Code: 94-24-98 Account Number: 00835077 |

Steps Involved in Scenario #1

The following is a list of the steps involved in scenario 1:

| Guide Step | Functionality |
|---|---|
| A | Enter Online Services |
| B | Online Services |
| C | Filing VAT 3 |
| D | Receipt of Return and Print Option |
| E | Customer Information Services |
| F | Filing VAT 3 |
| G | Receipt of Return and Print Option |

Figure 11:
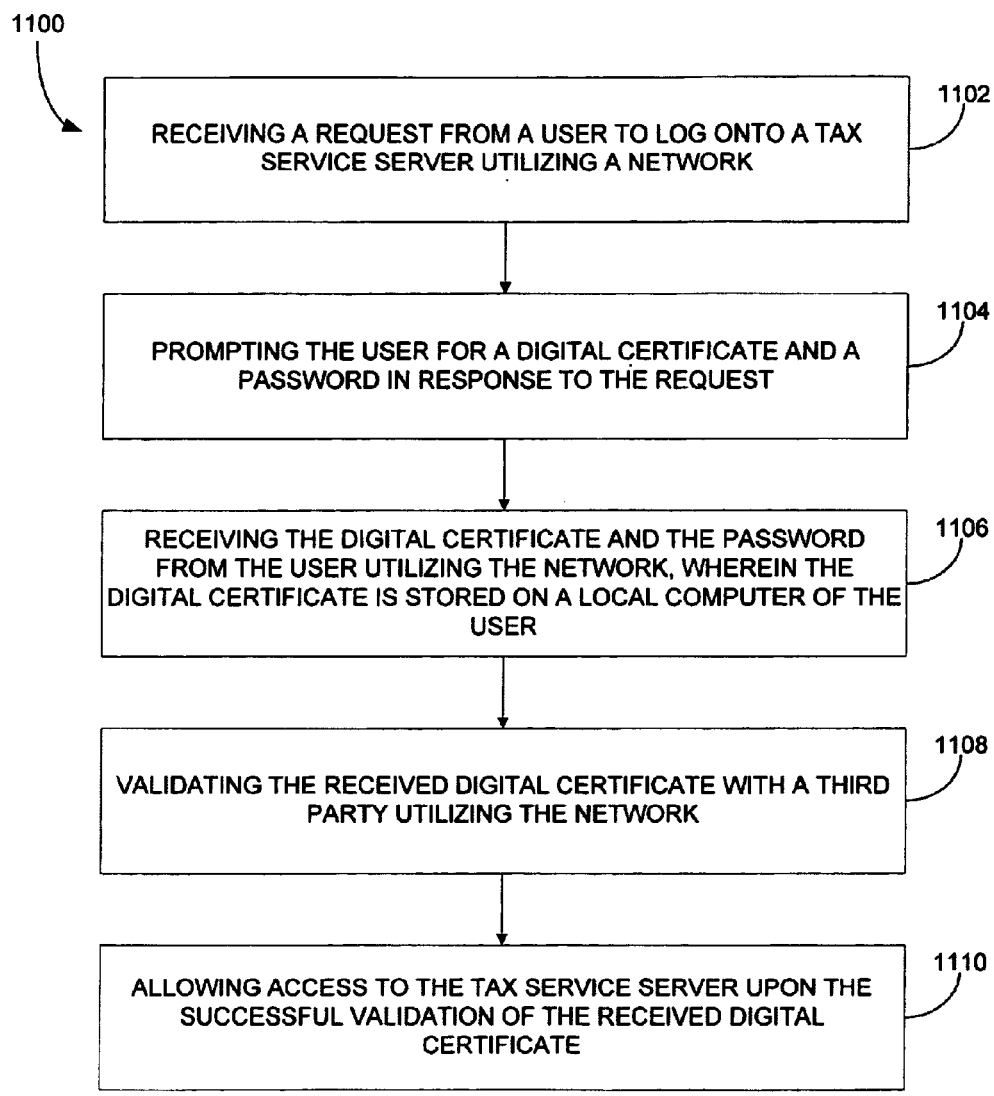
FIG. 11 is a flowchart illustrating a method for securely accessing a network-based tax service in accordance with one embodiment of the present invention.

FIG. 11 is a flowchart illustrating a method 1100 for securely accessing a network-based tax service in accordance with one embodiment of the present invention. First, in operation 1102, a request is received from a user to log onto a tax service server utilizing a network. Next, in operation 1104, the user is prompted for a digital certificate and a password in response to the request. Thereafter, the digital certificate and the password are received from the user utilizing the network. Note operation 1106. The digital certificate is stored on a local computer of the user. The received digital certificate is subsequently validated with a third party utilizing the network, as indicated in operation 1108. Further, in operation 1110, the user is allowed access to the tax service server upon the successful validation of the received digital certificate.

In one aspect of the present invention, the user may be allowed to change the digital certificate by logging the user off of the tax service server. Further, it may be determined whether the user has previously been allowed access to the tax service server. If it is determined that the user has not previously been allowed access to the tax service server, the user may be required to download a plurality of files. Such files may permit the creation of the digital certificate.

In another aspect of the present invention, the tax service server may provide tax information, frequently asked questions, security information, a demonstration, and contact information. As an option, the network may include the Internet.

An exemplary implementation of the foregoing concept will now be set forth in the context of the Irish Tax Revenue Office. It should be noted, however, that the present invention may be implemented in the context of any revenue generating system.

Enter Online Services

This step introduces the Home Page of the present invention and demonstrates how a user securely enters Online Services with digital certificate validation.

Notes for first time users of Online Services:

A valid Digital Certificate may be held by the user and stored in his/her hard drive or on a floppy disk.

If the user wishes to change his/her digital certificate and is not prompted to do so by the browser, log off the network connect to close the session and a prompt may appear.

When entering the secure Online Service page for the first time, the user may click on the link below the tax table to download the files required to create digital signatures.

In order to register the Certificate Authority who signed the digital certificate with the Browser, the user may click on the link provided in the Home page of the present invention.

| Step | Page | Action | Functional Description/Comments |
|------|------|--------|--------------------------------|
| A.1 | Easytax Home | View Online Services which are available to the general public without digital certificate verification. | Various Easytax Informational Services are available to the public through the Easytax Home Page. These services include the following: Tax Information Frequently Asked Questions Security Information On-Line Demo Contact Us What's New The user now wishes to enter the secure Online Services. |
| A.2 | Easytax Home (1.0) | Select Enter Online Services. | When the user clicks on Enter Online Services, he may be prompted to select his digital certificate and enter his digital certificate password. |
| A.3 | Easytax Home - Message Box | Select Digital Certificate from the list provided | The user may select his/her digital certificate. |
| A.4 | Easytax Home - Message Box | Click OK to submit the digital certificate for validation | The user's digital certificate will now be validated. |
| A.5 | Easytax Certificate Login | Enter Digital Certificate Password the box provided. (e.g. easytax) | The user may enter his/her password in order to validate the digital certificate. |
| A.6 | Easytax Certificate Login | Click OK to submit the digital certificate password for validation | The user's digital certificate has been successfully validated and he/she is brought directly to the Online Services Page. |

Figure 12:
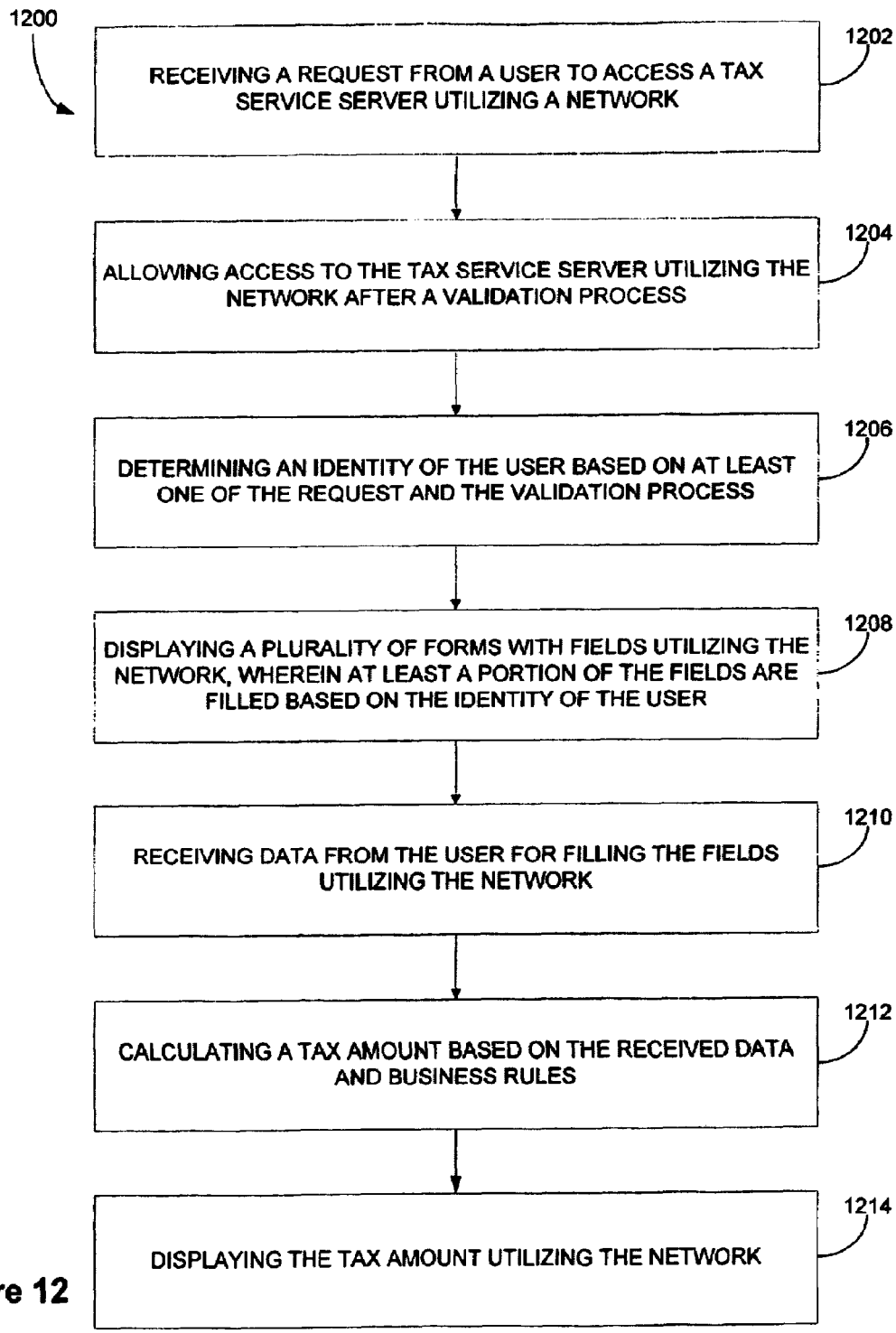
FIG. 12 is a flowchart illustrating a method for affording network-based tax services in accordance with one embodiment of the present invention.

FIG. 12 is a flowchart illustrating a method 1200 for affording network-based tax services. First, in operation 1202, a request is received from a user to access a tax service server utilizing a network. Next, a user is allowed access to the tax service server utilizing the network after a validation process. Note operation 1204. An identity of the user is then determined based on the request and/or the validation process in operation 1206. Thereafter, in operation 1208, a plurality of forms with fields are displayed utilizing the network. At least a portion of the fields are filled based on the identity of the user. Additional data is subsequently received from the user in operation 1210 for filling the fields utilizing the network. Further, in operation 1212, a tax amount is calculated based on the received data and business rules. In operation 1214, the tax amount is displayed utilizing the network.

In one embodiment of the present invention, the business rules may be based on governmental tax codes. Further, a request may be sent to a third party financial entity to transfer funds utilizing a network. The user may also be prompted to enter a quantity of the tax amount to be paid, wherein the transferred funds equal the entered quantity. Optionally, a receipt may be received utilizing the network in response to the transfer of funds.

An exemplary implementation of the foregoing concept will now be set forth in the context of the Irish Tax Revenue Office. It should be noted, however, that the present invention may be implemented in the context of any revenue generating system.

Services

Once John has accessed the Online Services page, he is within the secure site and may see his personal details appear at the top of the page, e.g. Name, VAT Registration Number. John may now complete a bi-monthly form VAT 3 on-line, for which he has only one registration number, and submit it to Revenue.

| Step | Page | Action | Functional Description/Comments |
|------|------|--------|--------------------------------|
| B.1 | Easytax Services | Select VAT 3 under 'File a Return' | The services on offer at this point are personalized to John Smith. He has the option to file a return for which he is a registered customer with Revenue. John has registered to file the following taxes with Revenue: VAT PAYE-Employer. |

Figure 13:
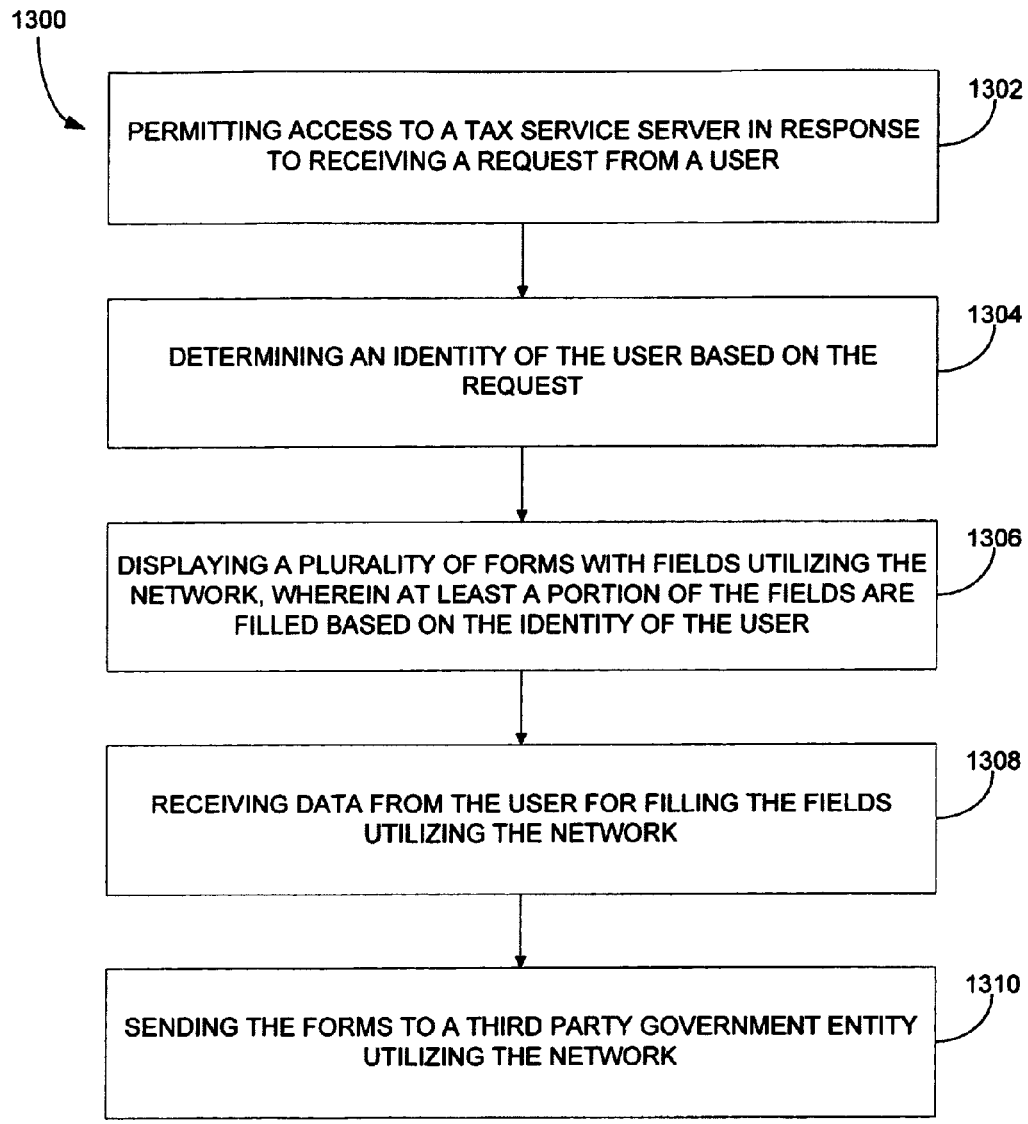
FIG. 13 is a flowchart illustrating a method for filing a tax-related form in a network-based tax service environment.

FIG. 13 is a flowchart illustrating a method 1300 for filing a tax-related form in a network-based tax service environment. First, in operation 1302, access is permitted to a tax service server in response to receiving a request from a user. Next, in operation 1304, an identity of the user is determined based on the request. Further, a plurality of forms with fields are displayed utilizing the network, where at least a portion of the fields are filled based on the identity of the user. Note operation 1306. Utilizing the network, data is received from the user for filling the fields. See operation 1308. Thereafter, in operation 1310, the forms are sent to a third party government entity utilizing the network.

In one embodiment of the present invention, a request may be sent to a third party financial entity to transfer funds utilizing a network. The user may also be prompted to enter a quantity of the tax amount to be paid. Such transferred funds equal the entered quantity.

In another embodiment of the present invention, the identity of the user is validated using a digital certificate. Such digital certificate may be stored on a computer of the user.

An exemplary implementation of the foregoing concept will now be set forth in the context of the Irish Tax Revenue Office. It should be noted, however, that the present invention may be implemented in the context of any revenue generating system.

Filing VAT 3

John has elected to file a bi-monthly form VAT 3 and because he has only one registration number for VAT 3, he is brought directly to the on-line form. John has registered to file his form VAT 3 in Euros, however he now wishes to file and pay in Irish Punts. He now proceeds with completing the on-line form VAT 3 and submitting it to Revenue

| Step | Page | Action | Functional Description/Comments |
|------|------|--------|--------------------------------|
| C.1 | VAT3 Return (3.2) | Select Taxation Period (e.g. July-August 1999) | The drop-down box allows John to select the taxation period for which he wishes to file a return. This is automatically populated with periods for which returns have been issued but not yet filed. |
| C.2 | VAT3 Return (3.2) | Select IR | John has previously registered to file VAT 3 in Euros, however he now wishes to file in Irish Punts. He can do this by selecting the appropriate radio button (Note: If John is had not previously registered to file in a particular currency, the system would default to Irish Pounds.) |

-continued

| Step | Page | Action | Functional Description/Comments |
|---|---|---|---|
| | | | The corresponding symbol appears at the top of the form. |
| C.3 | VAT3 Return (3.2) | Enter VAT details in fields T1 and T2. (e.g. T1: 5500, T2: 500) | John enters the appropriate details in the following fields: T1: VAT on goods and services supplied and Intra-EU acquisitions T2: VAT on detachable purchases, Intra-EU acquisitions and imports. |
| C.4 | VAT3 Return (3.2) | Tab away from field T2 | A Net Payable amount of 5000 appears automatically in field T3, (i.e. excess of T1 over T2) and the Net Repayable amount in field T4 is 0. |
| C.5 | VAT3 Return (3.2) | Enter Intra-EU Trade Information (e.g. E1: 1000, E2: 2000) | Intra-EU Trade information does not impact on the calculations, however both of these boxes should be completed. John will now submit the completed form. (Note: If the user does not wish to submit the return to Revenue, he can click 'Cancel', which will bring him back to Online Services). |
| C.6 | VAT3 Return (3.2) | Click Next | When the user clicks <Next> he is brought directly to the 'VAT 3 Payment Instruction' screen. Here he is presented with the bank details (Sort Code and Account Number) which he has registered with Revenue for direct debit purposes. These are not editable on-line. |
| C.7 | VAT3 Payment Instruction | Alter Payment Amount (e.g. 4000) | The payment amount defaults to the total net payable amount. However, the user has the option to edit the amount he wishes to pay. John decides to pay 4000 of the 5000 net payable. |
| C.8 | VAT3 Return (3.2) | Click <Next> | When the user clicks <Next> he is brought directly to the summary of the return details and a final confirmation before submitting the return to Revenue. Here he is presented with the bank details (Sort Code and Account Number) which he has registered with Revenue for direct debit purposes. These are not editable on-line. |
| C.9 | VAT3 Summary and Sign | Click on Digital Certificate Browse button beside the field. | John browses for and selects his digital certificate and then enters his password. |
| C.10 | VAT3 Summary and Sign | Enter Digital Certificate Password (e.g. easytax) | John enters his digital certificate password. |
| C.11 | VAT3 Summary and Sign | Click <Sign and Submit> | By clicking on the 'Sign and Submit' button, the user is digitally signing the completed form and payment instruction which guarantees the integrity of the data transmitted as well as the identification and authentication of the user. The signed package is sent to Revenue and a PRN(Personal Receipt Number) is automatically generated. A receipt containing this number is created and presented to the user, which he can save and print. He will also receive a receipt of the submitted return in his CIS Inbox. |

Receipt of Return and Print Option

John has now successfully filed a return form VAT 3 and receives a receipt of the successfully filed return. He now has the option to print a hard copy of this receipt or return to the Services page of the present invention.

| Step | Page | Action | Functional Description/Comments |
|---|---|---|---|
| D.1 | PRN Receipt (3.10) | Select <Save As> from the File Menu in the Browser and specify location. | The receipt is saved in the location specified by the user. |
| D.2 | PRN Receipt (3.10) | Select <Print> from the File Menu in the Browser. | A hard copy of the receipt can be printed by the user. |

Figure 14:
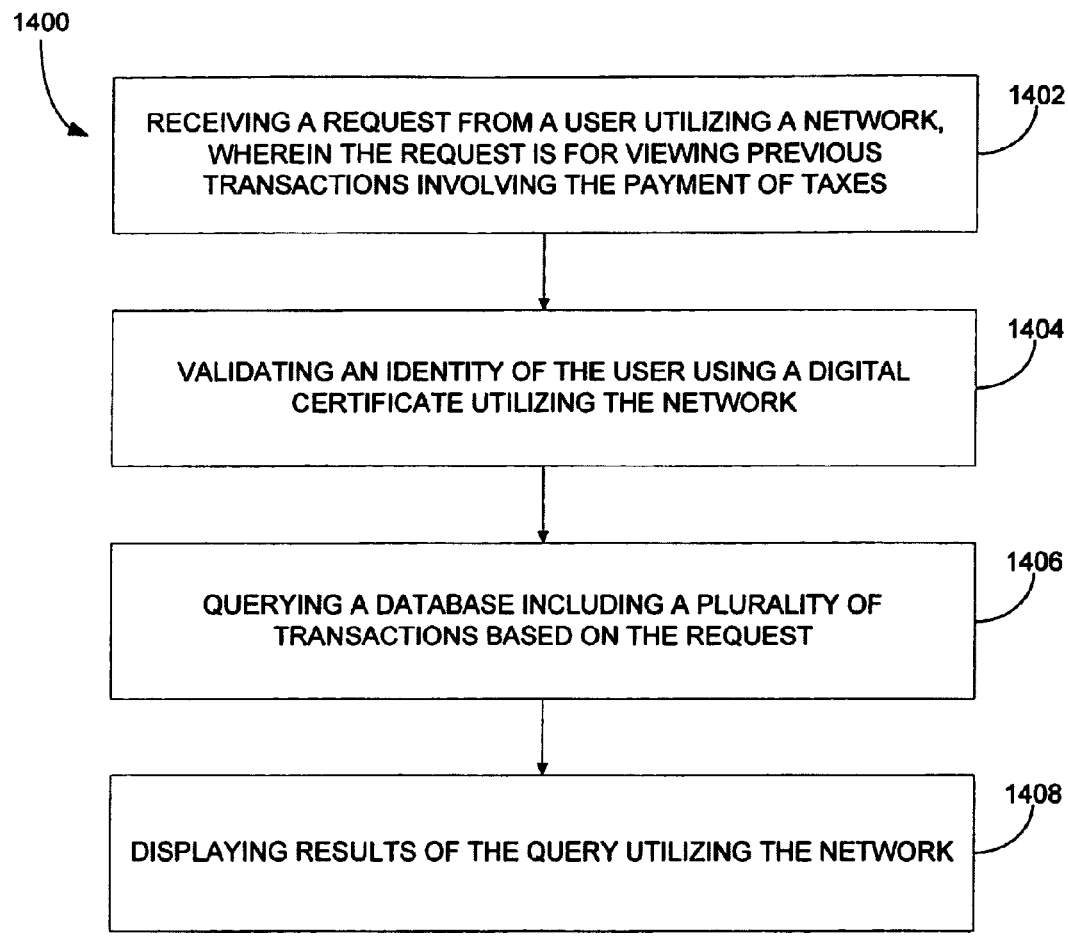
FIG. 14 is a flowchart illustrating a method for affording customer tax information services in accordance with one embodiment of the present invention.

FIG. 14 is a flowchart illustrating a method 1400 for affording customer tax information services. First, in operation 1402, a request is received from a user utilizing a network. Such request is for viewing previous transactions involving the payment of taxes. An identity of the user is then validated using a digital certificate utilizing the network in operation 1404. Next, in operation 1406, a database including a plurality of transactions is queried based on the request. Results of the query are subsequently displayed utilizing the network. See operation 1408.

In one aspect of the present invention, the results of the query may be organized as a function of a date associated therewith. Further, only the results having a recent date associated therewith may be displayed. Still yet, the request may include information on a specific form filed with a third party governmental entity.

In another aspect of the present invention, the results may include verification of receipt of forms filed with a third party governmental entity. Optionally, the results may not be altered.

An exemplary implementation of the foregoing concept will now be set forth in the context of the Irish Tax Revenue Office. It should be noted, however, that the present invention may be implemented in the context of any revenue generating system.

Customer Information Services

At this point, John wishes to view his latest transactions with Revenue which can be done through the use of the Customer Information Service. John wishes to perform the following functions within CIS:

View his Customer information Service inbox, which details all recently filed returns and all recent activity with Revenue Request a Statement of Account for VAT 3

Search his archive for a particular VAT 3 return he filed through the present invention, in the period May-June 1999.

| Step | Page | Action | Functional Description/Comments |
|---|---|---|---|
| E.1 | Online Services (2.0) | Click 2 Items under Customer Info. Service | John has 2 new items in his CIS inbox from Revenue. He can access his CIS inbox by simply clicking on the number of items. This brings him directly into his personalized Customer Information Service. From here John can see that he now has 2 new items in his inbox sent by Easytax: Receipt of recently filed return VAT 3 - Period July-August 1999 and successful payment received Copy of recently requested Statement of Account. |
| E.2 | CIS | Click | John views the statement of account |

-continued

| Step | Page | Action | Functional Description/Comments |
|---|---|---|---|
| | Inbox (3.11) | on the PAYE-Employer Statement of Account in CIS Inbox | which has been sent to him by Easytax. This item will no longer be in his inbox when he re-enters CIS. |
| E.3 | CIS Inbox (3.11) | Click On-Line Services | John returns to the Online Services page. He is now informed that he has only one new item in his inbox. |
| E.4 | CIS Inbox (3.11) | Click VAT in Tax drop-down menu | John requests a Statement of Account for VAT. |
| E.5 | CIS Inbox (3.11) | Click July 1999 in Statement Starting drop-down menu | He makes the final selection to order a statement. |
| E.6 | CIS Inbox (3.11) | Click <Submit> | By clicking on Submit, John has submitted his statement request to CIS. |
| E.7 | Message Box | Click OK | A message box appears informing John that his request has been processed and he will receive the Statement of Account in his inbox. Clicking on OK clears the message box, bringing John back to his Online Services page. |
| E.8 | CIS Inbox (3.11) | Click VAT in Tax drop-down menu | John wishes to view a previously submitted form VAT 3 from the period May-June 1999, so he requests a search of his VAT 3 archived forms. |
| E.9 | CIS Inbox (3.11) | Click VAT3 in Document Type drop-down menu | He selects a VAT 3 return from a previous period. |
| E.10 | CIS Inbox (3.11) | Click <Submit> | By clicking on Submit, John has submitted his search request to CIS and is presented with the search results. |
| E.11 | CIS Search Results (3.12) | Click VAT return displayed in Search Results | John clicks the VAT 3 return displayed in the search results. This opens a copy of the VAT 3 form he submitted in a previous period. This form cannot be altered and is simply for record purposes. |
| E.12 | View HTML file (3.14) | Click Online Services | Once John has viewed the form, he returns to the CIS inbox. John has one new item in his Inbox: Notification of his most recently filed VAT 3 form on July-August 1999. John now wishes to complete another VAT 3 which is outstanding for the period September-October 1999. |
| E.13 | CIS Inbox (3.11) | Click on button next to VAT 3 | John is brought to the on-line VAT 3 form. |

Filing VAT 3

John now wants to complete an outstanding bi-monthly form VAT 3. The form VAT 3 for this period is a Net Repayable and John may be given the option to enter new Bank Account details.

| Step | Page | Action | Functional Description/Comments |
|---|---|---|---|
| F.1 | VAT3 Return (3.2) | Select Taxation Period (e.g. September-October 1999) | The drop-down box allows John to select the taxation period for which he wishes to file a return. This is automatically populated with periods for which John has not yet filed. In this case John selects the period September-October which is the outstanding return to be filed. |
| F.2 | VAT3 Return (3.2) | Select IR | John has previously registered to file VAT 3 in Euros, however he now wishes to file in Irish Punts. He can do this by selecting the appropriate radio button. (Note: If John is had not previously registered to file in a particular currency, the system would default to Irish Pounds). The corresponding symbol appears at the top of the form. |
| F.3 | VAT3 Return (3.2) | Enter VAT details in fields T1 and T2. (e.g. T1: 1000, T2: 3000) | John enters the appropriate details in the following fields: T1: VAT on goods and services supplied and Intra-EU acquisitions T2: VAT on detachable purchases, Intra-EU acquisitions and imports. When the user tabs from field T1, client-side validation is performed to ensure the user has entered an integer. |
| F.4 | VAT3 Return (3.2) | Tab away from field T2 | A Net Repayable amount of 2000 appears automatically in field T4, (i.e. excess of T1 over T2) and the Net Payable amount in field T3 is 0. |
| F.5 | VAT3 Return (3.2) | Click I | John is unsure what details should be entered in fields E1 and E2 - Intra-EU Trade Information. Therefore he clicks on the Information Icon to learn more about these fields. |
| F.6 | VAT3 Return (3.2) | Click OK | John has read the details explaining the Intra-EU Trade field. He then clicks OK to return to the on-line form. |
| F.7 | VAT3 Return (3.2) | Enter Intra-EU Trade Information (e.g. E1: 1000, E2: 2000) | Intra-EU Trade information does not impact on the calculations, however both of these boxes should be completed. |
| F.8 | VAT3 Return (3.2) | Click <Next> | When the user clicks <Next> he is brought directly to the 'VAT 3 Repayment Instruction' screen. Here he is presented with the Bank Details (Sort Code and Account Number) which he has registered with Revenue for direct debit purposes. These are editable on-line |
| F.9 | VAT3 Return (3.2) | Enter Bank Repayment Details (e.g.: Sort Code: 97-45-12 Account Number: 00765987) | John wishes to alter the Bank Account into which Revenue will make the repayment. In order to do this, he simply changes the account numbers in the fields at present. The payment amount defaults to the total net repayable amount. |
| F.10 | Final Confirmation | Click on Digital Certificate Browse button beside the field. | John browses for and selects his digital certificate and then enters his password. |
| F.11 | Final Confirmation | Enter Digital Certificate Password (e.g. easytax) | John enters his digital certificate password. |
| F.12 | Final | Click | By clicking on the 'Sign and Submit' |

-continued

| Step | Page | Action | Functional Description/Comments |
|------|------|--------|-------------------------------|
| Confirmation | <Sign and Submit> | button, the user is digitally signing the completed form and payment instruction which guarantees the integrity of the data transmitted, as well as the identification and authentication of the user. The signed package is sent to Revenue and a PRN(Personal Receipt Number) is automatically generated. A receipt containing this number is created and presented to the user which he can save and print. He will also receive a receipt of the submitted return in his CIS inbox. |

Figure 15:
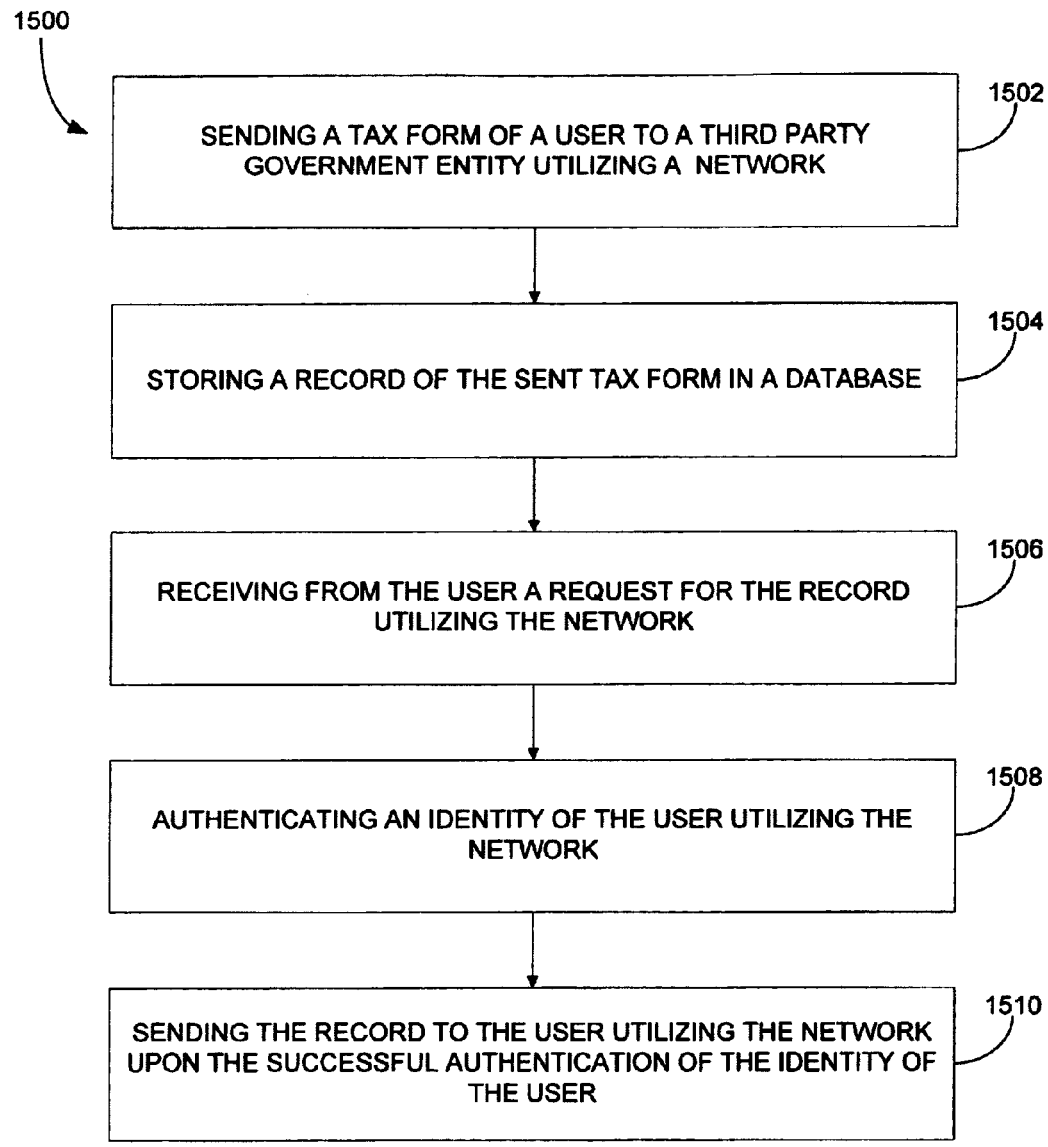
FIG. 15 is a flowchart illustrating a technique for tax form submittal verification in accordance with one embodiment of the present invention.

FIG. 15 is a flowchart illustrating a technique 1500 for tax form submittal verification in accordance with one embodiment of the present invention. First, in operation 1502, a tax form of a user is sent to a third party government entity utilizing a network. Next, in operation 1504, a record of the sent tax form is stored in a database. Thereafter, a request for the record is received from the user utilizing the network. See operation 1506. An identity of the user is then authenticated utilizing the network, as indicated in operation 1508. Upon the successful authentication of the identity of the user, the record is sent to the user utilizing the network. See operation 1510.

In one embodiment of the present invention, the record may be formatted for being printed by the user. Further, a notification relating to the record may be sent to a mail server of the user utilizing the network. Still yet, the identity of the user may authenticated using a digital certificate. Such digital certificate may be stored on a computer of the user.

An exemplary implementation of the foregoing concept will now be set forth in the context of the Irish Tax Revenue Office. It should be noted, however, that the present invention may be implemented in the context of any revenue generating system.

An additional feature to be included is a function for a user to attach their digital signature to a visible text file containing their tax return data. Attaching a user's digital certificate within an encrypted message containing the tax return enables a tax authority to conclusively prove that the data contained within a message received from the user is actually from that user (i.e. the tax return cannot be repudiated). The systems also provide for capturing matching payment instruction for a return. The payment instructs the Revenue to deduct money directly from a user's nominated bank account.

Receipt of Return and Print Option

John has now successfully filed a return form VAT 3 for the bi-monthly period September-October 1999. He will instantly receive a receipt of the successfully filed return which he can print, as well as notification in his CIS inbox. He now has the option to save and print a hard copy of this receipt.

| Step | Page | Action | Functional Description/Comments |
|------|------|--------|-------------------------------|
| G.1 | PRN Receipt (310) | Select <Save As> from the File Menu in the Browser and specify location. | The receipt is saved in the location specified by the user. |
| G.2 | PRN Receipt (3.10) | Select <Print> from the File Menu in the Browser. | A hard copy of the receipt can be |

-continued

| Step | Page | Action | Functional Description/Comments |
|------|------|--------|-------------------------------|
| | | | printed by the user. |
| G.3 | Online Services (2.0) | Click <Exit> | John clicks <Exit> to securely terminate his on-line session with Revenue. |
| G.4 | Exit (2.4) | | He is reassured of a successful termination from the Easytax System and is brought directly back to the Easytax Home page. |

Figure 16:
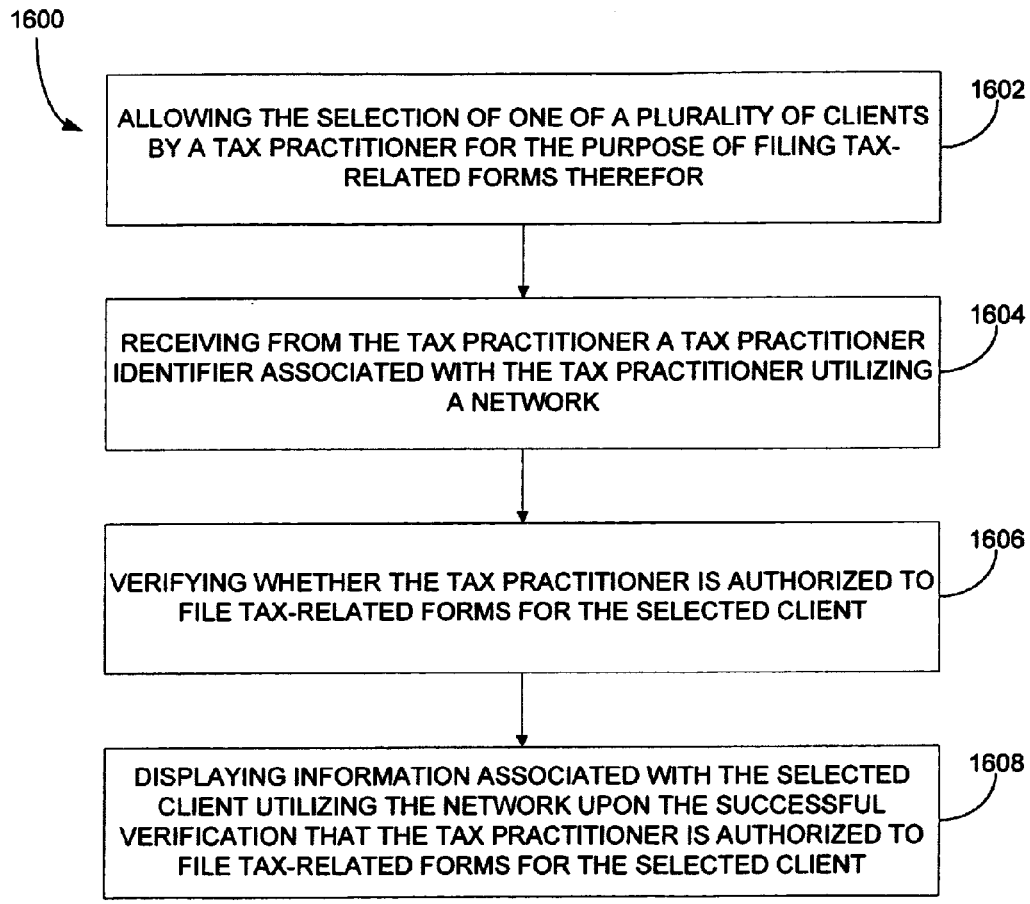
FIG. 16 is a flowchart illustrating a method for filing tax-related forms in a network-based tax service environment for multiple users in accordance with one embodiment of the present invention.

FIG. 16 is a flowchart illustrating a method 1600 for filing tax-related forms in a network-based tax service environment for multiple users in accordance with one embodiment of the present invention. First, in operation 1602, a tax practitioner is permitted to select one of a plurality of clients for the purpose of filing tax-related forms. Then, in operation 1604, a tax practitioner identifier associated with the tax practitioner is received from the tax practitioner utilizing a network. It is further verified whether the tax practitioner is authorized to file tax-related forms for the selected client. See operation 1606. Information associated with the selected client is then displayed utilizing the network upon the successful verification that the tax practitioner is authorized to file tax-related forms for the selected client, as indicated in operation 1608.

In one embodiment of the present invention, the clients are displayed for allowing the selection thereof. Such displayed clients may be each selected by clicking on a name thereof. Further, an identity of the tax practitioner may be authenticated using a digital certificate.

In another embodiment of the present invention, the tax practitioner may be allowed to file tax-related forms upon successful authentication of the digital certificate, and the successful verification that the tax practitioner is authorized to file tax-related forms for the selected client. Still yet, a client identifier, i.e. registration number, associated with the selected client may be received from the tax practitioner utilizing the network. Such client identifier may be used for verification purposes.

An exemplary implementation of the foregoing concept will now be set forth in the context of the Irish Tax Revenue Office. It should be noted, however, that the present invention may be implemented in the context of any revenue generating system.

Multi-User Scenario

Mark Morrison is a Registered Tax Agent working in a small practice. He regularly files returns on behalf of the following 6 clients for the tax heads specified below.

| Client | Summary of taxes Mark Morrison (Tax Agent) is registered to file on behalf of clients |
|--------|--------------------------------------------|
| Mary Drury | PAYE-Employer (P30, P35, P45) |
| Stephen O'Donnell | PAYE-Employer (P30, P35, P45) |

-continued

| Client | Summary of taxes Mark Morrison (Tax Agent) is registered to file on behalf of clients |
|---|---|
| Brian O'Connor | PAYE-Employer (P30, P35, P45) |
| Susan Moran | PAYE-Employer (P30, P35, P45) |
| Ann Jacobs | PAYE-Employer (P30, P35, P45) |
| Derek Sheehan | PAYE-Employer (P30, P35, P45) |

Mark wishes to perform the following tasks using the Service of the present invention:
File a form P30 on behalf of Mary Drury
File an amended P35 on behalf of Brian O'Connor
Personal Profile and Current Status of Mark Morrison—Scenario#3

Personal Profile - Agent

| | |
|---|---|
| Name | Mark Morrison |
| Registered Address | 56 Hawthorn Avenue, Clonskeagh, Dublin 14 |
| Contact Telephone No. | 01 8434534 |
| E-mail address | markmorrison@mail.com |
| Clients | Mary Drury |
| | Stephen O'Donnell |
| | Brian O'Connor |
| | Susan Moran |
| | Ann Jacobs |
| | Derek Sheehan |

Personal Profile - Mary Drury (Client)

| | |
|---|---|
| Name | Mary Drury |
| Registered Address | 49 Meadow Hill, Tullach, Co. Galway |
| Contact Telephone No. | 094 2452456 |
| E-mail address | marydrury@mail.com |

Status of Taxes Mark Morrison is Registered to file on behalf of Mary Drury:

PAYE-Employer

| | |
|---|---|
| GCD | 123 |
| Unit | 245 |
| PAYE-Employer Reg. Number | 04866776H |
| PAYE-Employer Start Period | Jan. 6, 1999 |
| PAYE-Employer End Period | N/A |
| PAYE-Employer Returns previously filed | P35: Apr. 6, 1998-Apr. 5, 1999 |
| | P30: Jul. 6, 1999-Aug. 5, 1999 |
| PAYE-Employer Returns issued but not filed | P30: Aug. 6, 1999-Sep. 5, 1999 |
| Agent Name | Mark Morrison |
| Agent Start Date | Jan. 1, 1997 |
| Agent End Date | Dec. 31, 2001 |
| Elected Filing Currency | Punts |
| Direct Debit Payment Details | Sort Code: 93-22-27 Account Number: 003620761 |
| Direct Repayment Bank Details | Sort Code : 93-22-27 Account Number 003620761 |

Personal Profile - Stephen O'Donnell (Client)

| | |
|---|---|
| Name | Stephen O'Donnell |
| Registered Address | 1 Ash Falls, Kinsale, Co. Cork |
| Contact Telephone No. | 021 2147896 |
| E-mail address | Stephenodonnell@mail.com |
| GCD | 218 |
| Unit | 491 |
| PAYE-Employer Reg. Number | 04869320C |
| PAYE-Employer Start Period | Jan. 6, 1999 |
| PAYE-Employer End Period | N/A |
| PAYE-Employer Returns previously filed | None |
| PAYE-Employer Returns issued but not filed | P35L: Apr. 6, 1998-Apr. 5, 1999 |
| Agent Name | Mark Morrison |
| Agent Start Date | Jan. 12, 1996 |
| Agent End Date | Sep. 9, 2000 |
| Elected Filing Currency | Punts |
| Direct Debit Payment Details | Sort Code : 93-25-29 Account Number: 88862076 |
| Direct Repayment Bank Details | Sort Code : 93-25-29 Account Number: 88862076 |

Personal Profile - Brian O'Connor (Client)

| | |
|---|---|
| Name | Brian O'Connor |
| Registered Address | 33 Brookfield Manor, Fermoy, Co. Cork |
| Contact Telephone No. | 021-1236987 |
| E-mail address | brianoconnor@mail.com |

Status of Taxes Mark Morrison is Registered to file on behalf of Brian O'Connor

| | |
|---|---|
| GCD | 12 |
| Unit | 2311 |
| PAYE-Employer Reg. Number | 09640077L |
| PAYE-Employer Start Period | Jan. 6, 1999 |
| PAYE-Employer End Period | N/A |
| PAYE-Employer Returns previously filed | P35: Apr. 6, 1998-Apr. 5, 1999 |
| | P30: Jul. 6, 1999-Aug. 5, 1999 |
| | P30: Aug. 6, 1999-Sep. 5, 1999 |
| PAYE-EMPLOYER Returns issued but not filed | None |
| Agent Name | Mark Morrison |
| Agent Start Date | Jan. 25, 1997 |
| Agent End Date | Dec. 31, 2000 |
| Elected Filing Currency | Punts |
| Direct Debit Payment Details | Sort Code : 93-25-29 Account Number: 03362076 |
| Direct Repayment Bank Details | Sort Code : 93-25-29 Account Number: 03362076 |

Personal Profile - Susan Moran (Client)

| | |
|---|---|
| Name | Susan Moran |
| Registered Address | 8 Williwbrook, Tullamore, Co. Offaly |
| Contact Telephone No. | 076 6702456 |
| E-mail address | susanmoran@mail.com |

Status of Taxes Mark Morrison is Registered to file on behalf of Susan Moran:

| | |
|---|---|
| GCD | 123 |
| Unit | 245 |
| PAYE-Employer Reg. Number | 00011533W |
| PAYE-Employer Start Period | Jan. 6, 1999 |
| PAYE-EMPLOYER End Period | N/A |
| PAYE-EMPLOYER Returns previously filed | P30: Jun. 6, 1999-Jul. 5, 1999 |
| PAYE-EMPLOYER Returns issued but not filed | P30: Jul. 6, 1999-Aug. 5, 1999 |
| Agent Name | Mark Morrison |
| Agent Start Date | Mar. 2, 1997 |
| Agent End Date | May 6, 2000 |
| Elected Filing Currency | Punts |
| Direct Debit Payment Details | Sort Code : 93-22-27 Account Number: 00396209 |
| Direct Repayment Bank Details | Sort Code 92-12-48 Account Number: 00396208 |

-continued

| Personal Profile - Ann Jacobs (Client) | |
|---|---|
| Name | Ann Jacobs |
| Registered Address | 1 Belview, Glenvale, Co. Wicklow |
| Contact Telephone No. | 01-4897853 |
| E-mail address | annjacobs@mail.com |
| Status of Taxes Mark Morrison is Registered to file on behalf of Ann Jacobs: | |
| GCD | 218 |
| Unit | 491 |
| PAYE-Employer Reg. Number | 04531058F |
| PAYE-Employer Start Period | May 1, 1997 |
| PAYE-Employer End Period | Apr. 2, 2001 |
| PAYE-Employer Returns previously filed | P35: Apr. 6, 1999- Apr. 5, 1999 |
| PAYE-Employer Returns issued but not filed | None |
| Agent Name | Mark Morrison |
| Agent Start Date | Jan. 6, 1999 |
| Agent End Date | N/A |
| Elected Filing Currency | Punts |
| Direct Debit Payment Details | Sort Code: 93-25-29 Account Number: 82862076 |
| Direct Repayment Bank Details | Sort Code: 93-25-29 Account Number: 82862076 |
| Personal Profile Derek Sheehan (Client) | |
| Name | Derek Sheehan |
| Registered Address | 21 Beaufield mews, Belfield, Dublin 4 |
| Contact Telephone No. | 01 5642156 |
| E-mail address | Dereksheehan@mail.com |
| Status of Taxes Mark Morrison is Registered to file on behalf of Derek Sheehan: | |
| GCD | 12 |
| Unit | 231 |
| PAYE-Employer Reg. Number | 04850031N |
| PAYE-Employer Start Period | Jan. 6, 1999 |
| PAYE-Employer End Period | N/A |
| PAYE-Employer Returns previously filed | P35: Apr. 6, 1998- Apr. 5, 1999 |
| PAYE-Employer Returns issued but not filed | None |
| Agent Name | Mark Morrison |
| Agent Start Date | Jan. 2, 1997 |
| Agent End Date | Dec. 31, 2002 |
| Elected Filing Currency | Punts |
| Direct Debit Payment Details | N/A |
| Direct Repayment Bank Details | N/A |

The following is a list of the steps involved in scenario 3.

| Guide Step | Functionality |
|---|---|
| A | Enter Revenue On-Line Services |
| B | Selecting Client #1 |
| C | Online Services |
| D | Filing P30 - Client #1 |
| E | Receipt of Payment and Print Option |
| F | Selecting Client #2 |
| G | Online Services |
| H | Filing Amended P35 - Client #2 |
| I | Receipt of payment and Print Option |

Enter Revenue On-Line Services

This step introduces the Home Page of the present invention and demonstrates how a user securely enters Revenue On-Line Services with digital Certificate validation. A valid digital certificate may be held by the user and stored in his/her hard drive or on floppy disk.

If the user wishes to change his/her digital certificate and is not prompted to do so by the browser, log off the network connect to close the session and a prompt will appear.

When entering the secure Online Service page for the first time, the user may click on the link below the tax table to download the files required to create digital signatures.

In order to register the Certificate Authority who signed the digital certificate with the Browser, the user may click on the link provided in the Home page of the present invention.

| Step | Page | Action | Functional Description/Comment |
|---|---|---|---|
| A.1 | Easytax Home (1.0) | View Online Services which are available to the general public without digital certificate verification. | Various Easytax Informational Services are available to the public through the Easytax Home Page. These services include the following: Tax Information Frequently Asked Questions Security Information On-Line Demo Contact Us What's New. The user now wishes to enter the secure Revenue On-Line Services |
| A.2 | Easytax Home (1.0) | Select Enter Online Services. | When the user clicks on Enter Online Services, he may be prompted to select his digital certificate and enter his digital certificate password. |
| A.3 | Easytax Home - Message Box (1.0) | Select Digital Certificate from the list provided | The user may select his/her digital certificate. |
| A.4 | Easytax Home - Message Box (1.0) | Click OK to submit the digital certificate for validation | The user's digital certificate will now be validated. |

-continued

| Step | Page | Action | Functional Description/Comment |
|---|---|---|---|
| A.5 | Easytax Certificate Login | Enter Digital Certificate Password in the box provided. (e.g. easytax) | The user may enter his/her password in order to validate the digital certificate. |
| A.5 | Easytax Home - Message Box | Click OK | The user's digital certificate has been successfully validated. |

Selecting Client #1

At this point Mark selects the client he wishes to act on behalf of within the secure system by clicking on the name. Initially, Mark wishes to enter the system on behalf of Mary Drury.

| Step | Page | Action | Functional Description/Comments |
|---|---|---|---|
| B.1 | Easytax Customer Selection | Select View Customers | The Agent wishes to view a list of all his customers. |
| B.2 | Easytax Customer List | Select 04866776H | The Agent clicks on the customer's registration number in order to enter the secure Easytax System on behalf of the client. |
| B.3 | Easytax Customer List | Click <Submit> | The Agent is brought to the Customer List. |

Services

This step demonstrates the services available to Mark Morrison within the secure site of the present invention, while he is acting on behalf of Mary Drury. Mary's personal details appear at the top of the page, (e.g. Name, VAT Registration Number) as well as the name of the Tax Agent.

The main page lists all the returns for which Mary Drury is registered to file for and which Mark Morrison is entitled to file on behalf of Mary Drury. It can be seen at this point that Mark Morrison is only the representative Agent for PAYE-Employer for Mary Drury. He does not file her VAT returns and as a result cannot access her VAT details at any point in the instant system.

Initially, Mark wishes to file a P30 on behalf of Mary Drury.

| Step | Page | Action | Functional Description/Comments |
|---|---|---|---|
| C.1 | Online Services | Select P30 under File a Return | The Services on offer at this point are personalized to Mary Drury. Mark Morrison, as her Tax Agent has the option to file a return under the tax head PAYE-Employer only. Her Agent will now select to file a return P30 on her behalf. He is brought directly to the on-line form. |

Filing P30—Client #1

Mark Morrison now completes the form P30 on behalf of Mary Drury.

| Step | Page | Action | Functional Description/Comments |
|---|---|---|---|
| D.1 | P30 Return (3.5) | Select Taxation Period Aug. 6$^{th}$, 1999–Sep. 5$^{th}$, 1999 in the drop-down menu | Mark will file the return for Taxation Period Aug. 6$^{th}$, 1999–Sep. 5$^{th}$, 1999. |
| D.2 | P30 Return (3.5) | Select Euro | Mary has previously registered to file P30 in Irish Punts, however now wishes to file in Euros. By highlighting the Euro button, Mark is given the option to file the P30 in Euros. The corresponding symbol appears at the top of the form. |
| D.3 | P30 Return (3.5) | Enter PAYE (e.g. 4000) | Mark enters PRSI Total and tabs to the next field. |
| D.4 | P30 Return (3.5) | Enter PRSI (e.g. 2000) | Mark enters the PRSI Total. |
| D.5 | P30 Return (3.5) | Tab away from Total PRSI Liability | The following total is calculated by the system and appears automatically in the subsequent field: Total (Tax + PRSI): 6000 |

-continued

| Step | Page | Action | Functional Description/Comments |
|---|---|---|---|
| D.6 | P30 Return (3.5) | Enter Total Amount to be deducted from a Bank Account (e.g.: 5000) | Mark now has the option to pay all, part or none of the total due. Mark elects to pay 5000 of the total amount due on behalf of Mary Drury.<br>Mary has set up a Direct Debit mandate with Revenue, therefore her bank details (Sort Code and Account Number) will remain the same. |
| D.7 | P30 Return (3.5) | Select <Next> | When the user clicks on <Next>, he is prompted to enter his digital certificate password.<br>(Note: If the user does not wish to submit the return to Revenue, he can click 'Cancel', which will bring him back to Online Services.) |
| D.8 | Final Confirmation | Click on Digital Certificate Browse button beside the field. | Mark browses for and selects his digital certificate. |
| D.9 | Final Confirmation | Enter Digital Certificate Password (e.g. easytax) | Mark enters his digital certificate password. |
| D.10 | Final Confirmation | Click <Sign and Submit> | By clicking on the 'Sign and Submit' button, the user is digitally signing the complete form and payment instruction which guarantees the integrity of the data transmitted as well as the identification and authentication of the user.<br>The signed package is sent to Revenue and a PRN (Personal Receipt Number) is automatically generated. A receipt containing this number is created and presented to the user which he can save and print. He will also receive a receipt of the submitted return in his CIS inbox. |

Receipt of Payment and Print Option

Mark has now successfully filed a return form P30 and receives a receipt of the successfully filed return. He now has the option to print a hard copy of this receipt or return to the Online Services page.

| Step | Page | Action | Functional Description/Comments |
|---|---|---|---|
| E.1 | PRN Receipt (3.10) | Select <Save As> from the File Menu in the Browser and specify location. | The receipt is saved in the location specified by the user. |
| E.2 | PRN Receipt (3.10) | Select <Print> from the File Menu in the Browser. | A hard copy of the receipt can be printed by the user. |
| E.3 | Online Services (2.0) | Click <Exit> and then OK | Mark clicks Exit to securely terminate Mary Drury's on-line session. |
| E.4 | Exit (2.4) | | He is reassured of a successful termination from the Easytax System and brought directly to the Easytax Home Page |
| E.5 | Exit (2.4) | Click Enter On-line Services | Mark re-enters the Easytax System in order to file another return on behalf of a different client. |

Selecting Client #2

At this point Mark selects the client he wishes to act on behalf of within the secure instant system by clicking on the name. Mark wishes to enter the instant system on behalf of Brian O'Connor.

| Step | Page | Action | Functional Description/Comments |
|---|---|---|---|
| F.1 | Easytax Customer Selection | Enter PAYE Employer under Tax | The Agent wishes to view a list of all his customers. |

| Step | Page | Action | Functional Description/Comments |
|---|---|---|---|
| F.2 | Easytax Customer List | Select 09640077L | The Agent clicks on the customer's registration number in order to enter the secure Easytax system on behalf of the client. |
| F.3 | Easytax Customer List | Click <Submit> | The Agent is brought to the Customer List. |

On-Line Services

This step demonstrates the Online Services available to Mark Morrison within the secure site, while he is acting on behalf of Brian O'Connor. Brian's personal details appear at the top of the page, e.g. Name, VAT Registration Number. The main page lists all the returns for which Brian O'Connor is registered to file for. Mark wishes to file an amended P35 on behalf of Brian O'Connor.

| Step | Page | Action | Functional Description/Comments |
|---|---|---|---|
| G.1 | Online Services | Select P35 under File a Return | The Services on offer at this point are personalized to Brian O'Connor. His Tax Agent has the option to file a return for which Brian is a registered customer with Revenue. His Agent will now select to file an amended return P35 on his behalf. He is brought directly to the on-line form. |

Filing Amended P35—Client #3

Mark wishes to file an amended return P35 for the return of year ended 1999. However, because a return has already been filed for this period, the Agent is not given the opportunity to file another return for the same period. He may file it as a 'Duplicate' return.

| Step | Page | Action | Functional Description/Comments |
|---|---|---|---|
| H.1 | P35 Return (3.3) | Click Duplicate | Mark may click Duplicate in order to access the form in question. |
| H.2 | P35 Return (3.3) | Select 1999 from Taxation Period in the drop-down menu | Mark wishes to make an amendment for to return year ended 1999. The drop-down menu is populated with all valid periods for which P35 returns have been filed. |
| H.3 | P35 Return (3.3) | Check Amendment radio button. | Mark may at this point specify whether the duplicate return is an Amendment or a Supplementary P35 return. |
| H.4 | P35 Return (3.3) | Select IR | Mark has previously registered to file P35 in Irish Punts, therefore Irish Punts appears as the selected radio button. Mark wishes to continue filing in Irish Punts. |
| H.5 | P35 Return (3.3) | Enter Total Tax Liability (M5) (e.g. 4,200) | Mark enters the total tax liability and tabs to the next field. |
| H.6 | P35 Return (3.3) | Enter Total PRSI Liability (S2) (e.g. 2,200) | Mark enters the Total PRSI Liability. Completion of these 2 fields will complete several other form fields shwon on the return and dynamically display the summary fields and payment/repayment fields accordingly. |
| H.7 | P35 Return (3.3) | Enter Tax Already Paid to Collector General (e.g. 1000) Enter PRSI already paid to Collector General (e.g. 200) | The user fills the two fields and tabs to the next field. The following totals are calculated by the system and appear automatically: Balance due to Collector General for Tax: 3800 Balance due to Collector General for PRSI: 2000 Total Due: 5800 (Sum of Tax balance due and PRSI balance due). |
| H.8 | P35 Return (3.3) | Enter FAS Levy if Relevant (e.g.: 0) | The FAS levy is not relevant to Brian O'Connor. |
| H.9 | P35 Return (3.3) | Click <Next> | When the user clicks <Next>, he is brought to a page displaying a summary of all the details on the P35 just completed, showing the direct debit details as set-up with Revenue. |
| H.10 | P35 Return (3.3) | Enter Total Amount to be Paid (e.g.: 5800) | The Agent now has the option to pay all, part or none of the total due. Mark elects to pay the full amount to Revenue on behalf of Brian O'Connor. Brian has set up a Direct Debit mandate with Revenue, therefore his bank details (Sort Code and Account Number) will |

-continued

| Step | Page | Action | Functional Description/Comments |
|---|---|---|---|
| | | | remain the same. |
| H.11 | P35 Summary and Sign | Click on Digital Certificate Browse button beside the field. | Mark browses for and selects his digital certificate and then enters his password. |
| H.12 | P35 Summary and Sign | Enter Digital Certificate Password (e.g. easytax) | He then enters his digital certificate password. |
| H.13 | P35 Summary and Sign | Click <Sign and Submit> | By clicking on the 'Sign and Submit' button, the user is digitally signing the completed form which guarantees the integrity of the data transmitted as well as the identification and authentication of the user. The signed package is sent to Revenue and a PRN (Personal Receipt Number) is automatically generated. A receipt containing this number is created and presented to the user which he can print. He will also receive a receipt of the submitted return in his CIS inbox. |

Receipt of Payment and Print Option

Mark has now successfully filed the amended return form P35 and received a receipt of the successfully filed return. He now has the option to Print a hard copy of this receipt or return to the services page.

| Step | Page | Action | Functional Description/Comments |
|---|---|---|---|
| I.1 | PRN Receipt (3.10) | Select <Save As> from the File Menu in the Browser and specify location. | The receipt is saved in the location specified by the user. |
| I.2 | PRN Receipt (3.10) | Select <Print> from the File Menu in the Browser. | A hard copy of the receipt can be printed by the user. |
| I.3 | PRN Receipt (3.10) | Click Go to Customer Information Services | Mark is brought back to Brian O'Connor's Customer Information Services page. |
| I.4 | Online Services (2.0) | Click <Exit> and then OK | Mark clicks <Exit> to securely terminate Brian O'Connor's on-line session. |
| I.5 | Exit (2.4) | | He is reassured of a successful termination from the secure Easytax System and brought directly to the Easytax Home Page |

The following description sets forth an overall description of one embodiment of the present invention which meets the requirements of the Revenue Office. It should be noted, however, that the present invention may be implemented for any type of revenue generating system, i.e. IRS.

The proposed ROS system is based on a solution customized to meet Revenue's specific ROS requirements. The present invention is a comprehensive solution for Revenue Agencies who want to provide services on-line to their customers. The present invention is essentially a pre-built solution which includes:

Electronic filing of tax returns for multiple taxes
  Electronic payment of tax liabilities (by direct debit)
A comprehensive customer information system for citizens, businesses and their agents on the status of their tax affairs with Revenue.

The present invention was built to provide Revenue Agencies with a comprehensive off the shelf on-line system. The present invention recognizes the importance of speed to many Revenue Agencies implementing on-line services. The system has been specifically designed to enable Revenue Agencies to rapidly go on-line. It is also designed to enable easy interfacing with the existing systemsOn-line services are of strategic importance to Revenue Agencies. The instant architecture is built using the current 'best of breed' components. However, it has been specifically designed to cater for the continuing evolution of internet technologies. The design supports the easy replacement of individual components of the architecture as required.

Figure 17:
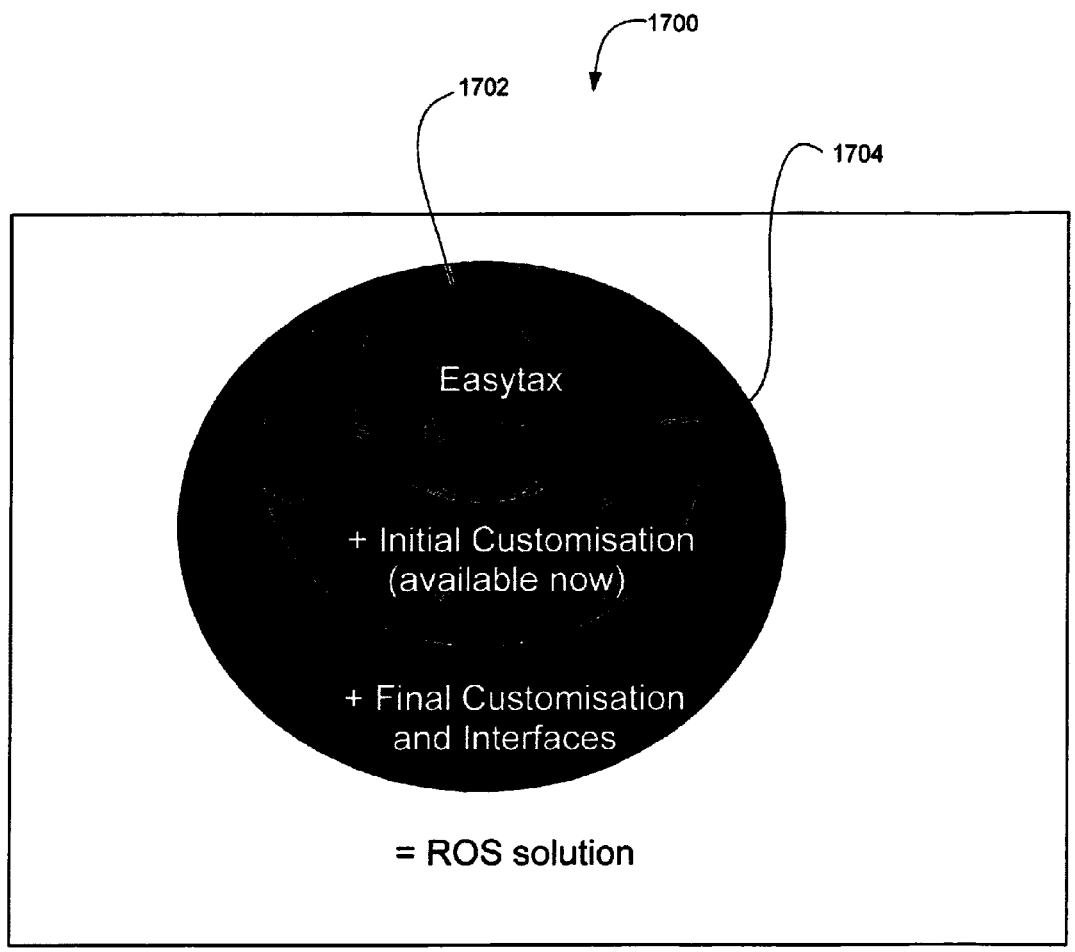
FIG. 17 illustrates a diagram delineating the evolution of the present invention.

FIG. 17 illustrates a diagram delineating the evolution 1700 of the present invention. The core principles 1702 of the present invention have been developed to support Revenue's specific requirements based on the understanding of these requirements as specified in the ROS RFT. Customization 1704 may be avoided where there are fundamental usability design issues that require an input (e.g. VAT RTD, P35L and the employee access control system).

Terminology

In preparing this response the terms 'ROS' (Revenue On-line Services), the 'ROS solution' and 'the solution' are used to describe the ROS system proposed to deliver to fulfill this tender.

Phase 1 and Phase 2 Customization

Phase 1 of ROS development requirements:
Ensure the ROS front end reflects the outcome of the Revenue website redesign work being performed by Interact
Build the required interfaces with Revenue legacy application systems
Implement the access control system for company or tax agent employees
Cater for offsetting
Deal with filing of VAT RTDs (the VAT RTD forms are currently being redesigned in the course of ongoing development work on Revenue's Integrated Taxation Processing (ITP) system)
Deal with filing of P35Ls (this function may be best fulfilled by developing an off-line batching system similar to the P45 requirement).
Implement Irish language forms.

Overview of Proposed Functionality of the Solution

The proposed solution comprehensively addresses the functional requirements The ROS system proposed is a comprehensive solution for both customers and agents wishing to conduct business with Revenue on-line. Customers and their agents may file returns, make payments on-line by direct debit and avail of a comprehensive on-line customer information service.

Overview

Figure 18:
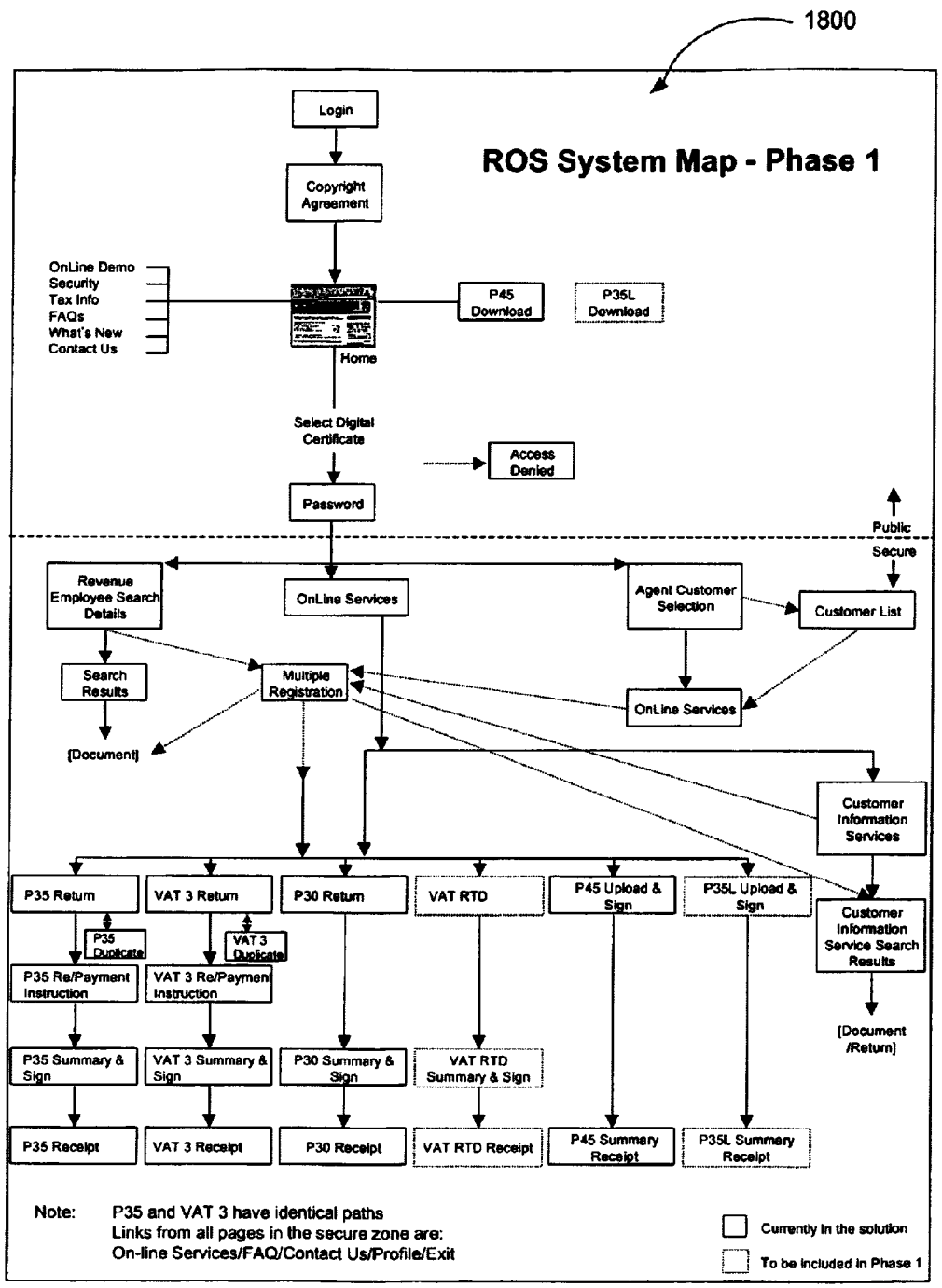
FIG. 18 is a schematic diagram shows the current 'ROS System Map' for the proposed solution—i.e. the different web pages which comprise the proposed ROS front end and the links between them.

FIG. 18 is a schematic diagram shows the current 'ROS System Map' 1800 for the proposed solution—i.e. the different web pages which comprise the proposed ROS front end and the links between them. The map identifies those components that are available now for evaluation. It also outlines where the remaining option parts of the solution fit.
VAT 3, P30, P35 and P45 returns
Agents
Customers with single and multiple registrations in one tax head.
Revenue users.

Security is a critical requirement for the ROS system. ROS involves new use of the internet to transact Revenue's core business, with all the consequent concerns about security and confidentiality of Revenue and customer information. Customers and Revenue may be able to trust the solution. The proposed ROS solution is secure. Access to ROS services on the ROS site is by means of digital certificate only. Messages are fully encrypted. The ROS database is separate and distinct from the core tax processing databases. A full audit trail is retained of transactions on the system.

The Proposed Technology

ROS has been developed to be accessible from a broad range of technical platforms. Key features of the technology which underlies the proposed ROS system are its:
Openness
Flexibility
Scalability
Reliability
Usability.

With reference again to FIG. 2, the various components thereof may be described in greater detail.

Client Architecture

Pages are displayed on the client side using HTML. The use of this well proven technology minimizes the potential customer support overhead for the on-line system. In addition, the .pdf format is used for documents received from the existing Revenue processing systems. The .pdf format is readable using Adobe Acrobat Reader. Adobe Acrobat Reader comes as standard on the typical computer. The Adobe Acrobat Reader is also available free on the web. The Baltimore toolkit, J/PKI-Plus is used to attach the customer's digital signature to returns being filed. This feature ensures the security of returns whether they are entered on-line or off-line.

Server Architecture

Server software has been built with Java technology. This enables the server to be deployed on many different platforms. The ROS application code has been developed using Java Server Pages and Enterprise Java Beans (EJBs). These run with BEA's WebLogic Server.

Technical Overview

BEA WebLogic Server is an application server. Application servers are deployed by businesses critical, transaction based services on the web. The application server provides scalability and high availability. Typically, the application server distributes application processing across a cluster of servers to ensure optimal resource utilization and to support failover. The application server also minimizes the number of connections required to the database by sharing connections across multiple services. The application may be dynamically scaled (i.e. CPU's may be added to the hardware configuration without impacting the application code). The application server automatically balances the processing load across the available cluster.

The ROS Enterprise Java Beans (EJBs) are currently coded to operate with both Oracle and Ingres databases using JDBC drivers.

In implementing the ROS solution, Revenue may opt to use an alternative application server product. Assuming the application server supports EJBs, the effort required to replace the WebLogic Server is not significant. However, should the chosen server not support EJB technology, rework may be used to integrate the components of the new architecture and to re-write the application code that has been pre-built.

WebLogic Server was selected as the application server for the present invention because of it's capability to scale and the fact that it is the only application server currently available with a proven ability to operate in a clustered environment. A clustered configuration is typically used for critical transaction based systems such as ROS. In addition, WebLogic Server, unlike some other application servers, does not restrict the choice of webserver.

The Solution is Adaptable

The entire ROS technical architecture has been designed to enable the solution to adopt new technology as internet technology evolves. However, it is believed that the proposed solution components reflect the best combination currently available.

The ROS technical architecture is designed to be flexible—it does not prescribe for Revenue the particular architecture components which may be used.

Different architecture components may be easily 'plugged in' or 'plugged out'. For example, on the client side, the return filing components, currently operating in HTML, may be easily replaced with custom form software (e.g. Jetforms or UWI) if such customization is required.

The system itself is built using platform independent components. This solution may be based on either a UNIX or an NT environment. In addition, the ROS solution does not impose restrictions on the choice of web server or the firewall.

The Solution is Scalable

Revenue's stated long term target for ROS is that 50% of tax returns may be filed using the ROS system. Internet applications by their nature have an unpredictable user population size. This is unlike traditional in-house systems where the user population is predictable. The unpredictable nature of the user base makes it essential that core business web applications can easily scale if demand suddenly increases. It is vital that the ROS solution is easily scalable by operations staff to enable one to achieve this goal. The present solution has been designed with scalability in mind—this is the key reason why an application server has been chosen to support ROS.

WebLogic server has a proven capability to support high volume processing. It is an industrial strength application server for high volume transaction processing websites (e.g. Amazon.com, Schwab.com, etc.). It includes built-in load balancing features to support peak processing requirements.

The Solution is Reliable

The WebLogic application server underpins the reliability of the proposed ROS solution based on the present invention. WebLogic unlike other web servers runs on a clustered configuration. This makes it possible to build redundancy into the technical architecture, effectively preventing unscheduled downtime.

Overview of ROS Interfaces

The ROS system has been built to make interfacing easy. The ROS database is designed to be consistent with the well established integrated approach of Revenue's ITP database. The database is, however, separate and distinct from the core Revenue processing systems.

The approach to the interfaces draws on the deep understanding of the core Revenue systems. The ROS database closely mirrors the existing ITP database. Wherever possible, ROS data is held using the same structures and format as ITP data. This approach has significant benefits which become even more apparent in the future when the Income Tax and Corporation Tax systems are within ITP. Benefits include the following:

The interface code is straightforward to develop and test.
Performance is optimized as the interface involves no reformatting of data.
The extract from ITP is a series of table copy statements. Table copy statements are a highly efficient means of moving data from one database to another.
ITP code may be re-used for ROS services, cutting down the development and maintenance requirements.

By choosing to implement ROS, Revenue will significantly reduce the risks attached to interface design, development and delivery.

Interfaces to ROS

As outlined in the RFT, the key interface from the existing tax processing systems to ROS is a regular (typically nightly) update. The interfaces for ROS may be built in 2 phases in line with overall project plan.

The key Phase 1 interfaces to ROS are customer registration details and returns issue activity. The phase 1 interfaces also include documents requested by customers using ROS and outputs automatically issued for ROS Customer Information Services (CIS).

Phase 2 interfaces to ROS include additional financial information to support the enhanced CIS available in Phase 2.

Interfaces from ROS

Interfaces from ROS to the existing Revenue systems contain returns details, payment details, ROS registration information and requests for statements. The extracts to different systems are independent. The ROS extracts specifically format the payments and returns data to match the normal input formats for the payments and returns reception systems in the existing Revenue systems.

Figure 18A:
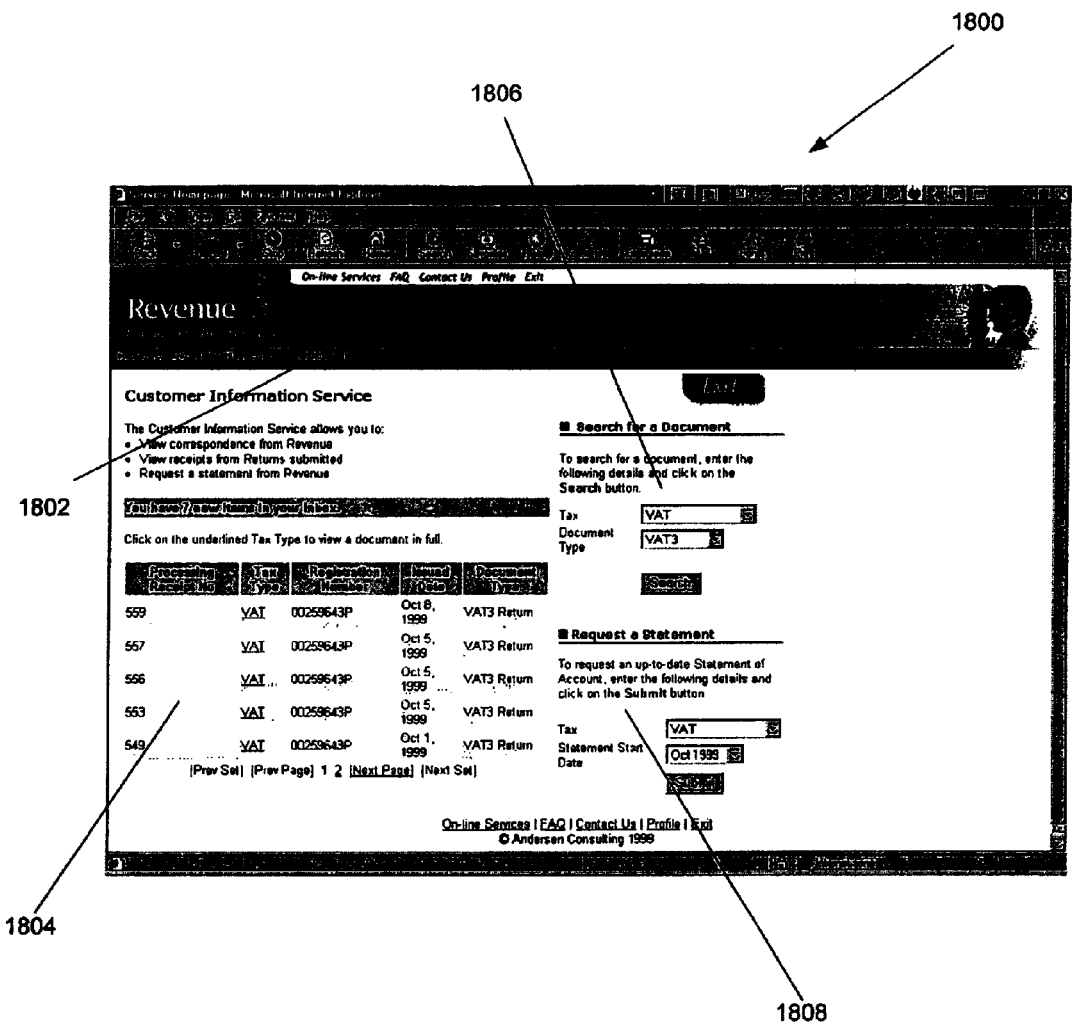
FIG. 18A illustrates a Customer Information Services Inbox page in accordance with one embodiment of the present invention.

FIG. 18A illustrates a Customer Information Services Inbox page 1800 in accordance with one embodiment of the present invention. The screen may be personalized for each user and will follow the standard template used for all pages. As part of the preprocessing for the page the customer name is retrieved as a variable from the session and displayed at the top of the page. The customer number 1802 may also be displayed in the page banner and this too may be retrieved from the session.

The page displays how many new items 1804 the user has in their Inbox. Below this the new items are displayed and sorted according to date of issue, with the most recent first. The contents of the Inbox are displayed in the following format: Processing Receipt Number, Tax Type, Registration Number, Issue Date, Document type and Start date.

On the right of the page a search facility 1806 is provided for the user to search the archive for a particular documents. A request facility 1808 is also provided on the Customer Information Services Inbox page to allow the customer to request a statement of account. An image (exit.gif), positioned in the top right of all the screens in the secure section of the site is the constant link enabling the user to exit the secure area successfully at any time.

Figure 18B:
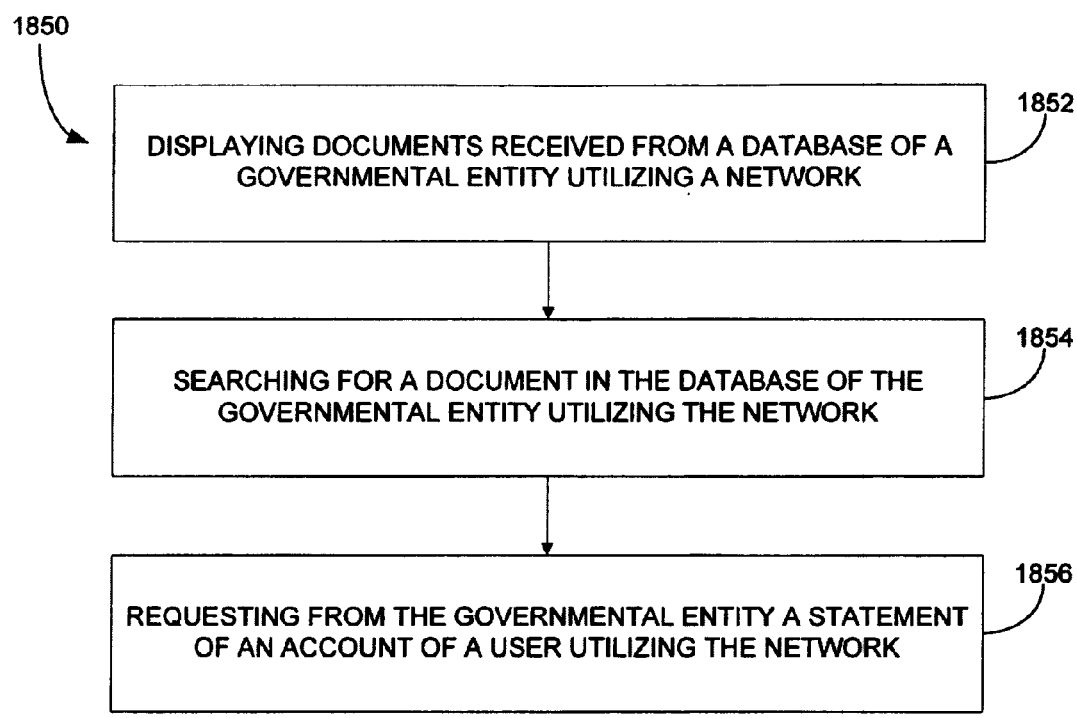
FIG. 18B is a flowchart illustrating a method for affording a network-based tax service database interface, as set forth in FIG. 18A.

FIG. 18B is a flowchart illustrating a method 1850 for affording a graphical user interface, as set forth in FIG. 18A. First, in operation 1852, documents received from a database of a governmental entity are displayed utilizing a network. Further, searching is permitted for a document in the database of the governmental entity utilizing the network. See operation 1854. Still yet, in operation 1856, a statement of an account of a user may be requested from the governmental entity utilizing the network.

In one embodiment of the present invention, the graphical user interface may be displayed upon verification of an identity of a user. Further, the documents may displayed in a list, and be completely displayed upon the selection thereof.

In another embodiment of the present invention, the documents may be searched based on the selection of a type of tax and a type of document. Further, the type of tax and the type of document may each be selected via a pull down menu. As an option, the statement may be requested based on the selection of a type of tax and a start date of the document. The type of tax and the start date of the document may each be selected via a pull down menu. Further specifications regarding the graphical user interface of FIG. 18A will now be set forth.

Page Specifications

| | |
|---|---|
| Page Description | Displays to the user all the functions available in the Easytax Customer Information Service |
| | A list of all unread Easytax documents relating to the user is displayed in the main body of the page |
| | At the top right of the screen is a search section where the user can search for an Easytax document. The user may enter Tax, Document Type criteria to initiate the search. |
| | Below this is an area where the user can Request a Statement of Account from Revenue. The user may enter Tax and Statement Start Date to order a request. |
| Pages Linked To | Easytax Services homepage |
| | FAQ |
| | Profile |
| | Contact Us |
| | View Receipt/Statement of Account |
| | Customer Information Services Search Results |
| | Statement of Account Request Confirmation |
| | Exit |

-continued

| | |
|---|---|
| Pages Linked From | Easytax Services homepage Customer Information Services Search Results |
| Level of Authentication | Easytax Users with a valid digital certificate |
| Assumptions | No field validation as all the combo boxes are dynamically filled |
| Pre-Processing | Display customer name using name session variable "CustomerName" Display the customer number using the session variable "CustomerNumber" |
| Post-Processing | It is recommended to use server-side validation on the submit |
| Parameters In | Customer Name Registration Number List of all new items pertaining to the user Tax Heads for which the customer is registered for in order to populate list-boxes Document Types available within each Tax Type |
| Parameters Out | Search : Tax head Search : Document Type Request : Tax Type Request : Statement Start Date |
| Database Services | GetCustDocs( ), GetPage( ), GetITPFormsData( ), GetPAYEFormsData( ), UpdateReadFlags( ), InsertRequest( ), SearchCUSTOMER INFORMATION SERVICESArchive( ), GetITPFormData( ) |

Page Detail
The Revenue Agency Logo within Banner
Tabs on the banner include the following links:
Services
FAQ
Profile
Contact Us
Exit
Brief introduction to this screen.
Users name and customer number appear at top of screen
Three areas on this screen:
New Items
Search for particular documents
Request Statement of Account
New Items: This forms the main content of the page. All new items are displayed listing the Processing Receipt Number, Tax Type, Registration number, Issue Date, Document Type. Text may be displayed at the top informing the user as to how many new items are in the Inbox. This uses the method GetCustInbox( ) passing IdInternal to retrieve the number of new items. The text will read as follows, "You have <% GetCustInbox( )%> new items".

The list of new items may be displayed using the GetCustDocs( ) service.

Search for particular documents: This facility allows the user to search for particular documents. The user can select the type of tax from a drop down list box. Only the taxes for which the customer is registered should be displayed in the list box. The document types pertaining to these Tax Types can also be selected from a drop down list box. Upon clicking on the search button, a call is made to searchCISArchive( ) which will retrieve all documents in the archive that match the criteria entered.

Request a Statement of Account: This facility allows the user to request a statement of account. The user can select the type of tax from a drop down list box. Only the tax heads relevant to the user are displayed in the list box. The Statement Start Date should be displayed in the second list-box.

Page Elements

| Element Name | Element Description | Type | Value | Validation | Properties |
|---|---|---|---|---|---|
| EasyTaxBanner | Online Services Banner | Jpeg | N/A | N/A | Contains hyperlinks to options displayed |
| ExitGif | Link to Exit Online Services securely | Gif | N/A | N/A | Hyperlink |
| NumDocs | Number of new items in the Inbox | Numeric Maxlength = 3 | GetCustInbox( ) | Protected numeric field. Should be an integer. | N/A |
| DcTypeAcct | Tax head of all new items | Text Maxlength = 10 | Populated from Database GetCustDocs( ) | Protected text field | Protected |
| IdEntity | Registration number of all new items | Numeric Maxlength = 14 | GetCustDocs( ) | Protected text field | Protected Hyperlink to the relevant document |
| DtIssued | Date of issue for all new items | Integer Maxlength = 8 | Populated from Database GetCustDocs( ) | Protected numeric field. Should be an integer. If validation code returns an error display message 5 from the table messages. | Protected |
| DcTypeForm | Document type for all new items | Text Maxlength = 25 | Populated from Database GetCustDocs( ) | Protected text field. Should be text only. | Protected Hyperlink to the relevant document |
| DtPdAcctBegin/ DtSubPdBegin | Start date for all new items. If | Text Maxlength = | Populated from | Protected text field. Should be text only. | Protected |

-continued

| Element Name | Element Description | Type | Value | Validation | Properties |
|---|---|---|---|---|---|
| | DtSubPdBegin is 0, display DtPdAcctBegin. Else display DtSubPdBegin | 8 | Database GetCustDocs( ) | | |
| N_CdTypeAcct_2 | Drop Down Box containing list of Tax Heads user is registered for | Drop Down List Box | Populated from Database | Only list Taxes for which user is registered Required: User may select a Tax in order to Search | Mandatory and protected Defaults to VAT if customer is registered for this tax head. Else display CT first or IT followed by PAYE-Emp. |
| SdocType (N_CdTypeForm_2) | Drop down list box containing list of all documents the user can order for the tax Selected above | Drop Down List Box | Populated based upon tax head selected. | Required: User may select a document type in order to Search | Mandatory and protected defaults to the most recent document received for the displayed tax head. |
| Search | Archive Search submit button | Submit | Search | OnClick( ) Verify that user has selected values in ShTax and Sdoctype drop down list boxes | Posts data to the server for validation. If all data is valid then display Customer Information ServicesResults page. |
| S_tax | Drop Down Box containing list of Tax Heads user is registered for | Drop Down List Box | Populated from Database | Only list Taxes user is registered for Required: User may select a Tax in order to Request Statement | Mandatory and protected Defaults to VAT |
| S_startD | Drop Down Box containing months and years | Drop Down List Box | Populated from Database | Required: User may select a Start Date in order to Request Statement | Mandatory and protected. Displays all start dates in month and year for the previous two years in the format January -- 1998 All dates are to be hard coded into the list box. |
| Submit | Request Statement Submit Button | Submit | Submit | OnClick( ) Verify that user has selected values in RTax and RStartD drop down list boxes. Perform call to InsertRequest( ) passing request parameters. | Posts data to the server for validation. |

CAR (Click, Action, Response) Diagram

| Page Component | Action | Response | Function/API |
|---|---|---|---|
| Easytax Banner | OnClick | Open the Relevant page | Gif image containing hyperlinks |
| Exit Gif image | OnClick | Brings user to Easytax Exit page, open Exit.jsp | End session and kill session bean. All session variables may be deleted. |
| DocType hyperlink | OnClick | Open the relevant document | Hyperlink |
| Search | OnClick | Open Customer Information Services Search Results page | Post data to server for validation. If there are no errors data is passed to the results page. |
| Submit | OnClick | Open Request Statement Receipt page | Post data to server for validation. If there are no errors display a confirmation message box. If multiple registrations exist then the user may be brought to the multiple registration page. On selecting a registration the confirmation message box is displayed and the user is returned to the page Customer Information SResults.jsp |

Process Flow

1. Determine New Entries in InBox

A message appears on the Customer Information Services page informing the customer of the number of new messages in his personal Inbox. In order to populate the field NoNewDocs which will hold the number of new documents, the service GetInBox is called passing the IdInternal. This will return NumDocs which will hold the number of unread documents stored on TBDOCS for the IdInternal.

i.e. GetCustInbox(IdInternal)

2. Determine Tax heads for ListBox

The SelectTax list-box may be populated with the taxes for which the customer is registered. This has already been determined using GetCustReg, the list-box may be populated based on the result of GetCustReg.

3. Determine Document Types

The documents displayed in the list-box should be dependent upon the taxes for which the customer is registered. The taxes are already known from the call to GetRegNo( ) performed when the session was first created. Using this, perform a call to CTDOCU to determine the documents pertaining to these taxes.

i.e. LookupCtdocu(CdTypeAcct).

4. Determine Statement Starting Dates

The StartDate list-box is populated with hard-coded Month/Year combinations dating back 2 years. Therefore, this list-box is filled with dates ranging from 'April 1998' to 'April 2000'.

5. Retrieve New Documents

The details of new documents in a user's Inbox should be displayed on the page. These details are retrieved using GetCustDocs( ) passing IdInternal.

This service will return all details to be displayed on the page.

6. Submit Statement Request

Once the mandatory fields have been filled, the user may submit a request for a Statement of Account. Clicking the Submit button will invoke a call to InsertRequest. This will insert the Request details to the database table TBSOAREQ. The following parameters may be passed to InsertRequest:

i.e.InsertRequest(IdInternal, CdTypeAcct, IdTypeSeq, DtPdAcctBegin, DtPdAcctBeginUntil, CdStmntType, DtRequest)

In order to determine the IdTypeSeq, perform a call to GetRegNo—passing IdInternal, CdTypeAcct (equal to what user selected in list-box) and InHeader (='N'). If multiple registration numbers are returned, the user should be brought to the multiple registration screen where the user may select a single registration. If a single registration is retrieved, then pass the retrieved IdTypeSeq to insertRequest.

CdStmntType should be defaulted to the code for a long statement as this is the type decided upon as the default for the present invention.

DtPdAcctBegin and DtPdAcctBeginUntil will need to be determined based upon the Start Date entered by the user and the current date, 7. Retrieve Previously Filed Returns If a user opts to view a previously filed return, this may be dynamically generated using data from the database. Firstly a 'template' page should be retrieved. This is determined using GetPage( ). Once the id of the page is determined, this may be called. The page may be populated based on data stored on TBFORMS.

8. Retrieve Data with which to Populate Form

Once the page id has been determined, the data with which to populate the page may be retrieved. This is achieved using GetITPFormData( ) passing the IdPrn. The retrieved row should be passed to the page determined in step 7.

Search Archive

The page offers the user the facility to search the Inbox archive in order to view previously filed returns. The search may be performed using Search Customer Information ServicesArchive passing IdInternal, CdTypeAcct and CdTypeForm.

The results of this service may be displayed on the Customer Information Services Search Results page.

General System Requirements

ROS is an easy, informative, reliable, attractive and stable system. The system is simple to understand and follow. With a single click, a customer accessing ROS, equipped with a digital certificate, reaches the services page. This offers a customized choice of returns to file, information on any new correspondence received from Revenue and the ability to immediately request a Statement of Account.

ROS is informative. Familiar terms and codes are used throughout the system. An on-line demo is available taking the customer on a tour of the main functions. A frequently asked questions button is always within reach. Information icons which offer immediate help on filling the fields on a form are also provided.

ROS has been architected with proven web technology. It relies on the proven stability of HTML to provide the customer interface. Scalability and strength are provided by the use of a proven application web server, BEA WebLogic server. WebLogic server is the engine that drives almost all the well known and established high volume transaction processing sites (e.g. Amazon.com, Compaq).

ROS is attractive to use. Filling in forms on ROS is easy and quick. The layout of the forms is clear and uncluttered.

Customers are only offered valid periods in which to file. RSI numbers validation and other validation occurs when the user populates the field. Name and address fields are pre-filled.

ROS has been designed using the principles underlying the integrated tax solutions that have been applied throughout the world. Designing one system to cater for multiple taxes ensures the overall stability of the system. New taxes and new forms may be added without upsetting the underlying look and feel of the system. Menus are dynamic. Key screens are carefully designed to be applicable to multiple taxes.

ROS is Revenue's On-Line Service for the future. ROS is therefore specifically architected in the knowledge that web technology has evolved rapidly and will continue to do so. Therefore, the underlying technical components, including the front end, the application server and the database in the system may be upgraded or indeed replaced. Even the operating system on which ROS runs may be changed. Customers with a browser capable of supporting digital certificates, regardless of their hardware platform may access and use ROS. Browsers supporting digital signatures include:

Internet Explorer 4.01 and beyond
Netscape Communication 4.5 and beyond.

Macintosh users may use a Netscape browser as Internet Explorer for Macintosh does not support digital certificates.

Customer Front-End Design Attributes

Ease of Use

ROS is easy to use. The system is intuitive. It is menu driven and offers the customer help at all times. It uses familiar terms and codes. The layout of forms is clear and uncluttered. Navigation throughout the system is obvious. Customers are never in doubt as to where they can go. Customers can move through the system with confidence. No transactions are completed without the customer being requested to confirm the transaction.

The usability testing of the solution developed to date confirms that the system is intuitive and self-explanatory.

Users may work on-line or off-line when filling in more complex forms. Users may batch the forms they complete off-line and submit multiple forms at once.

ROS provides off-line customers with alternative approaches to filling in complex forms off-line. The present invention recognizes the distinct requirements of both the professional tax agent who files multiple returns and the customer who files once a year on his own behalf.

The P45 form is available off-line for the customer to complete.

The design of this form is appropriate for the customer familiar with the traditional paper P45. The form looks and feels familiar. Key fields are validated as the user completes the form.

The more complex ROS forms (Form 11, CT1) have different user constituencies and therefore may offer the user flexibility in completing the form.

The Form 11 may also be adopted. The approach enables the customer and tax agents to navigate rapidly through the form while also providing new views of the data on the return (e.g. a single view summarizing all sections of the form).

The approach offered enables the Form 11 and CT1 to be downloaded and to run on all the common platforms, operating systems and web browsers. The P45 form built for ROS Phase 1 demonstrates this flexibility.

Stable and Consistent Design

ROS is an on-line integrated tax system. The same design principles that apply to building integrated tax systems for internal Revenue users apply in developing ROS. this systems is designed to be easily extensible for new taxes and forms. They are parameter driven to enable the fast customization of forms required to meet budget revision targets.

Using expertise in this area ensures that ROS is a stable system. The ROS menus are dynamic where appropriate. The key ROS screens are designed to be generic across multiple taxes and to support new taxes and new tax forms.

The ROS design is also consistent. The style of the site is based on the Revenue corporate colors and style guide.

ROS is built to satisfy a broad constituency of user hardware. In order to support various platforms, design principles have been adopted which ensure that the ROS web page offers a consistent view to users across the full spectrum of screen resolutions from 640×480 up.

Access to Services

The ROS home page identifies the services offered by ROS and offers the customer access to all the services specified. The home page includes:

access to the secure services page
information on security and digital signatures
frequently asked questions
what's new contact details.

The services page is secure and may only be accessed by customers with an approved digital certificate. The services offered are:

filing (any ROS tax for which the customer is registered)
customer information services
statement of account request.

Revenue Corporate Image and Style

ROS adheres to Revenue's corporate image and standards. The new corporate style guidelines for the web due in December will dictate the ultimate style of the site. One of the members of the team is Interact. They will provide design input to ensure ROS is compliant with the Revenue site standard that they are currently defining.

On-Line Tutorials and Help

ROS offers help on a number of levels:

An on-line demonstration of the ROS screens is available at all times to the customer
Frequently asked questions are available on both the ROS home page explaining the service and within ROS assisting the customer in using the services
Field specific help is available in filling in forms through the use of the information icon.

The present invention extends the help currently provided with ROS to support the remaining functions. In addition, work may be done to amend the current help texts where required.

Menu Driven System

ROS is a menu driven system. ROS has been designed to make extensive use of links in line with best practice web interface design.

As commonly found in web applications, ROS also includes many different approaches to linking. These include the following:

Tab bars at the top of the page
Icons to enable the user to enter/exit ROS at all times
Hyper-links are provided to further information
Traditional lists.

The services page, multiple registration page and the agents customer list pages are examples of linkage provided through traditional lists. The lists are dynamic and are tailored specifically for the customer (or agent) accessing the system. They are extensible to cater for new taxes, new registrations within a customer, new customers for an agent and new forms.

In addition the customer has the facility to use the standard back and forward buttons on the browser.

Error Handling

ROS is error tolerant and offers clear explanations on how to fix problems. Field validation takes place wherever possible before the customer leaves a field. Therefore the customer can immediately correct a field level error.

Application errors (e.g. access denied if a customer does not have a valid digital certificate) are reported clearly to the user.

System level errors (e.g. the central ROS server is not reachable) are also reported clearly to the customer.

Required Equipment

ROS customers may use a broad range of equipment. One may have specified that customers may use digital certificates ROS supports the browsers that provide this functionality. These include:

Microsoft Internet Explorer 4.01 and above

Netscape Communicator 4.x and above

Netscape Communicator Professional Edition 4.x and above.

ROS therefore can run on over 92% of browsers in use worldwide according to the current industry estimates on browser coverage. Macintosh users may use a Netscape browser as the Internet Explorer version for Macintosh does not support digital signatures.

The customer may choose to operate on a Windows, Macintosh or UNIX platform. An open choice of customer platforms is particularly important for ROS as Macintosh technology has achieved a small but still significant penetration of the Irish SME market. Macintosh platforms are also manufactured in Ireland.

The system has been specifically designed to cater for the full spectrum of screen resolutions from 640×480 up.

Feedback to Users

Users are continuously reassured when using ROS. No transaction is submitted without offering the customer the opportunity to confirm what has just been entered.

ROS transactions are atomic. This means that a ROS business transaction is completed in one update of the database. Therefore transactions are not stored in an incomplete state of the database. ROS confirms to the user that a transaction has been completed. Therefore users are in no doubt about their current progress.

The off-line applications supporting complex forms will include a system map icon showing the user the progress that has been made towards completing the form.

Transaction Handling and Cancellation

Every ROS window includes an exit button to exit the secure area and return to the home page. ROS business transactions are written to the database with a single click. The system does not write partially completed transactions to the database. Customers exiting the system therefore do not have the potential to abandon a transaction causing a loss of data or corruption or loss of system integrity.

Return windows have a cancel button in addition to the exit button. The cancel button returns the user to the main services page (within the secure area).

Revenue Internet Site

ROS resides within the Revenue internet site and complies with the site standards and guidelines.

Health and Safety Requirement

The present invention confirms that the current health and safety standards and legislation may be complied with in connection with the system.

Euro

Forms in Euro and IR£ Formats

Return forms are provided in both Euro and IR£ formats. ROS identifies the currency format required based on the customer's ROS record, which is a copy of their Common Registration System (CRS) record. The currency displayed at any time is clearly identified.

Choice of Currencies for Viewing

Figure 19:
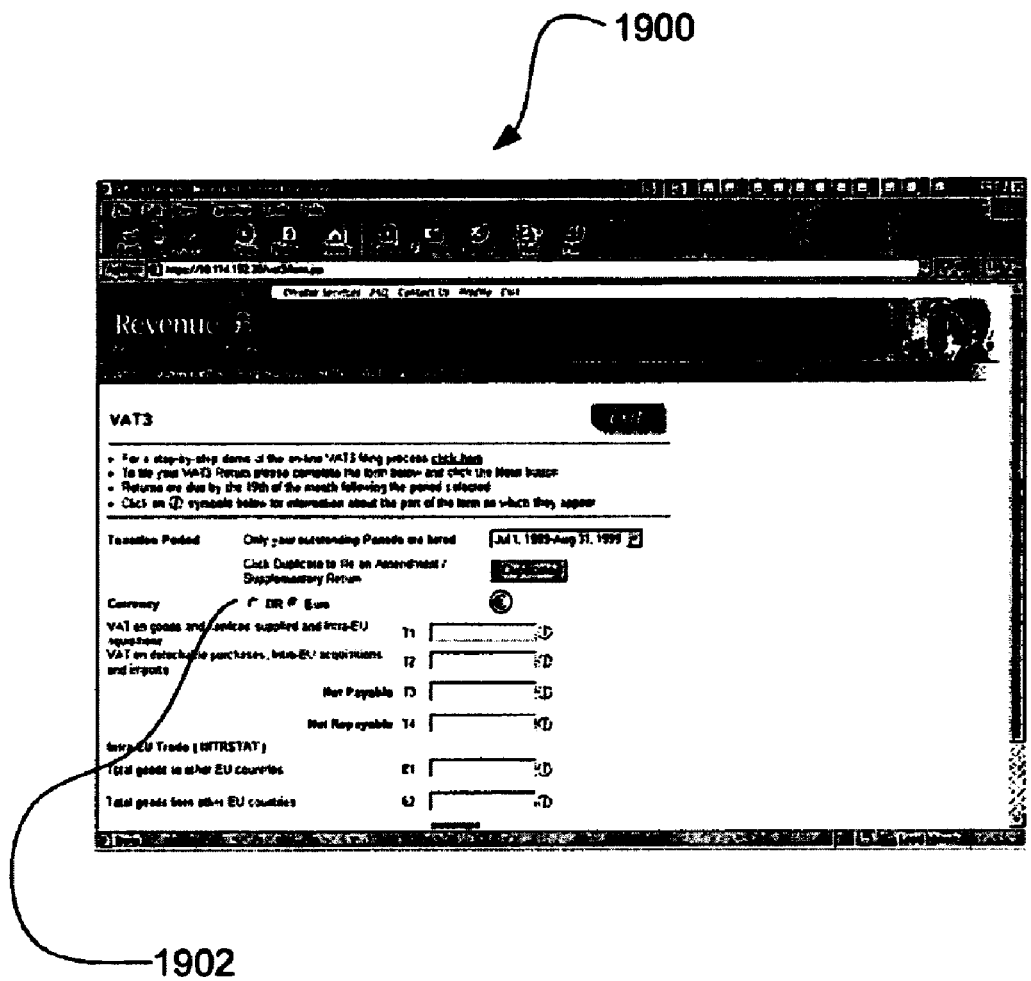
FIG. 19 illustrates an interface including the radio buttons used by ROS to allow a customer toggle between Euro and IRE currencies.

ROS pages which can contain monetary amounts include a 'radio button' which allows the user to 'toggle' or switch view between the Euro and IR£ currencies. Forms which the customer has already filed and which they are now accessing through the ROS Customer Information Services are displayed to the customer in the format and currency in which they were submitted. FIG. 19 illustrates an interface 1900 including the radio buttons 1902 used by ROS to allow a customer toggle between Euro and IR£ currencies.

Irish Language

Irish Language Forms

The ROS system supports the production of tax forms in the English and Irish languages. Two separate versions of each tax form are provided. Phase 1 of ROS provides both English and Irish language versions of the VAT 3, VAT RTD, P30 and P35 forms—the forms a customer can currently receive in Irish. When the user selects one of these forms for completion, the ROS system checks the customer's ROS record to determine whether the customer has indicated a preference for receiving tax return forms in Irish. The customer is presented with the Irish version of the form for completion, if they have expressed a preference for Irish. ROS includes an architecture service to support multiple languages.

Performance

Response Times

The ROS system is designed to support Revenue's requirement for rapid response times. Clearly a number of the components outside the scope of this tender including the choice of hardware, operating system, web server and firewalls will influence performance.

The choice of application server is particularly important in ensuring performance. The current ROS solution is built using WebLogic Server as the application server. This server offers superior performance primarily because of its ability to scale without impacting the application. WebLogic has recently been benchmarked by BEA against it's competitors. It produced performance figures over 4 times better than it's nearest competitor. It also minimizes both client and database connections. This assists the performance of the underlying hardware and the database.

For transactions which may take more than a few seconds (i.e. those which send a large volume of information between the customer front end and the ROS server) ROS provides a 'countdown' mechanism which displays to the user the percentage of the transaction completed. ROS may be performance tested in the Revenue environment as part of Phase 1 development to ensure that it satisfies Revenue's response time requirement.

Availability

The ROS system is an industrial strength application designed to support core business systems. The use of an application server which supports clustered configurations and the dynamic allocation of server requests ensures single points of hardware failure do not impact system availability.

The ROS database can support on-line refreshing of data from the source systems if this becomes a future requirement. Such an approach is simplified by the fact that the ROS database is closely modeled on ITP, the database which will eventually be the source of almost all the data to be refreshed. In addition, the choice of CA/Ingres II as the back end database enables the ROS and ITP databases to be matched even more closely.

For the initial ROS release, the refresh of the ROS database may be performed on a nightly batch basis. As in the case of the on-line refresh, the fact that the ROS and ITP databases are closely aligned greatly simplifies the nightly refresh. The refresh of the core ROS data can therefore be equated to the copy of key tables from ITP. The copying of entire tables is an efficient process. Indicative figures for the update of the ROS database for Phase 1 would be in the range of 30-60 minutes. The actual figures depend on the underlying hardware and also the consequent database configuration.

The extract of data for the core processing systems does not impact system availability.

Scalability

The ROS system is scalable to cater for the peak return processing volumes specified in the RFT and can be expanded to meet future growth requirements.

Analysis of the return filing statistics indicates that the demands on the system may be greatest in the late January/early February period, particularly on January 31. The peaks achieved on this day may be very significant as agents throughout the country file batches of returns.

An appropriate application server is the key to ensuring the scalability of the system. The choice of database, web server, and firewall software will also impact scalability.

BEA WebLogic enables new servers to be easily and dynamically added to the configuration as necessary to meet increasing user demand. The overall request load is optimally distributed among the servers so that resources remain fully utilized. The addition of new servers does not require amendment to the ROS application.

Flexibility

ROS allows for the easy addition of new return types and customer information services. Flexibility is a key driver in the design of ROS. ROS is an on-line integrated tax system. The same design principles that apply to building integrated tax systems for internal Revenue users apply in developing ROS. Systems such as the present invention are designed to be easily extensible for new taxes and forms. They are parameter driven to enable the fast customization of forms required to meet budget revision targets.

Changes in tax calculation on forms are transparent to the customer. Where more significant changes are involved, including changes to the physical layout of the form, the customer is presented with the new form.

ROS menus are dynamic where appropriate. The key ROS screens are designed to be generic across multiple taxes to support new taxes and new tax forms.

The ROS database will continue to mirror ITP. The choice of BEA WebLogic Server will enable code developed under Tuxedo for the ITP database to be directly reused in ROS. ROS may therefore mirror enhancements to ITP where appropriate.

Existing ITP applications which run under Tuxedo will in the future potentially be able to re-use ROS. The next version of BEA's WebLogic Enterprise product may support both Tuxedo services and application code written using Enterprise Java Beans—EJB's.

Open Architecture

The ROS system is very open. Over 92% of browsers currently in use worldwide (according to latest industry estimates) may be able to access ROS. This figure may grow to almost 100% by the time ROS goes live.

Customers may use a browser that supports digital certificates. These are:

Microsoft Internet Explorer 4.01 and beyond

Netscape Communicator 4.x and beyond

Netscape Communicator Professional Edition 4.x.

Macintosh customers may use a Netscape browser as Internet explorer versions for Macintosh do not support digital signatures. ROS can run in Windows 95 or greater, Windows NT and Apple Macintosh environments. ROS can support UNIX. An open choice of customer platforms is particularly important for ROS as Macintosh and UNIX technology have a small but significant penetration of the business market.

On the server side, ROS is built using Java. This allows ROS to run on any platform supporting Java including UNIX and NT. ROS using the WebLogic Server may run on a cluster of different machines (e.g. an NT machine and an UNIX machine).

ROS is built with one set of components. These components may be replaced with ease. The following are potential component choices available to Revenue with the ROS solution:

Database: The present invention is developed to support both Oracle and CA/Ingres II databases. the current ROS solution runs on CA/Ingres II as this database best suits the ROS interface development and performance.

Application Server: the current ROS solution runs on WebLogic Server. However the application code may be ported to any application server supporting EJB technology (e.g. IBM's Websphere application server is likely to support EJB's from October 1999).

Security: The current ROS solution is based on X.509 certificates issued by a Certificate Authority. However the solution may support X.509 certificate from any authorized Certificate Authority.

User Interface: The front end logic is primarily coded using HTML. However, the HTML forms could be readily replaced with forms from a proprietary forms product if required. It may also be conceived that ROS may evolve towards an XML based front end over time.

Web server: The ROS solution does not prescribe any limitations on the web server choice.

Firewall: The ROS solution does not prescribe any limitations on the firewall choice.

Obsolescence

ROS enables Revenue to take advantage of developments in internet technologies. The main components of ROS—database, application server etc.—can be replaced by appropriate alternatives if required.

Reliability

The present invention is very much aware of the importance of reliability in the ROS system. Both the architectural components and the demonstrated commitment to delivering a quality product indicate the future reliability of the offering.

All of the components of the present invention are well established products. These are product leaders in their field and are well proven on site. The CA/Ingres II database product is proven within the Revenue environment and forms the basis for the ITP system. BEA products are also currently in use in Revenue (e.g. Tuxedo for ITP) and have a strong track record of reliability. HTML is in common use throughout the web and is very stable.

Recovery ROS recovery procedures may cover the recovery of the application in the event of a hardware or application failure.

The procedures include specifications for the operator describing the recovery process. These include how to perform a full system shutdown, procedures for database roll-forward and system re-start. They also include messages to be posted to Revenue's Homepage informing customers of the system shutdown.

WebLogic Server is the only application server with a proven ability to run on a clustered configuration, i.e. the system runs on multiple linked computers. Revenue chose to adopt a clustered configuration for ITP and a similar configuration is likely to be required for ROS. The choice of WebLogic Server enables Revenue to take advantage of clustering, thereby significantly reducing the impact of a hardware component failing and reducing the probability of system shutdown due to hardware error. WebLogic enables the automatic restarting of all applications, which were running on the failed machine, on a support server in the cluster, without operator intervention.

In the event of failure the ROS recovery systems cover the following features:

Recovery procedures which include instructions and guidelines for performing full database backup and journaling on a regular basis. The availability of a recent backup of the ROS database together with the appropriate journal files is the key to enabling operators recover the system within a short space of time.

Procedures to inform the customer via the Revenue website that ROS is unavailable should ROS be shutdown.

In the event of a problem with the customer's own hardware or operating system, the www internet, or the internet service provider for ROS, there exists no practical means of communicating the nature of the problem to the customer. Certain software problems with the user's PC can be reported to the user. Both the off-line return applications and the on-line ROS system may report difficulties with the user's configuration where practicable.

Copies of all transactions conducted through ROS are available to the customer in CIS. Therefore, if a customer is in doubt about the success of a transaction, the customer can refer to the latest output in the inbox to establish if the transaction was successfully completed.

ROS business transactions which update the database are not broken up over multiple screens. One click completes a transaction. Therefore, if the user is unsuccessful in completing a transaction, there is no tidy-up of data required. At the server side, partially completed transactions may not be committed to the ROS database should the ROS server become inoperable during a transaction.

The recovery of data affected by system failure does not arise as ROS transactions cannot be left in an incomplete state.

Communication to Customer by ROS

Communication System

ROS provides a safe and secure electronic communications method to the customer. Communication by ROS to the customer takes place primarily when the customer accesses CIS. They are prompted to access CIS by an e-mail automatically issuing from ROS informing them that correspondence from Revenue has been received. For security reasons the e-mail does not describe the nature of the correspondence, but invites the customer to access ROS to read their correspondence.

In order to receive an e-mail from ROS, the customer may have registered with ROS stating their wish to receive Revenue correspondence electronically. Correspondence accessed on the ROS server cannot be repudiated as the system tracks access to documents.

The customer may log on to the secure ROS system using their digital certificate and password in order to access their CIS inbox. The ROS system tracks whether a customer has accessed any individual item sent by ROS to their ROS CIS inbox. ROS may, if required, be configured to mark a communication as "accessed" when the actual customer, as opposed to their agent, accesses the communication.

Access to ROS Secure Services

The successful implementation of the security requirements outlined for the ROS system would place this system at the leading edge of Revenue on-line services systems worldwide.

The use of authorized certificate authorities to validate and secure business transactions marks a watershed in the development of eCommerce.

Access to ROS Secure Services

ROS services may only be accessed by a customer in possession of a Revenue approved digital signature. However, the ROS home page which describes the ROS services and which is the gateway to the secure services area is accessible by any web user.

Customers may have a recognized digital certificate to access ROS. Customers with no certificate or those with an invalid certificate are given a reason explaining why access to ROS secure service is denied.

Linking Customer Digital Signature

There are a number of different approaches which may be used to link the customer's digital signature to their Revenue records. Two alternatives may now be briefly outlined which may meet the requirements.

The first approach involves Revenue capturing and storing the unique serial number of each customer's (or agent's) digital certificate. The digital certificate number is held on a secure table in ROS which associates certificate numbers with customer and agent numbers. A secure channel could be established to enable Revenue receive updated revocation files from Certificate Authorities on a timely basis.

Advantages of this approach include:

Revenue controls the linking process

There is no need to release Revenue customer data to any certification authority.

One alternative approach would involve Revenue providing the approved public certification authority with a unique customer number to enable the authority or authorities to incorporate the Revenue customer number as a 'hidden field' in the digital signature issued. For tax agents, the tax agent identification number would be incorporated into the tax agent's digital certificate, again on the basis of information supplied by Revenue to the approved authority.

Deciding the approach to linking digital signatures is one of the tasks to be completed in the early stages of Phase 1 ROS development. The current ROS solution assumes that Revenue capture the digital certificate numbers and associate these with the customer or agent identification.

Management Statistics

Management statistics may be provided either directly from ROS or using Revenue's corporate information facility (CIF). A limited number of fixed format reports may be generated directly from the ROS database and the transaction log. Reports such as the following can be prepared to support the statistics outlined in the RFT Number of access requests
Number of returns filed by tax head
Number of returns filed by customer/agent.

The RFT indicates however that the reporting requirements are more open-ended. CIF is in receipt of all the base transaction information from ROS. CIF is equipped with user driven query and analysis tools which enable ad-hoc reports to be generated in a timely manner.

Information on Revenue Tax Numbers

The experience in the development of both CRS and ITP gives a full understanding of the different tax numbers which Revenue currently use.

The customer's name and the appropriate Revenue tax head number appear at the top of each ROS page once a customer enters ROS secure services using their digital certificate. The rules used to determine which registration numbers to display in the header for ROS screens are currently a speculative interpretation of the potential preferences for registration number display in ROS.

Filing Customer's Tax Returns

ROS may be easily extended to support new forms in the future as requirements arise.

The approach to returns filing divides into two categories:
On-line forms:

Simple once-off forms (e.g. VAT3, P30, P35) may be completed on-line by customers. These forms are available now. The VAT RTD is also assumed to be an on-line form.

Off-line forms:

Complex forms (Form 11 and CT1) and those returned in large numbers are best supported off-line by providing a downloadable form. The off-line forms may be submitted in batches generated either from ROS software or from third party software. The format defined from the third party software generating these forms is identical to the format of the batch files created by ROS.

Tax Return Selection, Completion and Filing Functions
Access Return Filing Module Any web user may access the ROS home page containing 'non confidential' information on available ROS services, frequently asked questions etc. Only customers or agents with an appropriate digital certificate may go beyond this to access ROS secure services, including the return filing facility. On choosing the 'Enter on-line services' button from the ROS home page, the user is prompted to identify the digital signature they wish to use and the associated password. Users who fail this check cannot access return filing or the other secure ROS facilities.

Customers who have an approved digital certificate but who do not have appropriate direct debit arrangements in place may not be offered those returns for filing which require a direct debit.

Customer's Tax Returns Selection

The ROS system checks the ROS database to determine the returns a particular customer is entitled to file, based on two criteria:

The tax heads the customer is registered for
Any access control registrations that apply to that customer.

Figure 20:
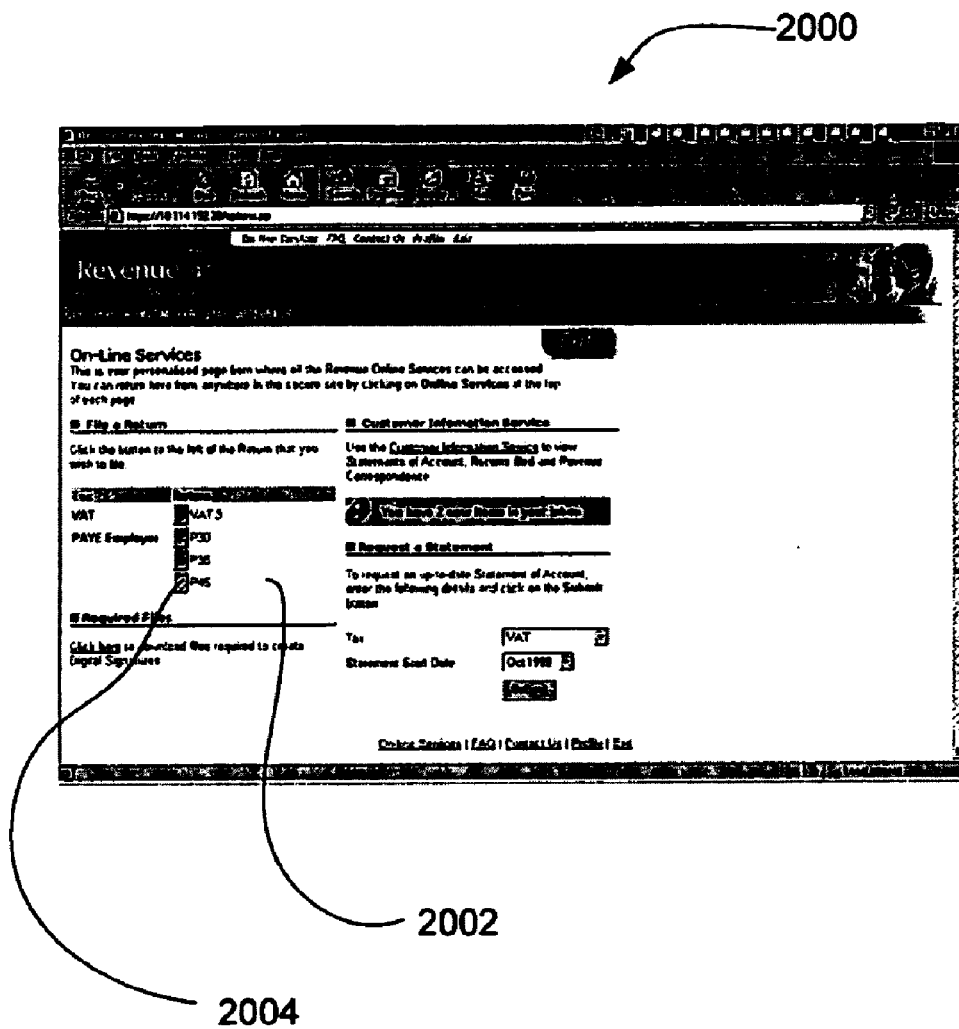
FIG. 20 illustrates the list of valid returns for a customer on the ROS services page.

The customer is presented with their list of valid returns on the ROS services page. They select the return they wish to file and they are taken to that return form. Only periods where returns are outstanding are offered for selection by default to the customer. Muti-reg customers do not go directly to the return form screen from the ROS services page. The are required to select the registration they wish to file for on a registration list screen. FIG. 20 illustrates the list of valid returns for a customer on the ROS services page. As shown, a personalized interface 2000 includes a list of valid returns 2002 that a customer may file by simply selecting an icon 2004 associated therewith.

ROS Supports the Filing of Back Periods

On accessing the return form for the particular return type the customer wishes to file, the taxation period defaults to the most recent outstanding return. ROS provides a drop down list of dates attached to the taxation period. If the customer wishes to file for an outstanding 'back period', he/she selects the appropriate period from the list and completes the return.

The return form displayed may reflect any changes which may have taken place to the form calculation and validation in the interim period—i.e. the customer is presented with the form appropriate to the period for which they are filing.

Major changes in the format of a return form are rarer occurrences. Where this situation arises, customers may be asked to select the return type on services page (e.g. select a pre-2005 VAT3 or a current VAT3 if the VAT3 were to change dramatically in format in 2005).

Agent Tax Return Selection

Agents accessing this screen on behalf of a particular customer are presented only with the returns they are entitled to file and access for that customer. For example, an agent may be entitled to file their corporation tax. The ROS agent and customer relationships defined in CRS, determine the taxes/returns which an agent is entitled to file for a particular customer.

Multiple VAT and PAYE-Employer Registrations

The ROS system identifies cases where the customer has more than one registration number for PAYE-Employer or VAT—based on the customer information held on the ROS system. When a customer with multiple PAYE-Employer or VAT registrations chooses to file a PAYE-Employer or VAT return, the 'multiple registrations' ROS page is displayed, and the customer is asked to choose the specific registration number they want to file against.

Figure 21:
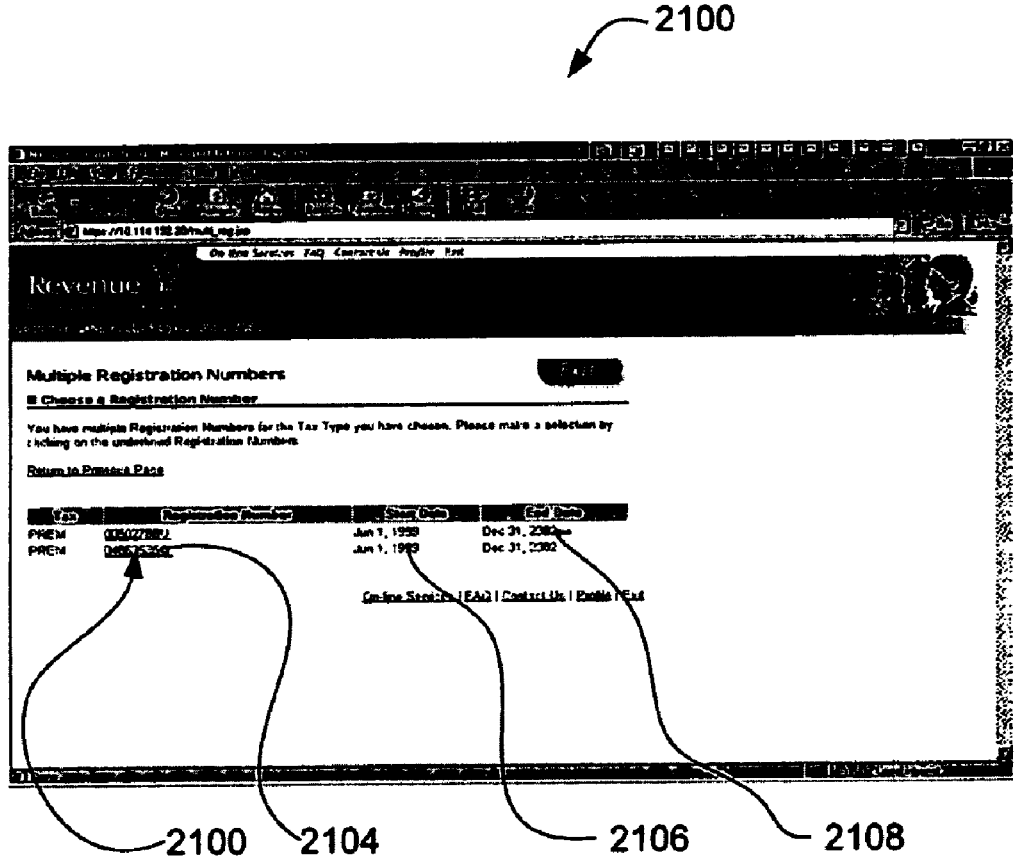
FIG. 21 illustrates the 'multiple registrations' page from the ROS system in accordance with one embodiment of the present invention.

FIG. 21 illustrates the 'multiple registrations' page from the ROS system. In the case where a user has multiple registration numbers for a tax type, the interface 2100 of FIG. 21 may be used to select an appropriate one. As shown, a list of registration numbers 2102 may be selected by clicking on a hyper link 2104 associated therewith. It should be noted that a start date 2106 and end date 2108 are listed next to the registration numbers 2102.

Automatic Return Completion

Figure 22:
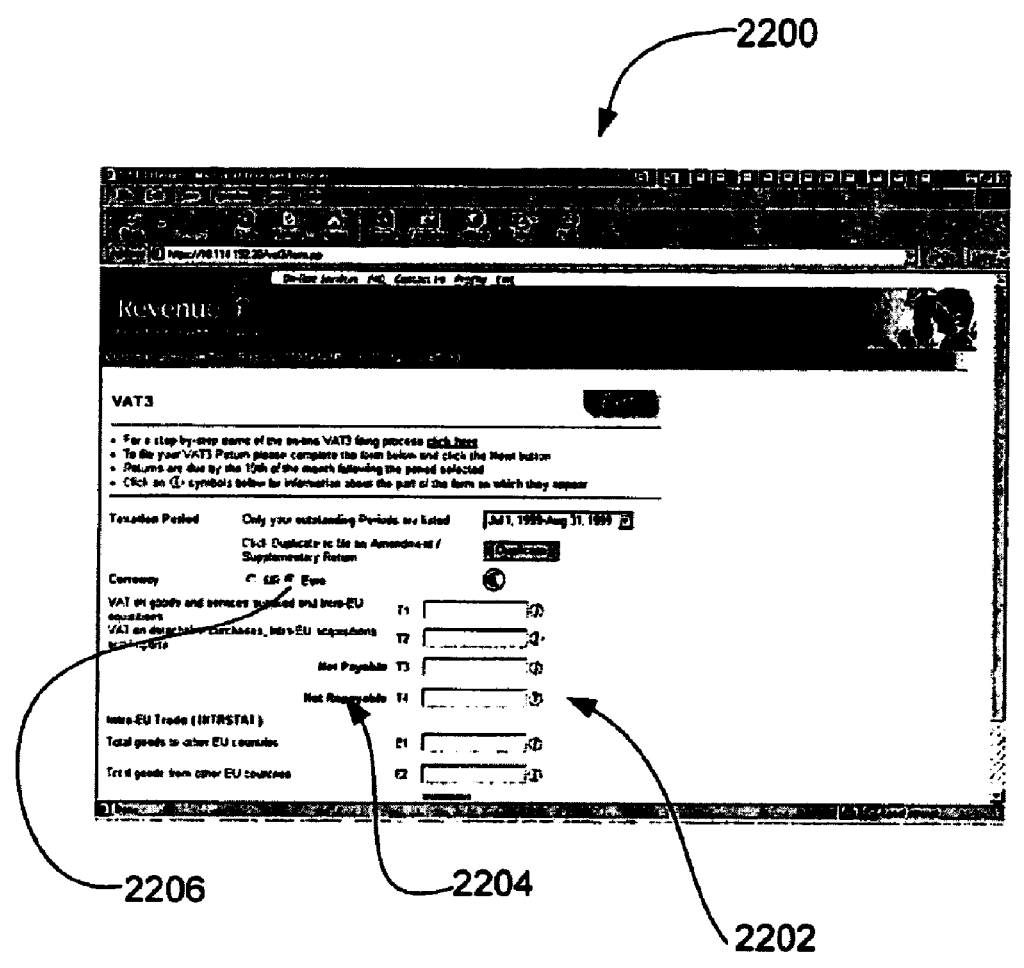

The ROS system is designed to minimize data entry by customers and agents. An underlying principle of ROS is that the user should not be required to re-enter information which they have already supplied to Revenue. When the user is first presented with a tax form for completion, the customer name, address (depending on the form type), tax head registration number and default tax period are already completed, as is the IR£/Euro currency indicator. FIG. 22 shows an initial display 2200 of the VAT3 return page, with the information automatically completed by the ROS system. As shown, the various fields 2202 and associated descriptions 2204 are tailored based on the selection of the Euro radio button 2206.

In the case of the downloaded P45 form, the customer is not required to enter the employer registration number or the employer name and employer address as this may be automatically filled when the return is filed.

Partially Completed Return Forms

ROS enables customers to save partially completed off-line and on-line returns. Customers may save the longer more complex forms which are completed off-line (e.g. P45, P35L, FORM11 and CT1) on their PC. Customers completing the simple forms which are filled in on-line (e.g. VAT3, P30, P35) are less likely to require a partial save facility. However, ROS also enables partially completed on-line return forms to be saved (this function is not yet available).

The issues associated with partial return filing are outlined below:

Customers may save partially completed and completed off-line returns (e.g. the P45) on their own computer.

Customers may complete return forms off-line. The data entered on the form is validated.

Returns completed off-line may be uploaded individually or in batches. The secure transmission of the downloaded return is assured as the upload process includes the signing and encrypting of the file using the Baltimore product J/PKI-Plus. This signing mechanism is a particularly unique feature of the solution. It ensures ROS is fully compliant with the terms of the 1999 Finance Act for signing transmitted returns.

Off-line calculation of the return based on the data in the return is provided.

Customer's receive confirmation of the successful upload of a return or batch of returns as copies of the return are written to the customer's inbox. The customer can therefore confirm the return has been processed successfully by ROS.

Calculation of Return Form Contents

Calculation of return form contents is supported by ROS, using calculation logic embedded in the form. Such calculations are done locally on the client side of the ROS application. A simple example is the calculation of the 'net payable (T3)' or 'net repayable (T4)' amount on the VAT 3 form. The same approach may be used for forms which have significantly more complex calculation requirements, such as the Income Tax Form 11 and Corporation Tax Form CT1. The calculation is again done on the client side, with the calculation rules embedded as Java executables in the downloaded forms.

Return Form Validation

The ROS system incorporates sophisticated validation for each of the different return forms. Individual field validation includes alpha/numeric checks, mandatory entries, maximum and minimum value checks and registration number check character validation.

Any validation requirements are built into the relevant return form pages in ROS. Cross reference validation is performed to ensure that the information on the form is internally consistent. Each form is also validated against data held on the ROS system to check the customer's authority to file the selected return, check that the return is being filed for a valid period, etc.

Figure 23:
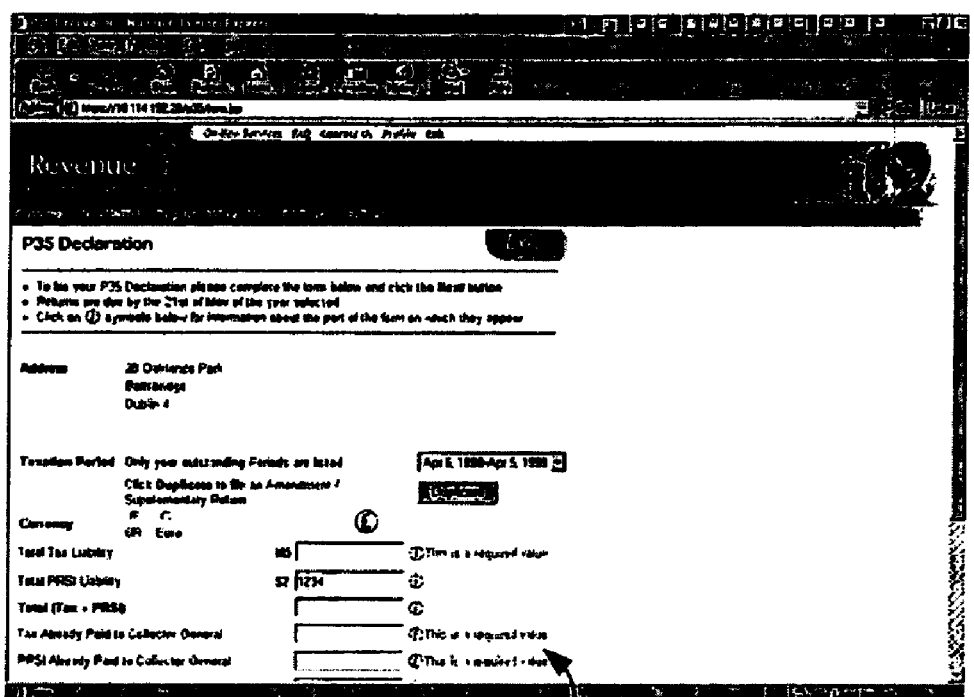
FIG. 23 illustrates an interface showing how error messages are displayed using the P35 return page from the ROS system.

When errors are detected in a form, the form is returned to the user with an error message displayed, indicating invalid field entries. FIG. 23 illustrates an interface 2300 showing how error messages 2302 are displayed using the P35 return page from the ROS system.

Duplicate Returns

Customers may file both supplementary and amended returns.

ROS enables a customer to file a 'duplicate' return—i.e. where a return has already been made for a period—by clicking on the 'duplicate' button on the return form. This presents the user with a list of all valid periods for the last 2 years. If the user selects a period for which a return is already filed, the user is prompted to indicate whether the new return is an 'amendment' or a 'supplementary' return. The form is then completed in the normal way.

Printing a Return Form

Figure 24:
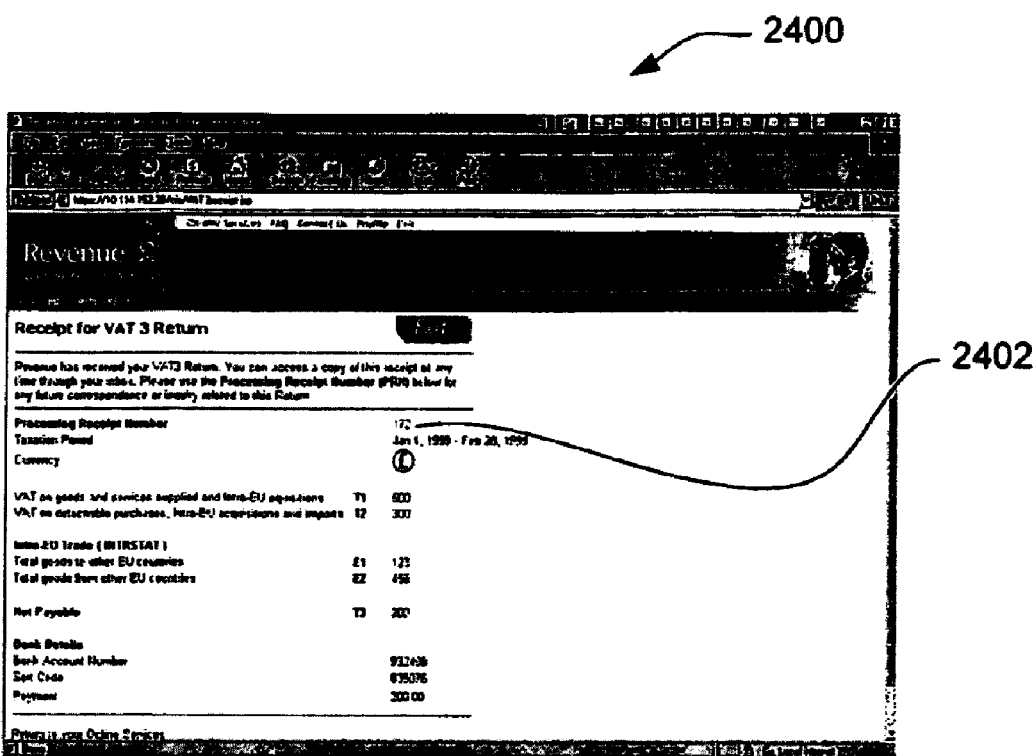
FIG. 24 shows an interface including a 'PRN receipt' page for ROS. ROS enables customers to print completed return forms locally.

FIG. 24 shows an interface 2400 including a 'PRN receipt' page for ROS. ROS enables customers to print completed return forms locally. When the customer has finally confirmed submission of the return, ROS responds with the 'Processing Reference Number (PRN) receipt' page, which provides a unique receipt number 2402—the PRN—for the return submission. This page also provides the customer with the option to print the return form (or forms in the case of a batch) just submitted.

The customer may also at any time access the ROS Customer Information Services (CIS) system and view or print any return they have previously filed. Forms are designed to print on 'blank' A4 stationery.

'Save' a Copy of the Completed Return Form

The ROS system saves completed return forms centrally. Customers may access return forms which they have previously filed using the ROS CIS system. In addition customers may also save completed return forms locally in HTML format.

Digitally Signing the Return

When a customer submits a completed return form, ROS prompts them for a final confirmation of the details submitted. The customer is presented with the key information from the return—i.e. return type, taxation period, amount payable/repayable, etc. If the customer then confirms that they want to submit the form, ROS prompts the customer to explicitly sign the form using their digital signature and associated password. Return forms are only accepted if they are digitally signed.

Confirmation Option Prior to Transmission

Figure 25:
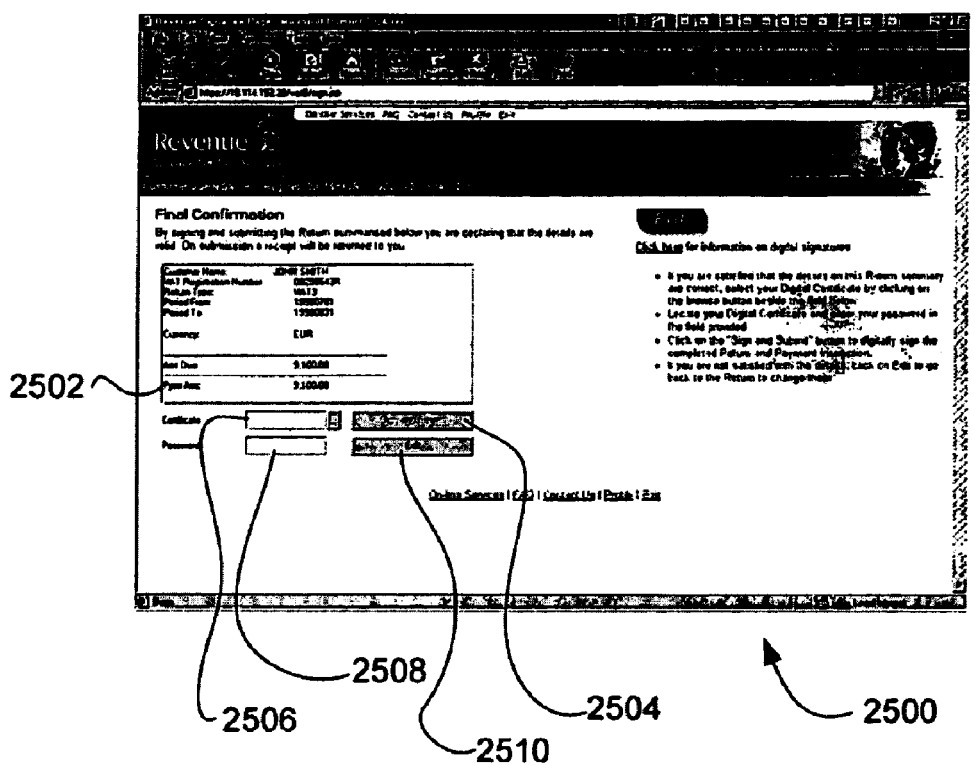
FIG. 25 illustrates a 'final confirmation' page from the ROS system in accordance with one embodiment of the present invention.

FIG. 25 illustrates a 'final confirmation' page 2500 from the ROS system. When a customer submits a completed return form, ROS prompts them for a final confirmation of the details submitted—i.e. return type, taxation period, amount payable/repayable, etc. Such details are displayed in a dialog box 2502. The customer then has two options available:

Click on the 'sign and submit' button 2504 to send the return to Revenue for processing after entering the digital certificate and password in fields 2506 and 2508, respectively.

Click the 'edit' button 2510 to make changes to the return form prior to submission Encryption of Return Form All messages within the ROS secure area are encrypted using the SSL standard. Therefore the data transferred between the customer's system and the ROS server is encrypted by ROS. ROS currently has 40 bit SSL encryption—the maximum allowed for any private organization. ROS can incorporate 128 bit SSL encryption. Revenue can make an application to the US Government to give permission for this standard to be used by ROS. A 128 bit encryption is recommended for a critical application like ROS.

Transmission Acknowledgement

Figure 26:
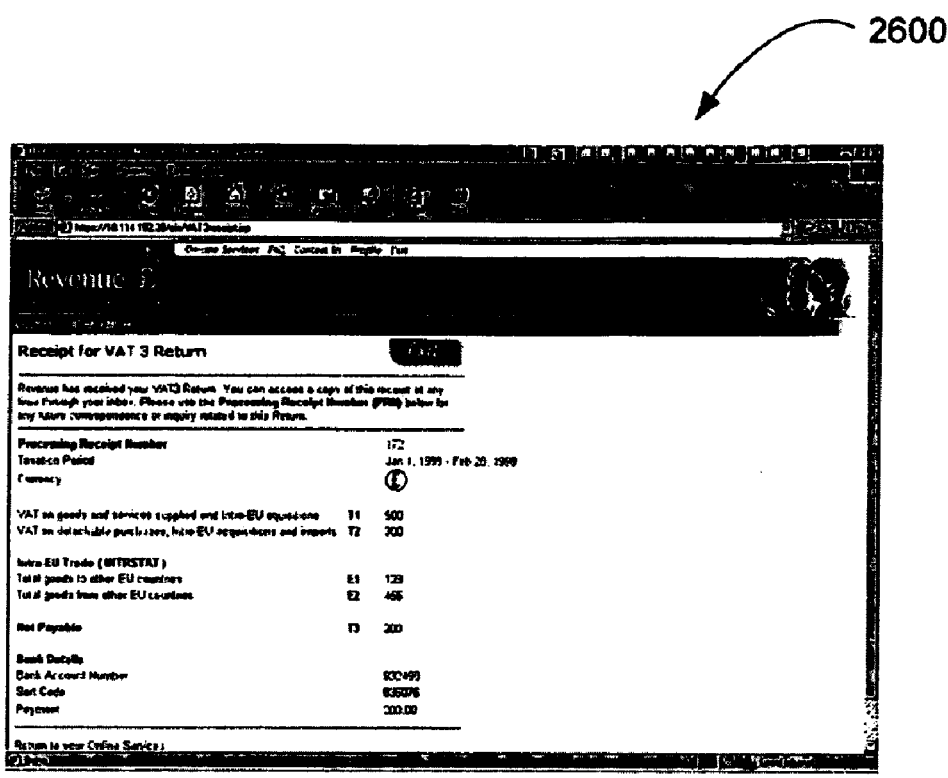
FIG. 26 shows the 'PRN receipt' page for ROS in accordance with one embodiment of the present invention.

FIG. 26 shows the 'PRN receipt' page for ROS. ROS presents an acknowledgement to the customer to confirm successful transmissions—i.e. to confirm that ROS has received the digitally signed form. The 'PRN receipt' page which ROS uses for this purpose includes a receipt number—the PRN.

Additional Function for Agents and Payroll Companies

'Batch' Filing of Returns

ROS provides batch filing for tax agents, employers, and payroll companies using their own or purchased software. In addition, ROS, provides batch filing for agents or companies using the downloadable ROS forms. Identical file formats are used in both cases. It is recommended that Revenue Agencies determine a maximum file size for batch filers. ROS may be set-up to accommodate the specified limit.

ROS provides customers with the ability to complete a batch of returns using downloaded ROS forms as follows:

Downloading a Java application for the required form

Completing and saving a number of forms 'off-line' locally, using the Java application Uploading a batch of forms using a Java applet from within ROS. This prompts the user to select the individual returns—previously saved off-line—which may constitute the batch and submits the batch to ROS.

Customers uploading returns generated by third party software are not required to select multiple return files to be included in the batch. It is assumed that the third party software prepares a single file with multiple returns contained within it.

The ROS application programming interfaces (APIs) may be published for use by software companies or individual tax agents, employers and payroll companies who want to modify their software to support the preparation and submission of their clients' returns to Revenue through ROS.

Digitally Signing the 'Batch' of Returns

When a customer submits a batch of completed return forms, ROS prompts them to explicitly sign the batch using their digital signature and associated password. A batch of return forms is only accepted if it is digitally signed.

Confirmation Option Prior to Transmission

Figure 27:
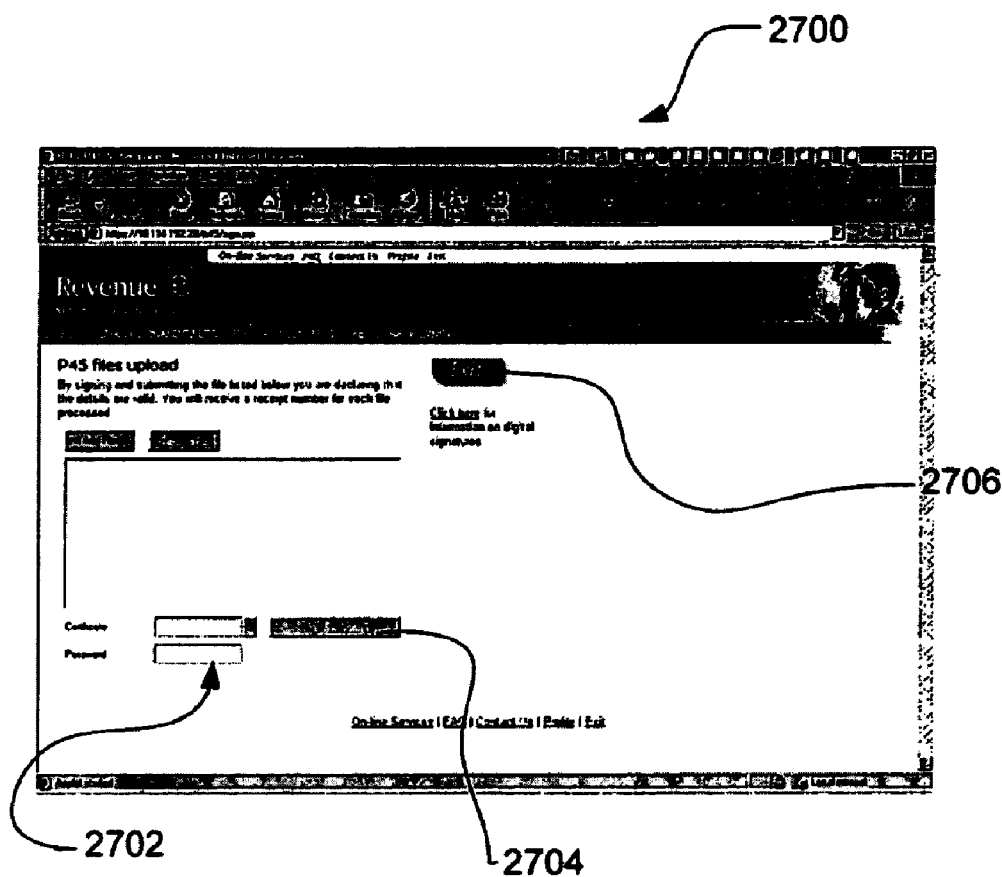
FIG. 27 illustrates the ROS Java applet for batch submission of P45 returns created by the downloaded ROS return form in accordance with one embodiment of the present invention.

FIG. 27 illustrates the ROS Java applet for batch submission of P45 returns created by the downloaded ROS return form. As shown, an upload screen 2700 enables users to upload multiple P45's in a batch. When a customer submits a batch of completed return forms, they click on the browser button to select their digital certificate and enter their digital certificate password via fields 2702. They then have the option to either:

Click on the 'Sign and Submit' button 2704 to send the batch to Revenue for processing, or Click 'Exit On-Line Services' 2706 to cancel submission of the batch.

Encryption of 'Batch'

Data transferred between the customer's system and the ROS server is encrypted by ROS using Secure Socket Layer (SSL) standard, once the customer is authenticated in ROS—i.e. once the customer has accessed ROS services using an approved digital signature.

Validation of the 'Batch' of Returns

Figure 28:
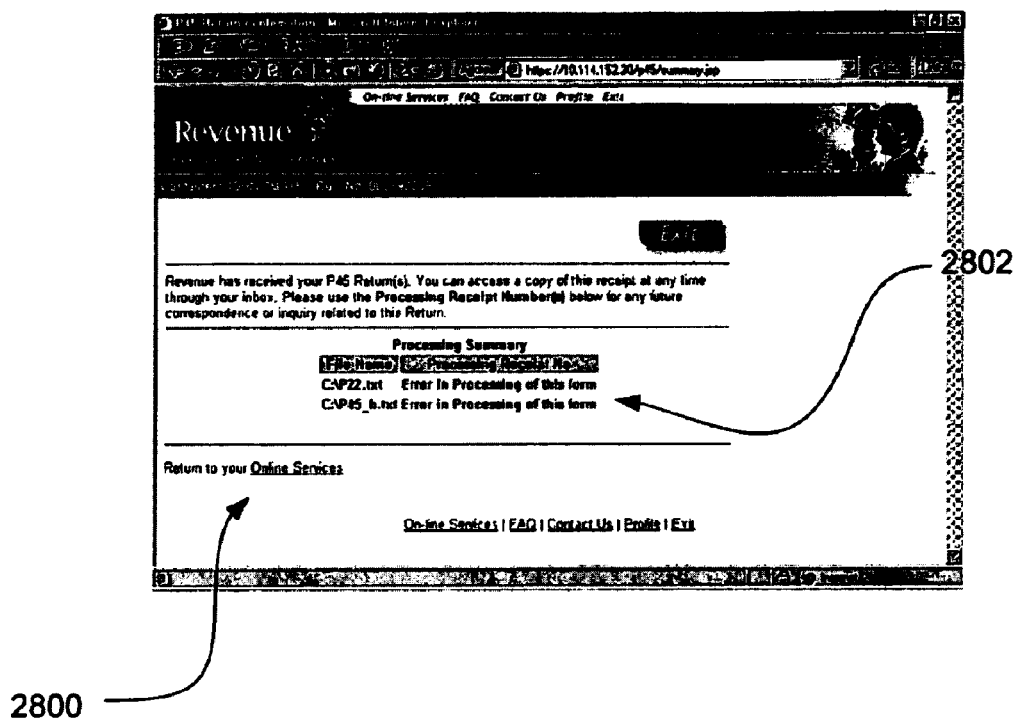
FIG. 28 illustrates an interface showing how batch error messages are displayed using the example of a batch of P45 returns in accordance with one embodiment of the present invention.

FIG. 28 illustrates an interface 2800 showing how batch error messages are displayed using the example of a batch of P45 returns. The ROS system validates each 'batch' of submitted returns to ensure that the batch itself is valid—i.e. batch header, batch footer, number of forms in the batch, etc. If the batch has been prepared using a downloaded ROS Java application, it may have already been checked for internal consistency—e.g. totals within the form are correct.

Errors in a batch are signaled to the user through an 'error message' 2802. If, for example, forms are submitted for validation and are found to be invalid, an error message screen is immediately returned to the user, indicating the errors in forms. This notifies the user that the batch has not been entirely accepted for processing.

Transmission Acknowledgement

ROS presents an acknowledgement to the customer or agent to confirm successful transmissions—i.e. to confirm that ROS has received the digitally signed batch. In addition, a PRN receipt number is issued for each batch of returns.

A printable image of the batch is available in CIS.

Check the Progress of a 'Batch'

Batches of returns submitted to ROS are validated and acknowledged on receipt. The customer is informed immediately whether the submission has been successful or not. The returns contained in a valid batch are available for review immediately after receipt in CIS. The batch does not go through either a "received" stage or a "ready for processing" stage in ROS.

Support System to Test Sample 'Batch' Returns

A duplicate test version of the ROS system may be made available on the web. The system has a distinct page header throughout, clearly identifying the system as a test system. This system may be accessed by customers using their own digital certificates. The test system is populated with standard test cases, similar to those available for the purposes of evaluating the ROS. All customers are set up for the purposes of the test system as 'agents' of the test customers. They may therefore choose the customer they wish to access. As the test system has general availability, a facility to test forms such as the Form 11 and the CT1 on an annual basis is readily available.

Customers are notified if test data fails using the normal error reporting processes in the ROS system.

Tax Return Validation

Validation of Customer's Identity

Any web user may access the ROS home page, and from it some 'non confidential' information on available ROS services, frequently asked questions etc. Only customers or agents with valid digital certificates with valid digital certificates may go beyond this to access ROS secure services, including the return filing facility. On choosing the 'Enter on-line services' button the user is prompted to supply their unique digital signature and associated password. Users who fail this check cannot access return filing or the other secure ROS facilities.

Validation of Customer's Authority

The ROS system checks the ROS customer information to determine the returns a particular customer is entitled to file, based on the tax heads the customer is registered for. The customer is presented with their list of valid returns. They may then select the return they wish to file. For example, a customer who is an employer can only complete and return forms P45 if they are registered for PAYE-Employers.

ROS also checks that the customer's authority to file is valid in respect of the following conditions:

The customer has a current direct debit arrangement with Revenue if filing a VAT3, Form P30 or Form P35.

If an agent, that the agent has authority to file the particular return on behalf of a client—i.e. that the client's Revenue record contains the agents Tax Agent Identification Number Sophisticated period validation is also built into ROS to ensure that customers and agents can only file for periods for which they are registered.

Validation of Tax Return Entries

The ROS system incorporates sophisticated validation of each of the different return forms. Individual field validation includes alpha/numeric checks, mandatory entries, maximum and minimum value checks and registration number check character validation. Any validation requirements are supported in the relevant return form pages in ROS. Cross reference validation is performed to ensure the information on the form is internally consistent. Each form is also validated against data held on the ROS system to check the customer's authority to file the selected return, check that the return is being filed for a valid period, etc. Errors are signaled to the user through an 'error message' box on the particular page, which includes a brief description of the error and, where appropriate, an indication of how to correct the error.

'Batch' Validation

The ROS system validates each 'batch' of submitted returns to ensure that the batch itself is valid—i.e. batch header, batch footer, number of forms in the batch, etc. ROS also validates the return format. If the batch has been prepared using a downloaded ROS Java applet, the batch may have already been checked for internal consistency—i.e. totals within the form are correct.

Errors in a batch are signaled to the user through an 'error message'. If, for example, forms are submitted for validation and are found to be invalid, an error message screen in immediately returned to the user, indicating the errors in forms. This notifies the user that the batch has not been accepted for processing.

Full validation of the individual return forms in a batch is performed by Revenue's existing tax processing systems such as ITP.

Filing Period Validation

The ROS system includes filing period validation to ensure that customers and agents can only file for periods for which they are registered.

The ROS system is designed to ensure that a customer only files a 'duplicate' return if that is what the customer intends to do. To file a 'duplicate' return, the customer explicitly clicks on the 'duplicate' button on the return form in question. This presents the user with a list of all valid periods for the last 2 years—including those for which returns have already been filed. The user is prompted to indicate whether the new return is an 'amendment' or a 'supplementary' return. The form is then completed in the normal way. The customer may change the period if required before the form is submitted by selecting another period from the drop down list box. The customer may quit at any time by clicking on the 'exit' button.

On accessing a return form, the taxation period defaults to the most recent outstanding return. All outstanding periods are shown by clicking on the drop down list attached to the 'taxation period'.

Customers choose the return periods they wish to file for from a defined list. The list is prepared based on the standard filing dates for the tax or the customers specific year end. Validation for overlapping periods is therefore not required for ROS returns.

Individual Tax Return Form Requirements

The present invention recognizes the complexity of the Form 11 and the interest in capturing additional accounts data as part of the return filing process.

ROS supports the current year's and the preceding year's Form 11 and CT1. In addition up to 150 fields of account data are captured if required.

Reception and Storage of Customer Returns

ROS holds customer returns and payment data in a standard format. The ROS extract programmed formats the extracted data to match the particular system for which the data is being extracted. The extract is driven from a codes table enabling the format and structure of the data on the returns to be changed with minimal change to the extract programs. The extract programs are therefore generic allowing many different types of return data, return forms and extract formats to be handled using a standard extract programmed. This approach supports the forwarding of different types of data including:
  data necessary for raising assessments and charges-*
    data captured for informational and statistical purposes-*
    accounting instructions
    accounts data.
  Functional Requirements of the Return Reception System
  Receipt of Tax Return Data Customer returns and payment data is held on the ROS database in standard returns tables. Data is extracted from these tables for the various payment and returns reception systems in the core processing systems. The data extracted is formatted to match the particular system for which the data is being extracted.

'Batch' Returns

ROS can receive batches of returns from customers/agents and 'unpack' the individual returns in the batch. The unpacked returns are stored on the ROS database pending extract to the core processing systems. These returns are uploaded to the core systems periodically in the same way as individual return forms.

Rejected Returns

Returns submitted on-line to ROS may not be rejected by ROS after submission. This is because the front end ROS validation—both client and server side—is comprehensive and may notify the customer of any error condition before the form is submitted.

The same applies to batch validation. The detailed validation of the individual return forms within a batch, is handled by the existing Revenue systems—ITP, etc. If an individual return in a batch fails this detailed validation, the existing system issues the appropriate notification to the customer—the notification may be routed to the customer's ROS CIS inbox, if required.

Acknowledge Receipt of Returns

ROS presents an acknowledgement to the customer to confirm successful transmissions—i.e. to confirm that ROS has received the digitally signed form.

System generated Processing Reference Number (PRN) Acknowledgements confirming successful transmissions include a PRN Date of Receipt of Return The ROS system captures the date each return was filed. This is passed to the relevant Revenue tax application systems along with the return.

Store/Archive Return Details

The ROS system maintains an archive log file. The files stores all messages received by the system in the format in which they were received.

Access and Print Facilities for Archived Returns

The ROS CIS system can be used to retrieve any filed return or batch of returns. This form or batch of returns can be printed.

Files can also be retrieved directly from the archive log and printed.

View Return Status

Return status can be checked by customers on-line in ROS CIS immediately after the return is filed.

Separating Data Contained in ROS Returns

Returns data is stored in duplicate on the ROS database. The data is stored in one table for extract to CIF and on another table for extract to the appropriate core processing system.

This enable the processes of extracting data for CIF and for the core processing systems to be performed independently of one another.

Customer Information Services (CIS)

As specified in the request for tender, the provision of the Customer Information Service (CIS) for ROS may be in two phases.

The Phase 1 version of CIS is already is already developed. The Phase 1 CIS system provides the customer with a facility to view documents on-line. The range of documents available is dependent on the output made available from ITP. The range potentially includes the following documents:

- Pre-formatted Statements of Account
- Copies of any Returns Submitted by the Customer
- Return Reminder Correspondence
- Payment Compliance Correspondence
- Insurance Compliance Correspondence
- Electronic Receipts.

ROS provides a facility for customers to view documents on-line, 'the inbox'. The inbox can handle multiple document types and standards.

In developing Phase 2, one can make extensive use of the experience in developing ITP. In particular, one may intend to take advantage of the potential for re-use of code from some standard services in ITP. This approach reduces the maintenance and testing overhead for the CIS system.

Functional Requirements of the CIS

Validation of Access Attempts

ROS may not permit customers without a valid digital signature to access CIS. Tax agents cannot access customers for whom they are not registered as an agent. Additional access controls prevent agent employees and company employees accessing registrations restricted by their management. All access attempts are logged.

Information Services

The ROS CIS may be comprehensive. The development of the service is divided into two phases as defined in the RFT. The Phase 1 requirements for CIS are already met. The Phase 2 requirements may be custom developed reusing portions of the ITP code as appropriate.

Phase 1

Requirements CIS Phase 1 offers customers the facility to view multiple types of documents on-line. ROS therefore provides an 'inbox' for each customer's mail. The mailbox includes the Statements of Account issued by ITP and any other correspondence that may be issued by ITP to the customer. It also includes a copy of every return filed by the customer on-line. The customer may therefore use the Statements of Account in the inbox to trace all transactions with Revenue. In addition a fully printable version of all returns filed through ROS is available on-line.

Figure 29:
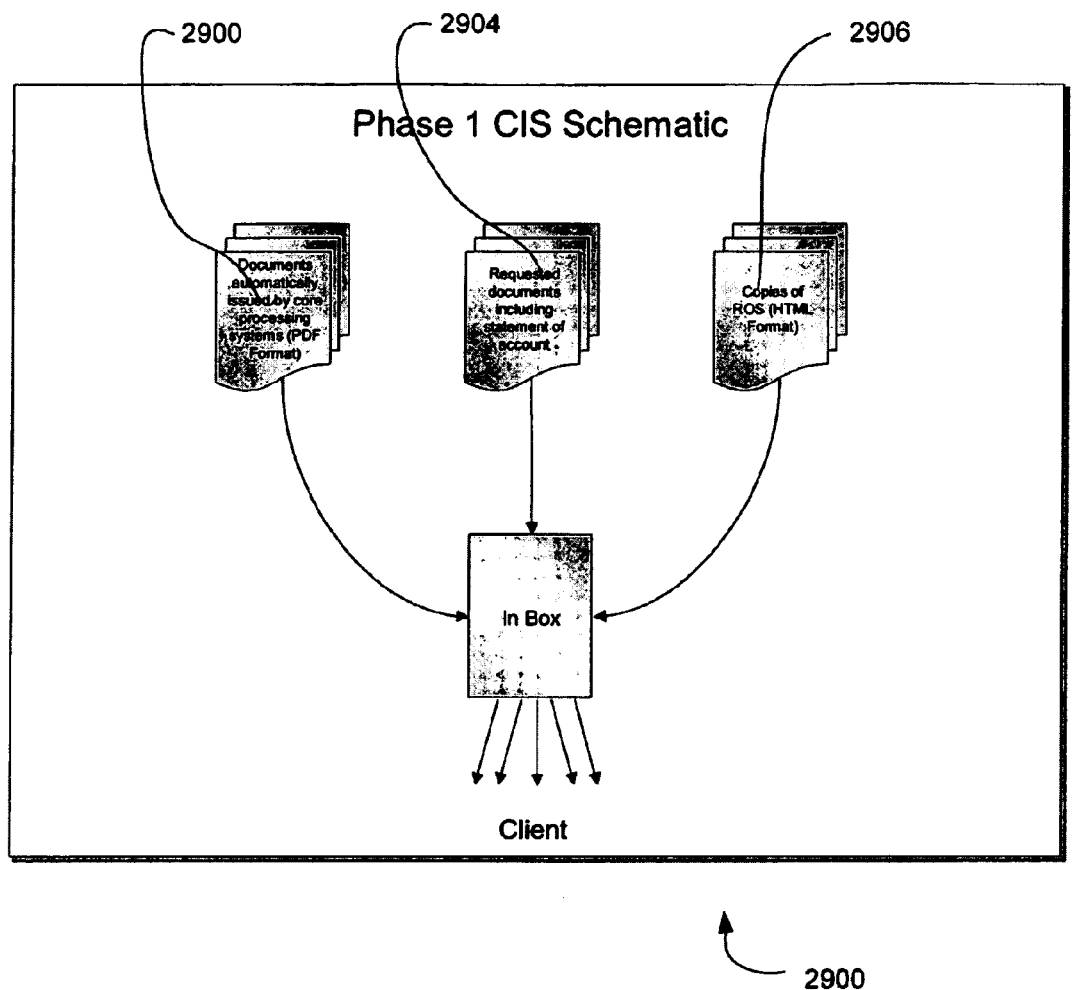
FIG. 29 outlines the three types of correspondence supported by CIS in Phase 1 in accordance with one embodiment of the present invention.

FIG. 29 outlines the three types 2900 of correspondence supported by CIS in Phase 1:

- .pdf documents issued automatically by core processing systems 2902
- .pdf documents requested by ROS customers (e.g. the Statement of Account) 2904
- Copies of all returns or batches of returns submitted through ROS. 2906

Phase 2 Requirements

The Phase 2 information services may be developed as an extension to Phase 1 CIS. In Phase 2 there are six separate functions which are similar to services available in ITP.

These are:

- Transaction details information service
- Payment list information service
- Charge and collection information
- Refunds detail service
- Returns information service
- Statement of Account information service.

CIS Phase 2 also includes a service displaying registration details for PAYE-Employer, VAT, Income Tax and Corporation Tax.

Customer (Non-Agent) Information Requests

ROS restricts access to the services page to those customers who have a recognized digital certificate. The services available to customers on that page are further restricted based on the privileges accorded to their certificate by the ROS access control system. Only outputs relating to the registrations that the certificate is entitled to view are displayed in the inbox. Access to the CIS information services provided in Phase 2 may be limited depending on the privileges accorded to the customer digital certificate.

Income Tax/Corporation Tax Agents' Information Requests

Income Tax and Corporation Tax Agents have special privileges to enable them to view all the tax information for their clients. ROS restricts agents accessing CIS to their own registered clients. In addition, once the agent reaches the services page for a customer, the data available to the agent depends on the tax for which the agent is registered with that customer. The access control system for ROS may enable an agent to specify any customers that an employee may not access, or any particular registrations belonging to a customer that an employee may not access.

Other Agent Information Requests

PAYE-Employer and VAT agents may be restricted to the tax head(s) for which they are registered.

Customer Information Parameters

Customers accessing the ROS inbox developed in Phase 1 are offered a range of parameters including the following:

- The tax and tax periods
- The document type.Phase 2 CIS parameters include:
- The tax and tax periods
- The type of information required.

Request of Confirmation

A confirmation of the information requests may be included if required.

Option to Abandon

The customer may cancel out of the ROS system at any time. This facility enables the customer to abandon a transaction when required.

Output Viewing/Printing/Download

The formats provided under Phase 1 for CIS includes both .pdf format and HTML format. Both of these formats are viewable. In addition, they can both be printed and both formats offer the opportunity to download a file by saving the file locally New Request When a request has been submitted through the Customer Information Service, the user is informed that the request has been received and is automatically brought back to the main Customer Information Service page, where a new request can be composed as required.

Statement of Account Request

ROS accepts a request for a Statement of Account. The request is extracted for update into ITP. The Statement of Account issued from ITP in .pdf format is available to the customer in CIS. In addition ROS sends an e-mail to the customer confirming the issue of the statement.

ROS Includes the Statement of Account Request Facility

The possibility regarding ITP providing periodic Statement of Accounts for ROS may now be addressed. Should the decision be taken to offer this service, then ROS can accommodate the service without significant development effort. The periodic Statement of Accounts may be available in CIS and also, a notification e-mail may issue to the customer.

It should be noted that there is a possibility that Revenue may be in a position to provide copies of Statement of Accounts for all ROS users for storage on ROS. The additional development required for this function is also minimal. The customer however, would require a recognized digital certificate to access their inbox to view the statement.

Phase 2 Request Responses

The information provided in CIS services for Phase 2 may be real-time based on the information in ROS at that time. The information may be consistent with the data on the source database (i.e. ITP) at the time of the last extract.

ROS Presentation Style

Outputs from ROS may follow an agreed format. Outputs created by the core processing systems in .pdf format may remain unchanged when presented in ROS. If the requirement to redesign .pdf formats to a ROS style is confirmed, the most cost efficient approach to changing the .pdf formats is to generate the .pdf image directly for ROS in the existing tax application system. Returns filled in by the users may be redisplayed to the user in CIS in a consistent ROS format.

Inputs and Validations to the ROS CIS

The display of the input requirements may include enterable fields and validation where appropriate (e.g. tax head validation, period validation, customer number validation).

Agents do not have access to a customer's CIS system unless the agent is registered for that customer. In addition, an agent can only access the particular tax heads that they are registered for. IT and CT agents, however, are entitled to view all their customers tax heads. To enter CIS, they may specify the customer that they are enquiring on. The agent and customer validations are common to all access requests for CIS information services.

Tax Head Registration Details Access

Access to this screen is based on the taxtype. Customers are only offered valid taxtypes based on the customer profile and the privileges of the certificate accessing the customer.

Statement of Account Access

Access to this screen is restricted based on the privileges of the certificate accessing the screen. Customers may elect to specify the period for which they want the Statement of Account.

Transaction Details/Payment Details/Refund Details/Returns Information Access

Access to these screens is by specifying the tax head and the tax period (or period range or a range of dates). A range of dates can also be used.

Tax Head Registration List

The list includes the fields identified in the RFT. Only the most recent registration /cessation, in any tax head, may be displayed.

Statement of Account

The statement includes the fields identified in the RFT.

Transaction Details

The list includes these fields.

Payment Details

The list includes these fields.

Refunds List

The list includes these fields.

Returns Information

The list includes these fields.

Activity Reports

Key statistics are captured by the application server. These statistics are available. They include statistics by request type. The reporting of statistics by period where the user does not specify a particular period is not included.

Revenue Initiated Information to Customer

ROS supports the issue of Revenue initiated information to the customer. The customer information service includes an 'inbox' where any output issuing to the customer electronically is available on-line. Any correspondence initiated by Revenue may be directed to the inbox. The customer is informed when correspondence goes into the inbox by an automatic e-mail. For security and confidentiality reasons the e-mail informs the customer of the existence of the correspondence. It does not indicate the nature of the correspondence or give any details about the correspondence.

ROS supports two different types of correspondence:
- Correspondence directly generated from the core processing systems in a .pdf format, (e.g. the Statement of Account)
- Correspondence generated by ROS based on data from the core processing systems (e.g. a return reminder may be generated by ROS based on the returns issued markers from ITP).

The format of this correspondence is flexible. ROS supports .pdf format and HTML format. The ROS inbox may be viewed at many levels. The customer may view new correspondence relating to particular registrations or document type.

Functional Requirements

Issue Electronic Reminder to File Returns

ROS issues an electronic reminder to customers to file a return, based on the information received from the core processing systems.

The receipt of a return reminder from the tax application system automatically generates a reminder for the customer through ROS. The reminder is presented in CIS. A corresponding mail is sent to the customer informing him of the existence of the correspondence.

Issue Second Reminder to File Returns

ROS issues a second reminder to file a return. The reminder is in the standard format issued by the core processing system (e.g. a .pdf file for output from ITP).

The reminder is included in the customer's inbox, and the customer may access the reminder in the same way that they access the Statement of Account. In addition, a corresponding e-mail is sent to the customer informing them of the new correspondence.

Issue Electronic Payment Compliance Correspondence

The approach to payment compliance correspondence mirrors the approach for returns reminders.

For ITP customers, the payment compliance correspondence created by the ITP system is made available to ROS in the form of .pdf files. The files include reminders and demands. The receipt of output in .pdf format for customers generates a corresponding e-mail to be sent to the customer.

Payment compliance correspondence is also issued by the Income Tax and Corporation Tax collection systems. Files notifying ROS of correspondence are generated by the collection systems. The files follow an agreed format. A matching e-mail also issues in this case.

Issue Electronic Return Compliance Correspondence

The approach to returns compliance correspondence is the same as the approach for returns reminders.

For ITP customers, the returns compliance correspondence created by the ITP system is made available to ROS in the form of .pdf files. The files include estimates. The receipt of output in .pdf format for customers generates a corresponding e-mail to be sent to the customer.

Returns compliance correspondence is also issued by the Income Tax and Corporation Tax collection systems. Files notifying ROS of the correspondence are generated by the collection systems. Files follow an agreed format for the customer's inbox in ROS. A matching e-mail also issues in this case.

Issue Electronic Receipts

Customers making payments on ITP receive confirmation of the payment in two stages. The customer enters the payment, signs his submission and then receives notification from the system that the payment has been accepted together with a unique PRN number. This confirms to the customer that the transaction has been successfully entered into ROS. The payment is then processed by the existing systems overnight. The payment reception process generates a receipt within ITP or the Collection systems.

The ITP receipts are issued in the form of .pdf files. These .pdf files are interfaced down to ROS and populate the customer's inbox. A corresponding notification e-mail to the customer is also issued.

A file identifying the receipts issued by the Income Tax and Corporation Tax collection systems is also interfaced to ROS. The receipt files follow an agreed format. A corresponding e-mail to the customer may also be issued.

Issue Notice of Assessment

Electronic notices of assessment generated by the Income Tax and Corporation Tax assessing systems are issued by ROS. The process is similar to that for compliance documentation.

The electronic notice of assessment is inserted into the customer's inbox. An e-mail issues to the customer notifying him of the correspondence.

ROS System Interfaces

Overview

Interfaces associated with the present invention include:
ROS on-line interfaces to customer agents and Revenue staff
ROS database updates based on interface files produced by ICTD staff
ROS extracts to support the updating of the core processing systems.

The ROS database closely mirrors the existing ITP database. Wherever possible the ROS data is held using the same structures and format as ITP. This approach has significant benefits which may become even more apparent in the future when the Income Tax and Corporation Tax systems are within ITP. The benefits include:
The interface code is straightforward to develop and test
Performance is optimized as the interface involves no reformatting of data.
The extract from ITP is therefore a quick and easy series of table copy statements
ITP code may be reused for ROS services cutting down the development and maintenance requirements
The potential exists of moving to a real-time interface to ITP (e.g. through the use of a store and forward approach or by direct access to ITP) without impacting the underlying ROS code if such a requirement should ever arise.

Interface Requirements

ROS Interfaces to Public

The ROS interfaces include:
Access to ROS secure services
Returns Filing
Returns Reception
Customer Information Services.

The CIS system for Phase 2 bears much similarity to the information available in ITP in terms of presentation and content. Given the knowledge and understanding of ITP, one may reuse the object code developed for ITP to support the CIS queries.

On-Line Interfaces

These interfaces are consistent with the remainder of the Revenue web site and are aligned with corporate standards. They are based on ROS. Where appropriate, the interface design may draw on the resources of specialized internet interface companies. Interact, who are currently defining the future appearance of the Revenue website are part of the team.

The ROS interface is built using HTML. The use of this standard format for navigation through ROS and for filling forms ensures that the entire Revenue site contains a consistent look and feel. In preparing the response to this tender, the choice of HTML was based on the following factors:

Openness—HTML can be used on a wide variety of platforms. The leading specialized forms products on the market are designed for Windows platforms only. The ROS solution is truly an 'open' system in line with the requirements in the RFI.

Reliability—The use of HTML for the front end avoids a dependence on a plug-in or other third party software. This avoids the inconvenience to the customer of downloading the plug-in and more significantly, removes a potential threat to the reliability of ROS caused by any versioning or platform specific compatibility issues introduced by the plug-in. the experience in testing a number of established forms software products on a range of PC's identified that even slight inconsistencies in the set-up and versioning of a PC can lead to problems in successfully using the forms products.

Cost—the use of an open HTML/XML approach does not introduce any cost for either Revenue or the customer.

Off-Line Interfaces

Those customers who wish to complete returns off-line are provided with a downloadable form implemented as a Java applet. The same considerations that determined the choice of HTML for the on-line interface (i.e flexibility, reliability and cost) also underpin the choice of Java for the off-line interface.

The batch interface for third party application software files to be submitted to ROS is a simple flat file. ROS customer information service is designed to support multiple different outputs from Revenue. It fulfils the Phase 1 requirements for ROS CIS.

ROS Database

The ROS database is closely aligned with ITP. The extracts to populate the database from ITP are simplified by the fact that the ROS database mirrors ITP. This simplification expedites development testing and overall performance.

Data Extracted from the Core Processing Systems

Figure 30:
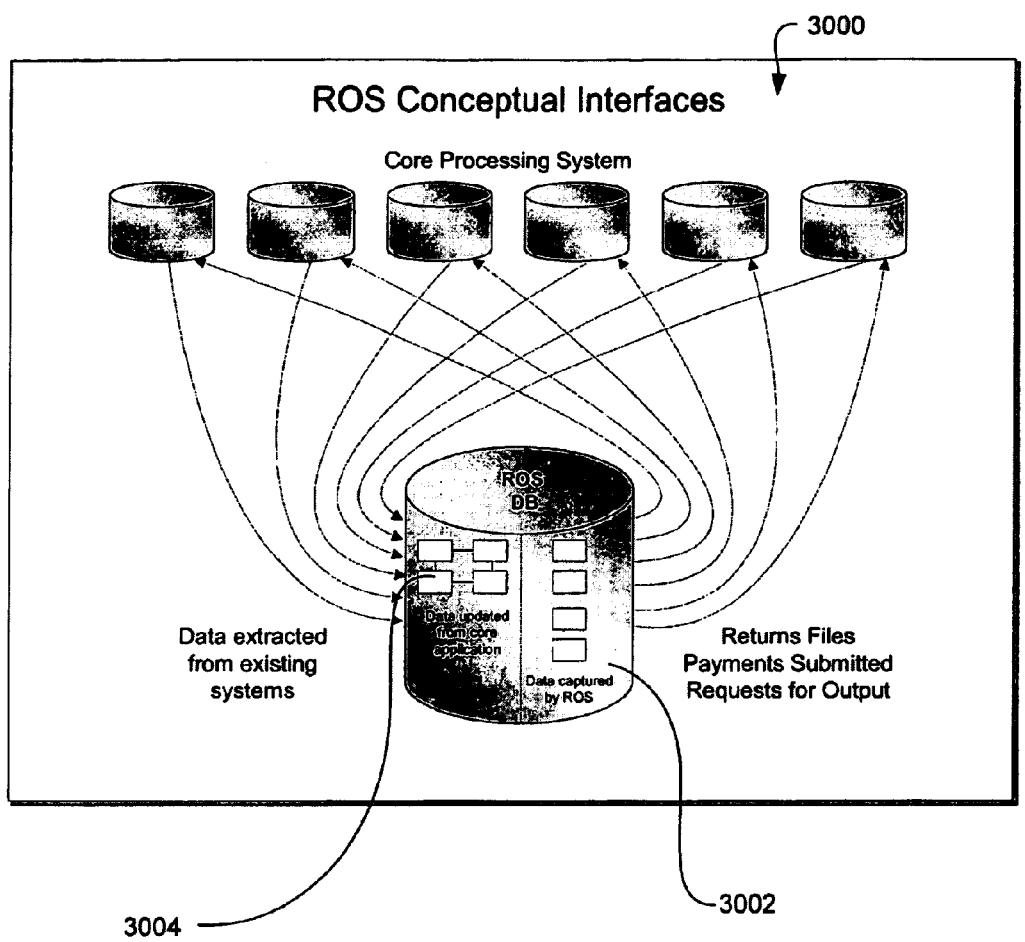
FIG. 30 illustrates Outline ROS Database Interfaces. The ROS database holds the data extracted from core processing systems in one integrated database in accordance with one embodiment of the present invention.

FIG. 30 illustrates Outline ROS Database Interfaces 3000. The ROS database holds the data extracted from core processing systems in one integrated database 3002. ROS follows the same database design approach as ITP.

The ROS database design follows the integrated approach adopted for ITP. This positions ROS for the future, when all the major taxes may be included in ITP. The data relating to the IT and CT taxes, which are currently not in ITP, are stored on integrated database tables 3004 in ROS.

Adopting an integrated design for ROS which is based on ITP offers the following benefits:

The alignment of the ROS database design with ITP facilitates the introduction of new taxes and forms onto ROS. All the major taxes administered by Revenue may at some stage in the future be incorporated into ITP Alignment with ITP also minimizes the maintenance associated with budget changes as code developed for ITP can be reused in ROS The potential exists to reuse ROS code in ITP as the next generation of Tuxedo products may support Enterprise Java Beans. The ROS application code is written using EJBs The long term maintenance effort for ROS is reduced. The delivery of ROS on an integrated database significantly simplifies the ROS application itself as the system is built using common components across all taxes. This makes the application easier to both maintain and develop.

Data Captured by ROS

The data captured by ROS is held on a set of database tables which are distinct from those tables populated by extracts from the core processing systems. This division of the data simplifies the interfaces between the existing systems. The processes of extracting data from the existing systems and loading data up from the existing systems are therefore entirely independent. This independence eliminates any operational dependencies between the ROS extract of the return and other information for the legacy systems and the ROS uploading of the current tax data from the existing tax systems.

Extracts Provided by Revenue

Phase 1 Extracts

The extracts required for ROS Phase 1 are as follows:

Integrated Tax Processing system (ITP)—The ROS database mirrors 12 ITP data tables. The ROS database is designed to align with ITP. The extracts from ITP to ROS are therefore straightforward and quick. The effort required for development and testing is reduced as no reformatting of data is required. The data extracted from ITP for ROS Phase 1 is restricted to customer and agent registration information, Statements of Account and the returns status information. The extracts involve a copy out of a limited number of ITP tables in their entirety. Extracting tables using the copy command is a very efficient process. Even the largest table in ITP takes only a matter of minutes to extract. The extracts therefore may have minimal impact on the overall ITP batch window.

AIM extract—An extract is required from AIM informing ROS of ROS customer direct debit details including the customer bank account number and sort code. The bank account number and sort code are used to pre-populate the direct debit 'payslip' on the ROS forms.

Figure 31:
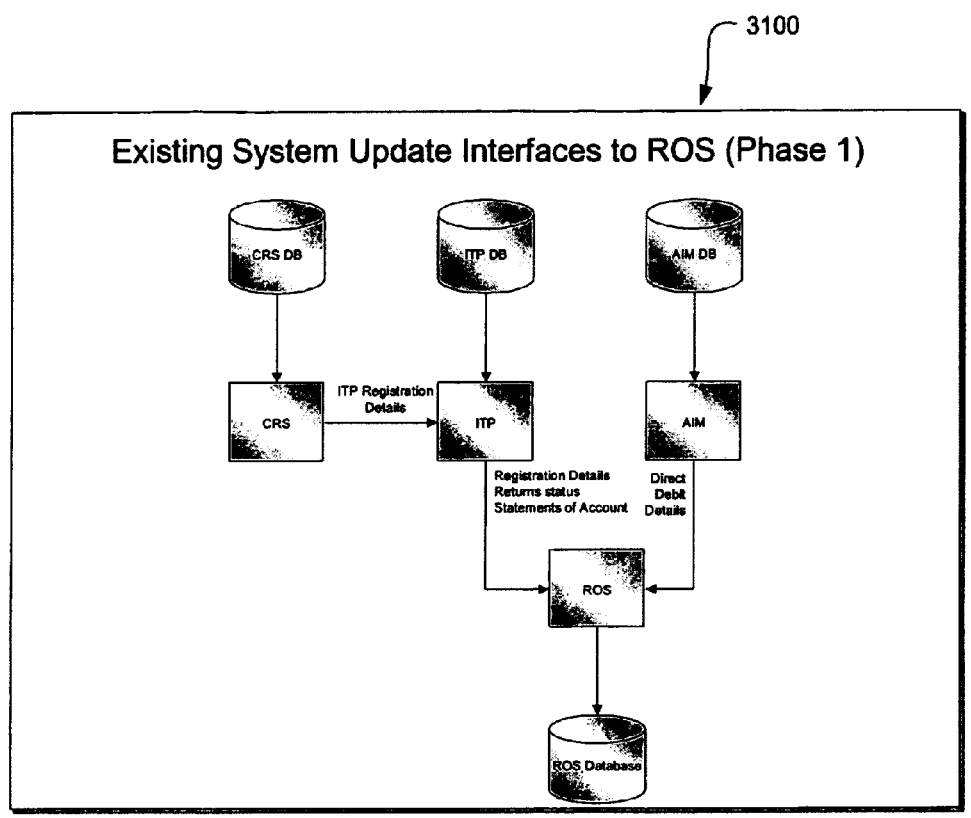
FIG. 31 illustrates Phase 1 Existing System Update Interfaces in accordance with one embodiment of the present invention.

FIG. 31 illustrates Phase 1 Existing System Update Interfaces 3100. The diagram includes the extracts referred to in the section below.

Phase 2 Additional Extracts

The extract from ITP for Phase 2 includes financial details to support CIS in Phase 2. As the ROS database is aligned with ITP, this extract is straightforward for ITP taxes. The advantages outlined for the Phase 1 extract are speed of development, testing and speed of operation.

The registration data to support ROS for Phase 1 comes from ITP. Extracts from DRS and PAYE are not required.

Other Extracts

The extracts for the Income Tax assessing, Corporation Tax assessing and Income Tax/Corporation Tax collection system are specified as required.

ROS Output to Customers

Figure 32:
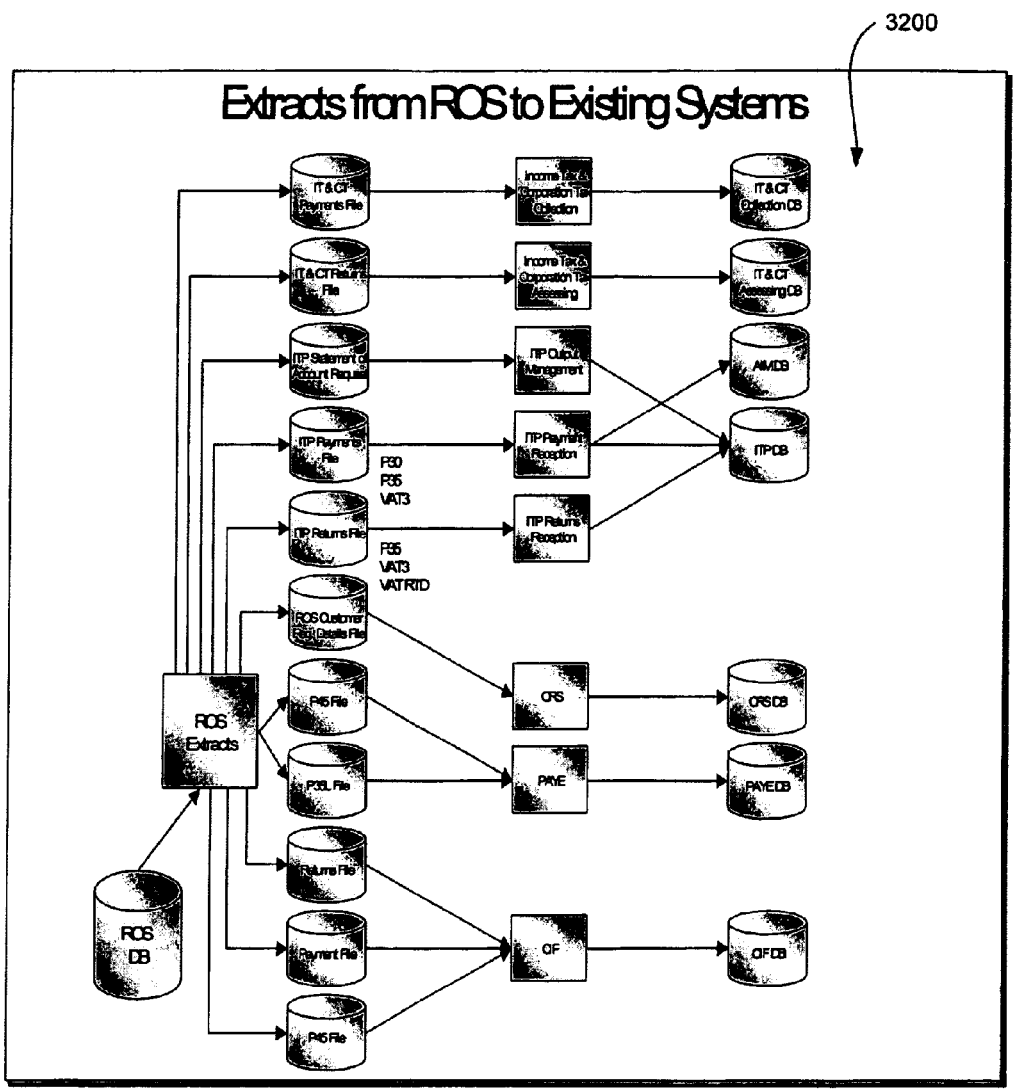
FIG. 32 illustrates an outline of all the ROS interfaces to the core processing systems in accordance with one embodiment of the present invention.

FIG. 32 illustrates an outline of all the ROS interfaces to the core processing systems. Output from ITP, PAYE, the IT and CT collection and assessing production systems may be directed to e-filers through ROS.

It is assumed that the output issued from the core processing systems to ROS may be based on .pdf images. Output presented in other formats could be reformatted by ROS to a HTML format. However it is assumed that this may not be necessary. Customers may be informed of the issue of output through ROS as follows: CIS provides a customer information service where customers may view the latest output from Revenue. This facility caters for multiple types of output including both HTML based output and output produced in a .pdf format. Both of these outputs may be printed. ROS identifies that a mail has been accessed by the customer. The mail therefore cannot be repudiated. The current design distinguishes between a customer and their agent accessing the mail.

E-mail—correspondence issuing from the core processing systems and delivered to ROS triggers an automatic e-mail to the customer. The e-mail informs the customer that a mail has been delivered to CIS. The customer accesses ROS to read the output. It is not mandatory for customers who register for ROS to enter a mailbox.

Interfacing ROS Return Details to Revenue Systems

ROS returns and their associated payments are interfaced back to the following core processing systems:

ITP (P35, VAT3, VATRTD returns)

ITP (P30, P35, VAT3 payments)

Income Tax and Corporation Tax Assessing (Form 11 and CT1 returns)Income Tax and Corporation Tax Collection (Form 11 and CT1 payments).

The interface files are in an agreed format.

The payment and return details are interfaced back to the existing assessing systems via a nightly batch interface. The interface may be run in advance of the nightly updates for the corresponding system.

ROS payment files are also extracted. These are submitted to the existing collection systems for processing. In the case of the P30, the return file corresponding to the payment file is not necessary. The payments need to be processed by the existing payment reception system. The files are in a format suitable for direct input into the existing payment reception systems where feasible.

Updates to Revenue Systems

The updates to the core processing systems for both returns and payments are handled by ICTD and potentially outside contractors.

For ROS Phase 1 an alternative approach is to interface the ROS customer indicator directly to ITP.

Changes Needed to CIF

Agreed interface files to update CIF are periodically produced by ROS. Data captured by ROS is held on separate tables for extract to CIF.

A possible future alternative approach is to store and forward individual transactions to CIF on a continuous basis. This approach is particularly feasible if the ROS and CIF databases are built using same underlying database, CA/Ingres II.

Many P45s (part 1) may continue to be submitted to Revenue on paper. An additional benefit of ROS is that Revenue users could potentially use ROS to enter these P45s on-line. This facility in ROS creates the potential to capture all P45s on-line.

AIM System

The direct debit tape for the bank is created currently by the AIM system. ROS payments are interfaced to AIM. It is assumed that the payment file for AIM is generated by the appropriate payment processing systems (ITP and IT/CT Collection).

DRS

An interface file for the DRS system is produced by ROS. The interface with the DRS system is not required for Phase 1 as repayments for VAT and PAYE-Employer are handled by the ITP system. The interface file caters for Income Tax and Corporation Tax repayments to customers.

Access Control System for Tax Agents and Companies

Security is a vital component of the ROS system. Both Revenue and the customer can be satisfied that the security arrangement for ROS prevents unauthorized access to information or unauthorized return filing.

The approach to the access control system for tax agents and companies maintains a consistent security strategy throughout the system. Employees within tax agents and companies who have been authorized by their management to access the systems, may access ROS on the basis of their individual employee digital certificate. Companies may therefore have multiple certificates as required.

The ROS system recognizes one key digital certificate registered with Revenue by the company as the primary certificate. The holder of the primary certificate within a company, presumably a member of senior management, may be entitled to set up in ROS additional certificates for employees to access the company's data. The primary certificate holder may add, amend and delete the authority given to an employee of a company.

Functional Requirements

The ROS secure access control system is used for both tax agents and company management. Tax agents may however have an additional function which allows them to restrict the customers which their employees may access.

The primary certificate holder specifies the identifier of the certificate that they wish to add, amend or delete in the ROS access control system. Tax agents who are adding or amending a certificate are then offered a screen where they specify the customers to which the new certificate may not have access. the research in the taxation market indicates that, in general, tax agents allow employees access to the majority of their customers.

The ROS access control maintains a consistent level of security throughout the system. All users (whether they are individual customers acting on their own behalf, agents, employees of agents or company employees) may have unique digital certificates which individually identify their actions. All returns are signed when submitted. Company employees and agent employees may have a unique digital certificates, in order to operate on the system. The primary certificate for the company or agent is only held by senior management.

Access Control

The administrative function for access control may be performed by the holder of the organization's primary certificate.

The administrator function may include a list which identifies all the certificates currently authorized to access that company's information. When adding or amending a certificate the administrator may attach a name to the certificate. The name is used to identify the certificate to the administrator in the future.

The administrator in a tax agency may restrict access at either customer level or registration level. The administrator within a company can also restrict access at registration level. The administrator grants particular privileges at registration level. The privileges include the following:

View, which entitles the user to access that particular registration in CIS,

File, which enables that particular user to file a return and,

Add, update and delete, which enables a user to access the return form for a customer. The add, update and delete privilege does not entitle a user to file a return. The user instead completes the return on his local machine and the return is then saved locally. The user with 'file' privileges may then submit that return either as part of a batch or on an individual basis. The function to restrict activity to a particular tax head or range of tax heads is achieved by restricting activity to registration numbers.

Control and Management

The control and management of the administrator function is entirely at the company or tax agent's discretion. An employee joining the agent or company may require a digital certificate in order to enable them to work on the system. The administrator may revoke a digital certificate at any time. This facility is required when an employee leaves the company. This approach entitles the company or agent to recover the digital certificate that the employee used whilst working for that company. This prevents the employee from using that certificate after their period of employment. As already stated, the company may also revoke a certificate's authority should they not be satisfied with recovering the certificate itself.

The control and management function in ROS is entirely within the control and ownership of Revenue.

Access System Security

The use of individual and unique digital certificates for accessing the system ensures that the user of the system is clearly identified and authenticated. The integrity and confidentiality of data entries is assured through the digital certificate signing mechanism. Under current legislation, the use of a digital certificate is recognized as a form of legal commitment and therefore cannot be repudiated.

The system security and audit trail functions are built for ROS. The audit trail reporting mechanisms developed for individual users of ROS remain in place for company employees and agent employees. The database of access authorities and privileges is maintained within ROS.

Agent is No Longer the Registered Agent of the Taxpayer

The nightly refresh of the ROS database ensures that the customer-agent relationships held on ROS correlate to those held on CRS. When an agent logs onto the system the agent is offered a list of customers which he can access. The agent may also short cut the selection process by entering an RSI number directly. Under either circumstance the agent may only be entitled to access customers with whom he is registered in CRS.

The agent-customer relationship is defined in CRS at registration level. ROS access is therefore also defined at registration level. Therefore, if an agent is only entitled to file returns for a limited range of that customer's registrations, only those registrations may be available to the agent for use.

ROS System Security

Security is key to the success of ROS. Modern electronic intruders are prepared and organized. Intruders exploit passwords, attack protocol flaws, examine source files for security flaws, abuse anonymous FTP, seek to break into web servers, and e-mail. Intruders also use sophisticated toolkits, such as 'packet sniffers', which look for information in connections between machines. The security system for ROS addresses these risks comprehensively.

ROS addresses the two main security areas involved in a netcentric solution:

Secure Protocols

Secure Infrastructure Design

Secure Protocols. This involves protecting information exchanged over networks. It includes the following topics:

Authentication: Ensuring the customer is who they say they are, both client and server (via digital certificates).

Encryption: Only the customer and Revenue have access to confidential information (via SSL encryption).

Integrity: The information received by ROS or the customer originated from the place declared, is unaltered and arrives unaltered (via digital signatures).

This issue is described in more detail in the Government publication on security referenced in the RFT 'A Secure and Trusted Electronic Business Environment for Government'.

Secure Infrastructure Design

This involves protecting systems connected to networks. The infrastructure design for security includes both hardware and software. Hardware protection includes the provision of firewalls and the provision of separate machines for the public and secure areas in a system. Software protection focuses on locating code to maximize security. Therefore sensitive code which may be the subject of attack is located in secure areas of the system.

Other considerations that ROS addresses are non-repudiation and traceability. These are important as the objective of ROS is to handle transactions with legal validity over the internet.

Authentication Application Protection

Use of Digital Signatures

Strong authentication over the internet involves the use of digital certificates. To prevent unauthorized use of a digital certificate, a password is requested each time a secure session begins in ROS. The credibility of the digital signature and therefore the ROS solution is based on the assumption that the digital certificate has been issued to the correct entity. Therefore, the role of Certificate Authorities is key to the success of ROS. ROS data is signed using the RSA SHA1 algorithm, in accordance with the X.509 standard.

The ROS system may guarantee the integrity of data

Integrity is supported through the use of digital signatures.

A digital signature is a bit stream generated using the source document and the user private key. If a single bit is changed in the source to be signed, the bit stream may be completely different so it is impossible for somebody to change the source without invalidating the digital signature.

ROS ensures the integrity of data transmissions to and from the customer. The approach is in line with the paper published by the Government entitled 'A Secure and Trusted Electronic Business Environment for Government'.

Identification and Authentication

ROS guarantees the identification and authentication of the communication. Identification is based on the use of a digital certificate to identify both the customer and ROS server.

There are two types of authentication, server authentication and client authentication. Server authentication deals with ensuring that the server is who it claims to be. Client authentication deals with ensuring that the client (user) is who they claim to be. Both types of authentication are included in the ROS System.

Server Authentication: This type of authentication ensures that the customer can be certain that communication with ROS is actually going to the authentic ROS server and not to a system that 'simulates' the ROS System. This is accomplished using the SSL protocol and server digital certificates issued by an approved Certificate Authority (CA). This is a well known procedure and is implemented in almost all web browsers.

Proposed Solution: SSL+X.509 Server Digital Certificates

Client Authentication: Allows the ROS server to ensure that communication is being performed with the identified customer and not anybody else.

This is accomplished using the SSL protocol and client digital certificates issued by an approved Certificate Authority (CA). A second level of security is obtained by requesting a user to type in a password when the digital certificate is used. In addition to these two authentication methods, a session timeout automatically logs users out of the system if they are without activity for a given period of time.

Proposed Solution: SSL+X.509 Client Digital Certificates+PIN or Password+Session Time Out Protection Non-Repudiation ROS communications and transactions cannot be repudiated by the customer. Communications to the customer are accessed through the customers inbox in CIS. The ROS system tracks whether or not a document has been previously accessed.

Transactions cannot be repudiated as each transaction is explicitly signed using customers digital certificate. Each transaction is written to an archive in the form in which it was received by ROS. ROS adheres to the requirements for digital signing defined by the 1999 Finance Act (Section 917F). When submitting return, ROS requires the customer to sign a text package that comprises the relevant field name and the data filled by the user. This transaction cannot be repudiated.

Encryption/Decryption

Encryption ROS guarantees the confidentiality of data using encryption and decryption. As the internet is a shared communications infrastructure, the only way to prevent non-members of the communication understanding (or changing) the information is encryption.

There are a lot of methods (protocols) to encrypt the information that flows between two points. The most commonly used over the web is SSL. It is implemented on all web browsers.

40-bit SSL, with which the ROS solution is currently built, has been demonstrated to be insecure under exceptional circumstances. Large numbers of high end computers have broken the code after several months processing time. The 128-bit SSL protocol should ideally be used to ensure that is not possible to decrypt the communication channel. This protocol cannot be exported outside USA and Canada except by Government and Banking organizations who can request permission to use 128-bit SSL.

Proposed Solution: 128-Bit SSL

Audit Trail and Transaction Logs

The Application Server includes an audit trail to store all the packets received and sent to the Internet. A transaction log is built as part of the Technical Architecture, conforming to the ROS functional requirements.

System and Data Recovery

System and data recovery is provided for in the ROS technical architecture. The key to approaching this problem is to minimize the possibility of failure occurring. The architecture enables the hardware configuration for ROS to be clustered.

The availability of the system can be guaranteed using clusters. If one component of the system breaks, another copy of the component, operating in the same machine or in another machine of the cluster may take the control over the current transaction. BEA WebLogic supports clustering. System failure therefore may only occur in the event of an unlikely coincidence of multiple failures across all the machines in the ROS cluster.

BEA WebLogic also supports transaction isolation. Transactions are therefore fully rolled back if a severe application error is encountered ensuring that the database retains a consistent state. Recovery procedures are specified for possible failure conditions. Procedures for communicating a system failure to customers may be agreed with Revenue. These may include the use of a back-up facility.

System Security

Revenue Integrity

Firewalls perform the function of:

Virus checking

Hacking monitoring and protection.

Statistics on performance may be available to enable performance monitoring.

The database includes strict referential integrity rules to guard against corruption.

Revenue System Security

The core Revenue system is not directly linked to ROS. Files transferred to the main Revenue system may be virus checked before transmission.

The method for transferring files may be agreed during the design process. The chosen method may balance the risk of attack against the operational inconvenience of the various methods.

ROS System Security

ROS is built with a flexible architecture. This enables Revenue to procure the best of breed web servers and firewalls to protect the ROS system.

All data written to the system comes from a customer with a digital certificate issued by an approved Certificate Authority. The data itself is validated before being written to the database.

Certificate Authority revocation lists may be checked to ensure the digital certificate used by a customer is still valid.

Both Software (Anti-virus, Firewall software) and Hardware (Screening routers, Firewalls) can be installed to ensure the integrity of the system. There are a number of recommended firewalls that protect the system against hacker attacks (e.g. spoofing, port scanning).

Customer's Computer System Security

The software supplied by ROS may not compromise a customer's computer system. The ROS client configuration system requirements are minimal and standard. The downloaded forms are Java applications running on a Java virtual machine (also downloaded if required). This software is thoroughly checked for viruses prior to release to live.

Session Security

Customer Session 'Time-Outs'

BEA WebLogic, as well as other Application Servers, has a feature to determine a time-out interval for the transactions initiated on the system. Any time-out produced may be caught by the application and the whole transaction could be rolled back or saved as uncompleted work. The time-out period can be controlled and adjusted by Revenue. A visual guide to time remaining is included in ROS.

Response 'Time-Outs'

If the Revenue site is stalled, ROS is dependent on the client machine to recognize this fact. The client browser is the controlling software in this situation on the client machine.

Slow Response Recovery

The customer may exit the ROS system at any time.

Where a customer has already submitted a transmission to Revenue, he does not have the option to cancel the submission, regardless of the response time. There is no 'fast path' available on the internet to enable a transmission to be intercepted.

Uncompleted Work

Only the information that arrives at the ROS system prior to a time-out can be saved as a partial return. Time-out can occur because of the network failure. The information does reach the ROS system in this case.

Additional Security Features

Supplier Proposed Security Feature

It is important to note that the approach to security is twofold:

It includes the provision of a best practice security approach based on the experience of implementing secure solutions for the Spanish Government and for financial institutions in Europe a security conscious approach has been adopted to application design.

Sensitive code is located carefully on secure parts of the system.

Alternate Embodiment

In an alternate embodiment, business data may be filed separate from the forms filed. The present invention may thus take the form of a consolidation of information and more of a business of processing information based on a-priori information and filling using the information repository. The information repository could file Sales and Use Tax based on provided information to a central application. The present invention may thus meet the needs that deal with the centralizing of information and distribution by the application on the part of the taxpayer.

The present invention may also provide estimates of tax liability based on previous fillings, and afford the ability to indicate if the filling is out of line with past filings. This provides a means to use the gathered data from prior interactions the taxpayers benefit. This is preferably accomplished without making private data public, but rather using to server the consumer and assist in their interaction with the government.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

As set forth earlier, the principles of the present invention may be easily applied to accommodate a tax service of any country including the United States of America. Additional information will now be set forth regarding such implementation.

The present invention which may comprise the bulwark of a Taxpayer Service Center (TCP) that may consist of an updated and modified market offering. Using the existing shell, the structure may be extended and modified to meet the general requirements of US State governments. This may include optional digital certificate/UserID PIN entry functions, partial form completion and save functions for the online user, broad range of payment structures to include the possible addition of packages for credit card, EFT and electronic check, or the passing of the proper information to a legacy application that processes these payments. Further, the system may be enhanced to allow reporting of financials at multiple levels.

Figure 33:
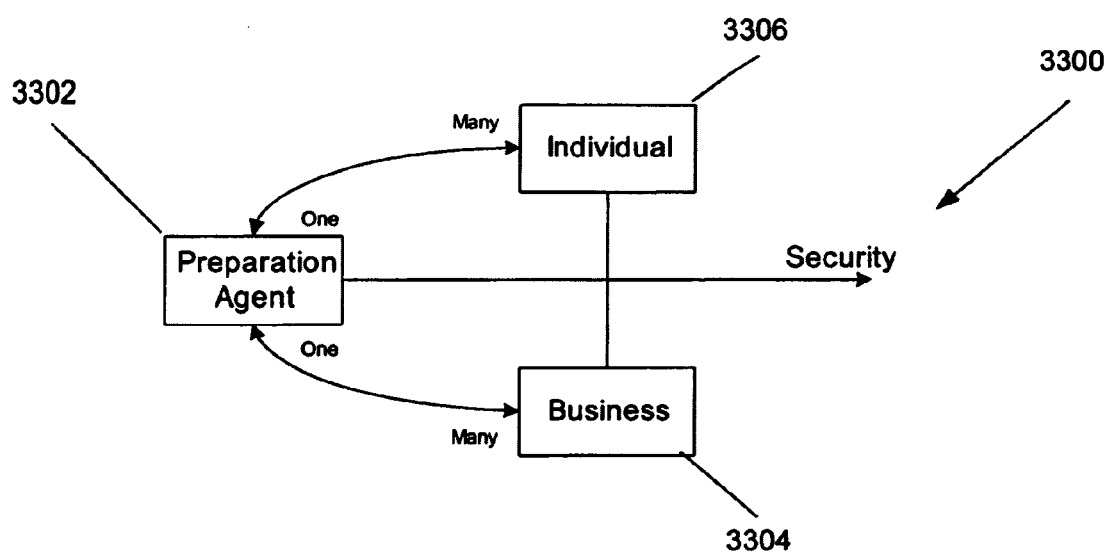
FIG. 33 illustrates a constituent model showing the manner in which the present invention may be based on relationships.

FIG. 33 illustrates a constituent model 3300 showing the manner in which the present invention may be based on relationships. The Taxpayer Service Center may be based on a three tiered definition of the users, to include a one to many relationship between the Preparation Agent 3302 and the Business 3304 and Individual 3306. This allow the Agent to act for others as well as for him/herself.

The security process may be aligned to allow both certificate recognition across a defined set or where ID and PIN are used, to allow access based on group definition for the agent.

The Digital Certificates process may be based on the standards defined by the CCITT X.509; this may allow certificates to be read or written by any application complying with X.509. Digital Certificates use public key encryption techniques that use two related keys, a public key and a private key. In public key encryption, the public key is made available to anyone who wants to correspond with the owner of the key pair. The public key can be used to verify a message signed with the private key or encrypt messages that can only be decrypted using the private key. The security of messages encrypted this way relies on the security of the private key, which may be protected against unauthorized use. This process allows the system to recognize multiple certificates against a single user, an Individual or Business. It is necessary that the concept of multiple users exists to support the business concept and that of the Preparation Agent. In both these cases, more then one individual might have the rights to act on and for the individual. This treats a business as a de-facto individual with more than one responsible agent. The same is established for the individual and thus the agent may act for others as an agent or for him/herself as an individual.

The system may also be robust enough to support the concept of partial completion activity. There may be the ability to partially complete an activity and still come back at a later time to complete the activity. This is readily supported in the Enterprise Java Beans (EJB) environment as the Stateful Session Bean that represents the activity can be streamed to a database to be retrieved at a later time. This ability is based on the general concept of what a Stateful Session Bean is and how it interacts in the system. The Stateful Session Bean carries the state of the action it is responsible for. Thus, with the knowledge of the Perquiescent data related to the activity and the state of the action in process, the bean and its unique identifiers can be place in quiescent state for a period of time and restored when appropriate. There is one limitation to this process and that is that the system or application suspending the activity may be substantially the same to restore. There could be version issues as the systems change over time. This would require careful planning to upgrade the system and ensure that any saved work is migrated with the changes in the system. One would anticipate at this time that saved work under this practical completion scenario would only exist for some period of time (ie: 7 days) to simplify this process.

Enterprise JavaBeans Technology

Enterprise JavaBeans™ (EJB) technology defines a model for the development and deployment of reusable Java™ server components. Components are pre-developed pieces of application code that can be assembled into working application systems. Java technology currently has a component model called JavaBeans™, which supports reusable development components. The EJB architecture logically extends the JavaBeans component model to support server components. The architecture provides three basic elements: properties, methods, and events. Objects are built on three basic components: Session Beans (both stateless and stateful) and on Entity Beans. The stateless session beans are responsible for executing functions for which no state is required. This could be a calculation of return on investment based on stock yield or just the printing of a document. The stateful session beans carry a state and understanding of who they act for. This could be the act of buying stocks and adding them to the users portfolio. This type of interaction spans multiple conversations or method requests and the state of these conversations may be carried with the activity. The third component is the entity bean, which is the persistent component on the architecture. Unlike the session beans which have a useful life that basically spans the users session, the entity bean may exist for the life of the data.

Server Components

Server components are application components that run in an application server. EJB technology is part of Sun's Enterprise Java platform, a robust Java technology environment that can support the rigorous demands of large-scale, distributed, mission-critical application systems. EJB technology supports application development based on a n-tier, distributed object architecture, in which most of an application's logic is moved from the client to the server. The application logic is partitioned into one or more business objects that are deployed in an application server.

Java Application Servers

A Java application server provides an optimized execution environment for server-side Java application components. By combining traditional OLTP technologies with new distributed object technologies, a Java application server delivers a high-performance, highly scalable, robust execution environment specifically suited to support Internet-enabled application systems.

Estimating Factors

The Object structure of the Taxpayer Service Center (TSC) forms process component consists of two basic elements. This first is the core element which comprise the entity identification functions. This is the element that identifies who or what is being dealt with. There are three component elements. These core elements identify who the actions may be performed for in the TSC. Once the ore functions are completed, the remaining activity is related to the actions performed for these entities.

Figure 34:
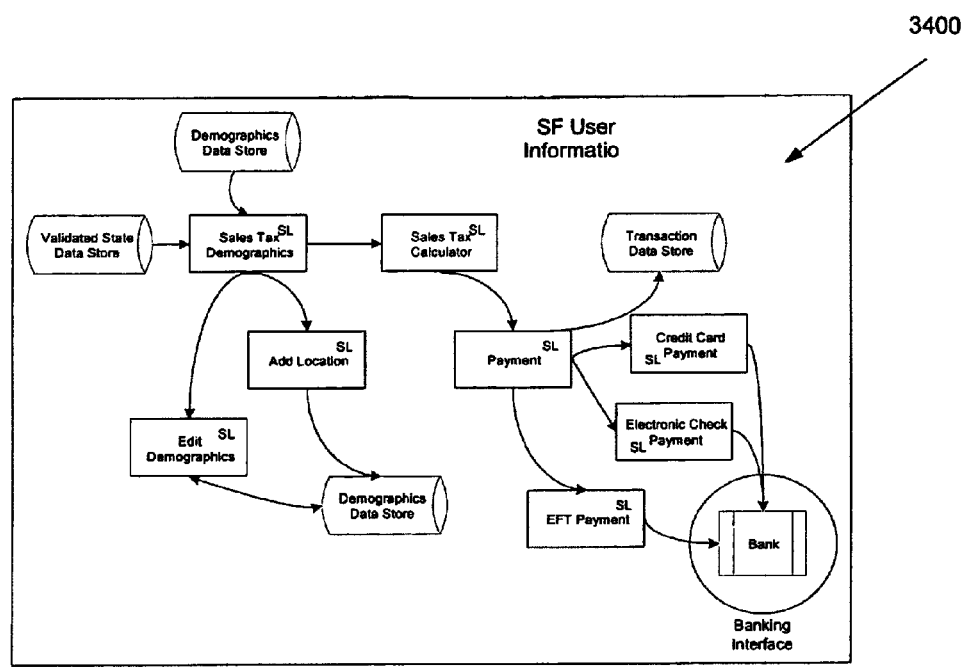
FIG. 34 illustrates the various activities associated with the operation of the present invention, as carried out by the entities of FIG. 33.

FIG. 34 illustrates the various activities 3400 associated with the operation of the present invention, as carried out by the entities of FIG. 33. The primary activities associated with the part of the system is the virtualization of forms. This includes the activity of filling them out, paying fees and submitting them to the appropriate authority. This process of virtualization can not just be a one for one data entry process or there would be no incentive to process forms just to allow electronic submission. The process may take a more global view and allow the user to act on many items. This requires adjusting the requested information to compensate for the activities requested. This means that the user's profile may identify the activities that the user is interested in performing and govern the information collection process to meet the needs of the outlined activities. This process is completely in sync with the ideas put forth in the Business to Government Connection research and allows the TSC concept to work in harmony with that effort.

The process of building an EJB application is the controlled development of the EJB components to perform the intended functions. The general rule of thumb is that there is an 80-20 relationship between the number of stateless and stateful session beans and that for most general applications the entity beans comprise no more the 10 percent of the developed components. These are just general rules and the complexity of the individual application can change these numbers. There are significant reasons for maintaining the ratio's. The cost to the system performance is impacted by the stateful session beans and finally by the entity beans in that order. The cost to the system is a direct relation to the data persistence interactions. The more data carried or retrieved/added to the persistent store, the greater the cost to the performance of the system. The development complexity of EJB components is greatest for entity beans, stateful beans followed by stateless beans. The Sales Tax component can be used as an example of the costs to development. The estimation model is based on the code complexity of the standard Java development or C++. One part of the estimation process that should not be overlooked is the reusability of these components. There are approximately four basic form types: Business/Financial, Compliance, Permit and Licenses. Once the basic form has been defined, there is only the necessity to make minor modifications to meet the new requirements.

The overall system consists of two major components: the core demographics and personalization (D&P) module and the forms (FM) modules. The D&P is the component that identifies who the participant is and what is known about the individual or business. Through this module the system handles security, payments, information exchange and portal personalization. The FM module is directly responsible for the handling, processing and submission of all forms.

General Issues

There are a few cost items that have not been included in the above. These items are related to the general management of a Internet Project and include Graphics, Project Management and Planning, QA and Legal Review, Training Development and up front requirements, development and design.

Figure 35:
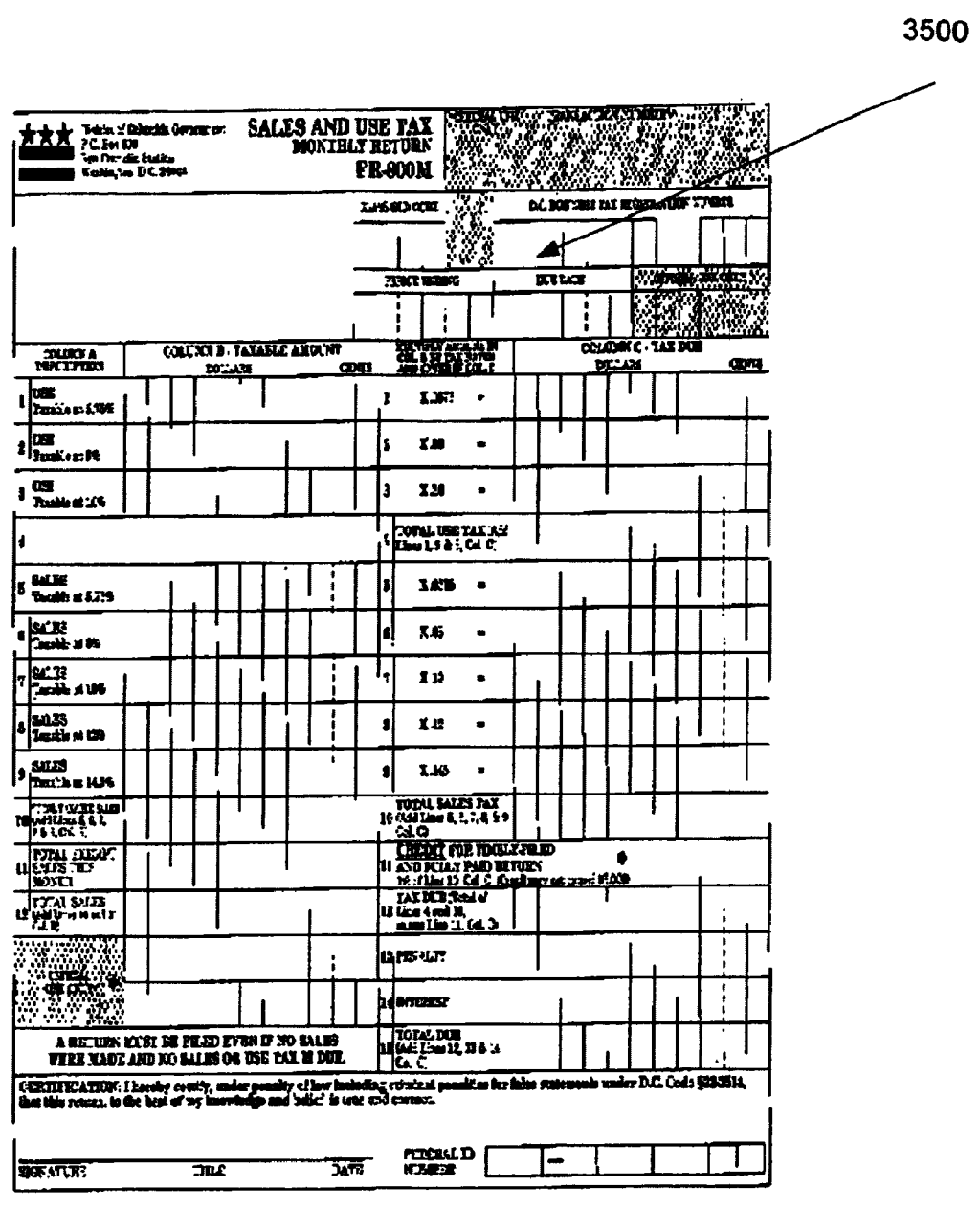

FIG. 35 illustrates a Form FR-800M 3500 for sales tax reporting services in the United States. The Basic model of the present invention can be described in terms of the complexity of the forms to be virtualized and the amount of resources required to translate the form function into the components of the present invention. At the most basic level, the system provides virtualization of a form that is primarily demographics and minor calculation fields. This is illustrated with the by the Monthly Sales Tax Form. The intent is to capture the majority of the forms data in persistent store. Thus, when the business user comes to the site to do the month sales tax, he is asked for the business location and the taxable sales. The remainder of the information is already known and the system can present the total tax value to the user for payment.

Figure 36:
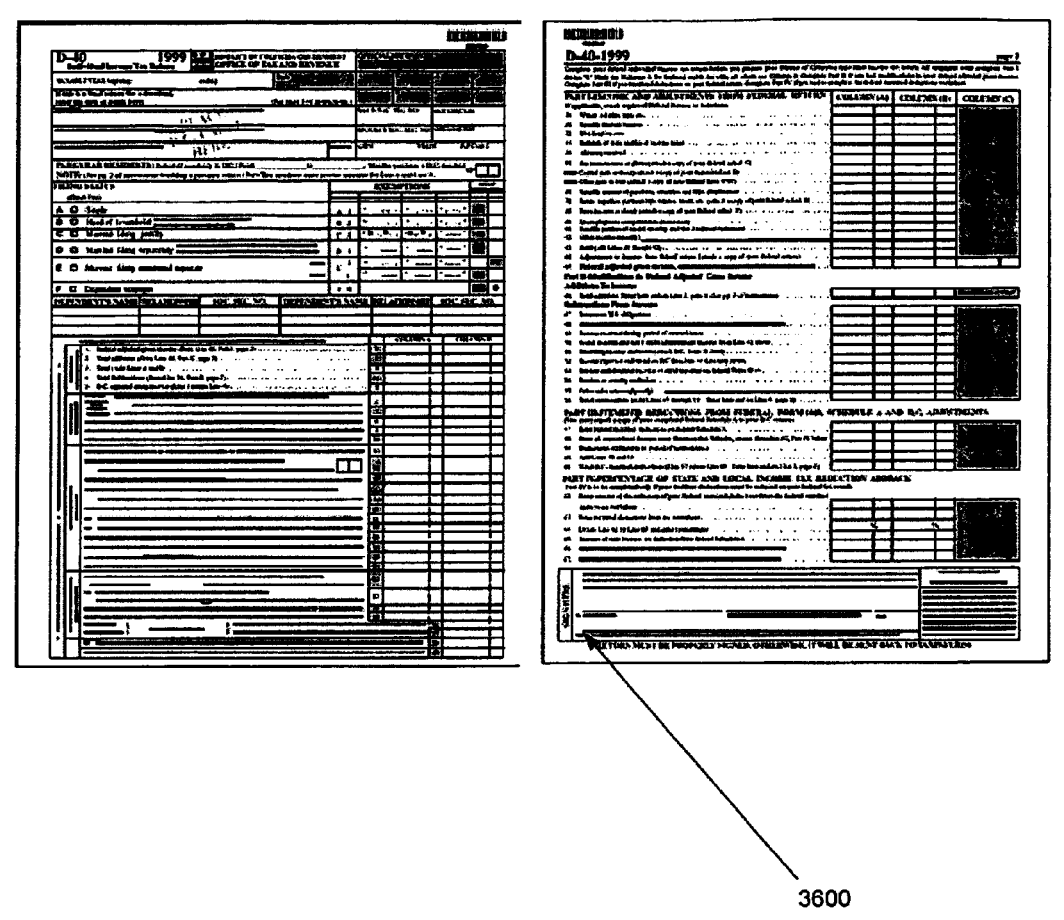

FIG. 36 is an illustration of the Washington D.C. Individual Income Tax Form D-40 3600. The second tier are those forms that require more complex interaction with the client and require validation of information through a separate or independent channel. This is an excellent example of the moderately complex form. This form requires input form the user, employer, state and may also walk the user through a complex set of issues related deductions and income.

The third and most complex form type is one that requires data from multiple external sources and may support complex interactions with data and backend systems. The Washington D.C. Corporation Franchise Tax Return requires the detailing of income, tax, details of corporation books including loss and details to support incentive program eligibility. The form also requires that compensation for corporation officers be detailed. The complexity is a direct relation to the number and type of calculations and interrelated data capture required to complete the form. As with the previous two forms, the intent is to use persistent data where available and to capture this data based on the expected life cycle of this information.

Figure 37:
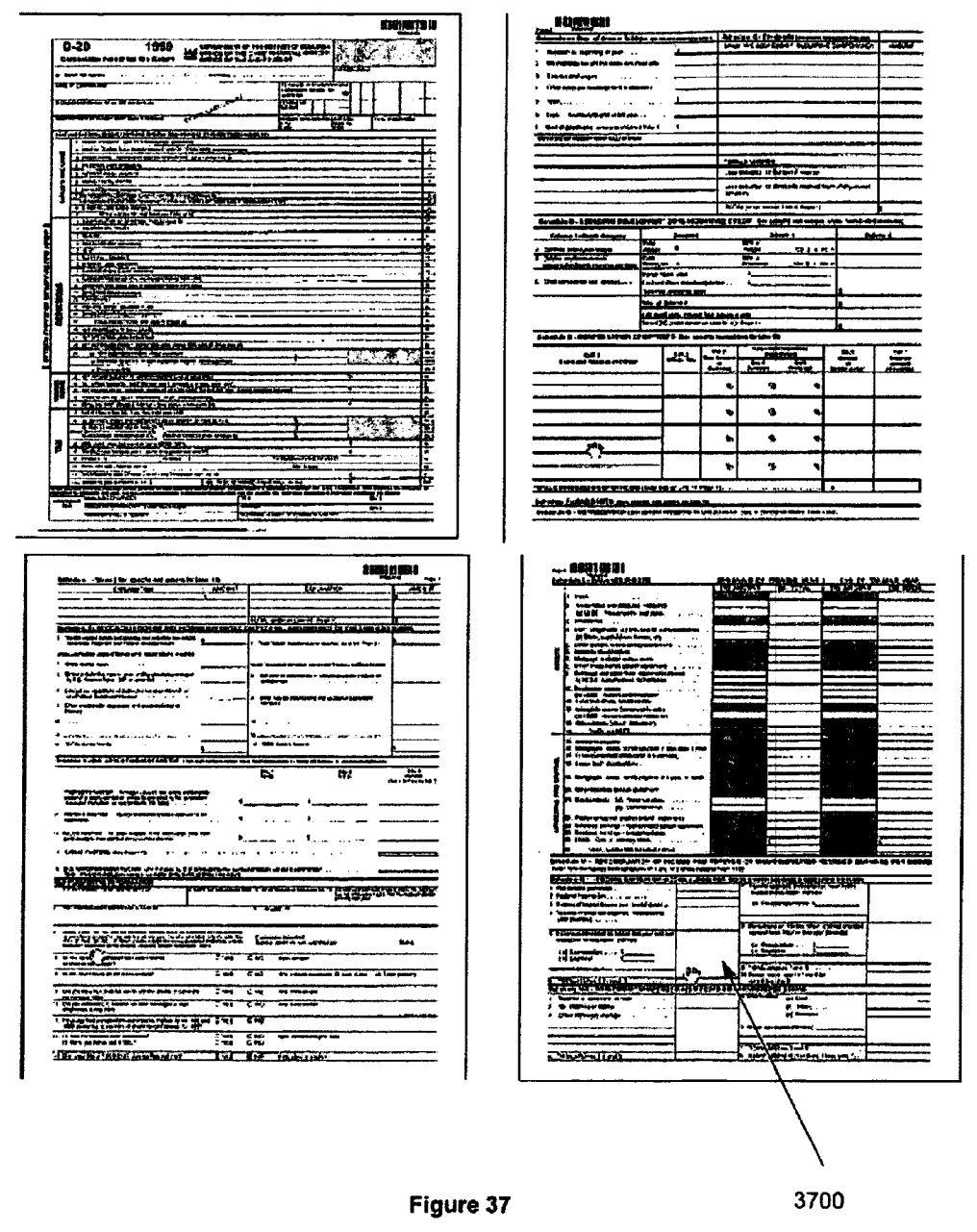

FIG. 37 is an illustration of the Washington D.C. Individual Income Tax Form D-2D 3700. Each of these three form types can be further broken down based on the type of processing performed. This includes the type of front end Authentication, Form creations, Payment functions and Account Balance reporting. Taking in the backend interfaces for these functions, the cost model can be well defined when trying to define the cost of specific applications. Further, the complexity of the forms can be partially determined by the percentage of persistent data maintained with the form. The simple form is expected to have at least 90% of its data carried in persistent store. The sales tax form is a perfect example when it can be seen that the majority of data related to business location, tax number and identification are carried in persistent store. The only information that may be obtained at the time of submission is the amount of taxable sales and the period. The remainder of the information can be pulled for the database. Based on this model, the moderately complex form would be expected to have at least 75% of its data drawn from persistent store and any form with less then 75% held in the database would be considered a complex form.

Figure 38:
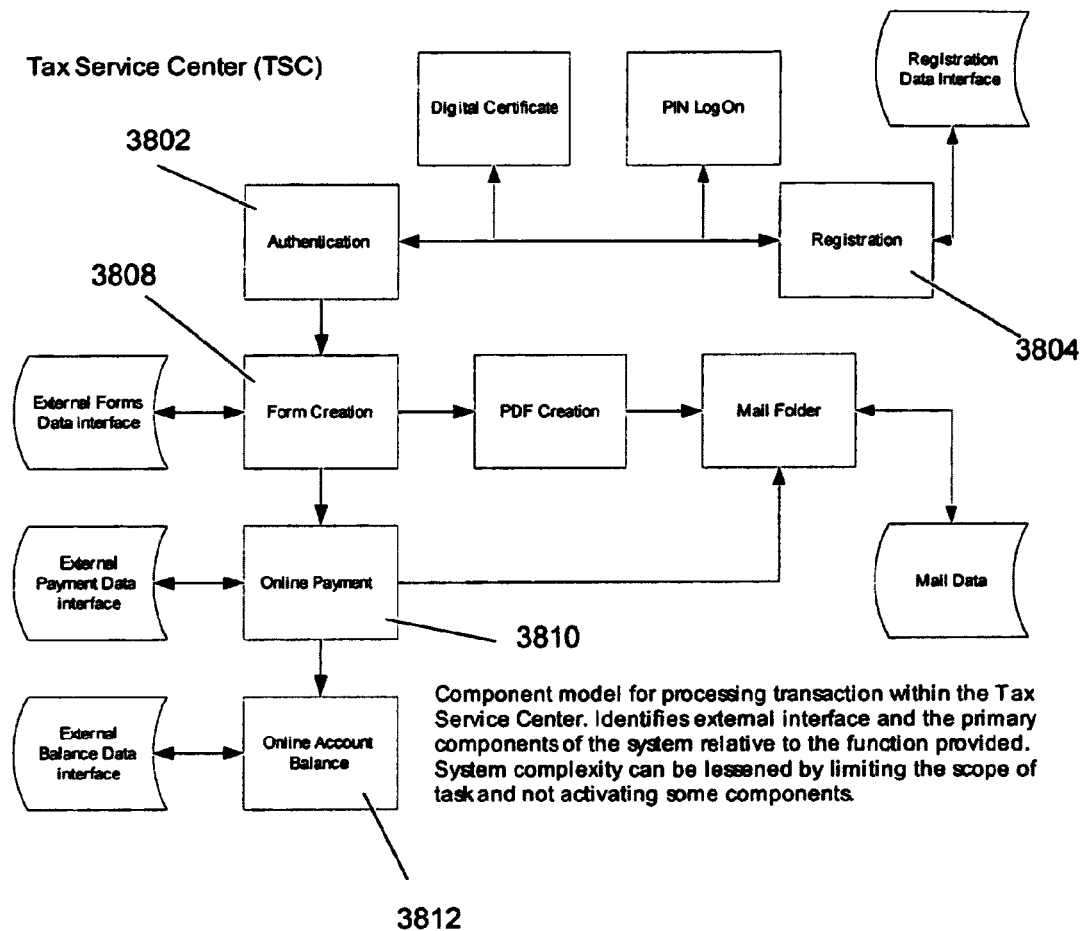
FIG. 38 is a schematic diagram laying out the basic model for the present invention.

FIG. 38 is a schematic diagram laying out the basic model for the present invention. As shown, the major interfaces and components are identified that define the process. The model can be adjusted to remove elements for the model and this may make the appropriate changes to the estimated resource requirements.

The core elements of the TCP are:

Authentication (3802)

Registration (3804)

Email Communications

Form Filing (3808)

Online Payment (3810)

Account Balance (3812)

External interfaces can exist with some of these components where it is necessary for the virtual system to interface with the existing legacy environment.

Registration (3804)

The normal interface with the registration component does not require an external interface. This may be required if the TSC is not the primary repository of registration data. The TSC would retain a complete record of all users entering through the TSC and based on the requirements those registrants would be known to the parent system. It would be the assumption that this would be loaded from the legacy system in most cases during conversion and then new additions added on a periodic process basis. The system is capable of receiving and processing transactions based on registration if the legacy system is capable of providing the data. This form of data input requires alterations to most legacy systems and may be driven by requirements. If requirements allowed registration then a two way interface would need to be developed with some conflict resolution procedure between the two systems. The base solution does not include a PIN number distribution process. Security would be assumed to be outside this system.

Form Filing (3808)

The Form Filing interface is normally related to the submission process and would occur once the forms are complete. The interface can be extended in those cases where interrelated activities would require that information on one submission might require additional input by the registrant. The interface may be capable of providing positive response of submission and forms acceptance by the responsible agency. The handshaking between the submission and delivery may be handled through the interface with the legacy system and may require additional development on both ends of the interface. Base approach would be file would be completed and submitted to the legacy system. At that time the completed form would be translated into a PDF image that would be sent to the user mailbox. Old form entry data may not be accessible through the form sub application after a specified period of time.

On-Line Payment (3810)

The online payment process can be integrated with existing payments systems which exist in the legacy environment or can be developed independently as part of the TSC. This is a primary design requirement that may be defined prior to development start.

Account Balance (3812)

The Account Balance process is intended to provide the registrant with the ability to examine existing activity, returns/applications, payments made through the TSC and any and all payment made to the agency. This requires a high degree of integration between the legacy systems and the TCP. This is one of the most complex components and leads to requirements definitions related to the level of transaction transparency. The normal interface would provide a summarized view that provides a complete picture of the account and activity. Transactions are normally summarized based on activity types and do not include all detail. The idea in this area is a representation of the users account rather than detailed transactions as those would require a filter of corrections or amendments from the legacy system. Nothing in this architecture would prevent detail if the State would prefer that approach. It would require some changes to the data model in terms of the account section and a substantial increase in the processing of the transaction data.

Infrastructure

The TSC requires an UNIX Sun Server and Operating systems properly sized for the expected site activity. This includes all communications, storage, production support and infrastructure support. This may be identified and priced based on system load and uptime requirements.

| Item | Costing | Description |
| --- | --- | --- |
| Server Digital Certificate | Priced by MIPS | This is the server side certificate required to authenticate clients |
| Client Digital Certificate | By Client | The clients certificate, purchased and owned by end user |
| WebLogic Application Server | Priced by MIPS | EJB Application Server |
| Oracle 8 Database (Web Enabled) | Priced by MIPS | |
| Payment Processing System | Processing Speed | The payment systems are priced based on speed at which the payments are processed |
| Symantec Visual Cafe | OEM | Used for maintenance of application components |

Basic Installation

The TSC has a standard install base that handles the general system functions, interfaces and data persistence issues. Then following is a general list of required activities to complete the system setup and prepare it to receive new form function.

| Activity | Resource Cost (Hr) | Description |
| --- | --- | --- |
| Order/Receipt/Installation Server | 18 | The hardware infrastructure: ordered and installed in preparation of system installation |
| Installation of WebLogic | 8 | |
| Installation Oracle 8 | 16 | Oracle license may be properly defined for internet connected systems. |
| Initial Database Build | 4 | Build Base Tables and Install and test store procedures |
| Installation Base Application | 8 | |
| Installation Communications | 12 | |
| Interface Interconnect and Validation | 12 | Design, Plan, Install, Test interface components external to the TSC |
| Site Component Optimization | 18 | Optimize WebLogic, Oracle, Communications and data interface components. |
| Installation Payment system | 12 | |
| Installation Digital Certificate | 4 | |
| Validation System Security | 8 | |
| TOTAL Resource | 120 | |

The TSC is thus designed to be modular and can be shaped to meet the needs of most forms processing systems. The requirements process should identify which components are required and which can be removed as part of any implementation. The limitations of the system may be detailed as components are removed. There is an independent relationship between some components that require addition of one component if another is included. An example of this would be if the online payment or forms filing function both require the Email function to inform the registrant that an activity has been initiated and or complete. This would require that the Email component be added if either of the other two components are incorporated.

Figure 39:
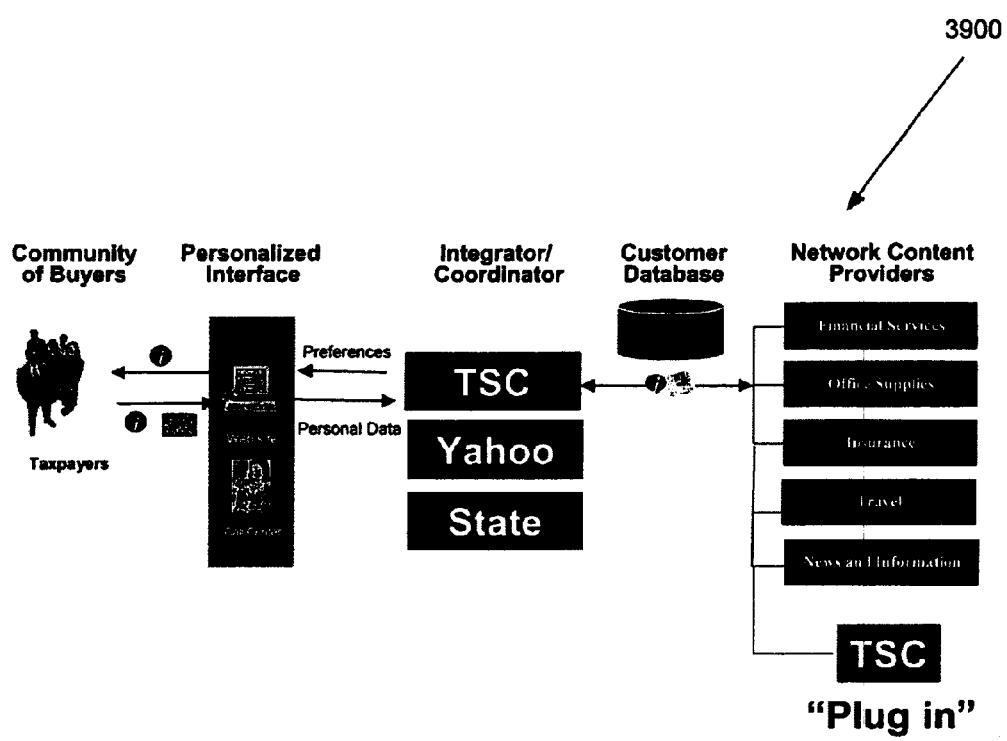
FIG. 39 is a schematic illustrating the model in which the present invention integrates tax services with business-to-business enterprises.

As set forth earlier, the present invention may be implemented via the Internet in one embodiment. FIG. 39 is a schematic illustrating the model 3900 in which the present invention integrates tax services with business-to-business enterprises. In such embodiment, various services may be offered including, but not limited to:

Individual filing functions
Business filing functions
Registration (Business & maybe individuals)
On-line balance inquiry
Simple request, designed to replace a phone call or letter
Tax Preparer support
Credit payment processing
FAQ
On-line receipts of forms filed
Mailbox support
Identification & Authentication—X.509 Digital Certificates or PIN numbers
Data Encryption—SSL Protocol, 128 bit encryption
Secure Infrastructure Design—
Two different types of Firewalls
Not directly connected to TAS database (Data Warehouse Approach)
E-mails notify taxpayer of new information on system
Confidential information kept on secure mailbox
Full Audit Trail Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for providing a network-based tax service database interface comprising the steps of:
    (a) accessing tax-related forms in a governmentally maintained forms database, wherein the tax-related forms include a plurality of fields;
    (b) accessing a revenue services database, wherein the revenue services database stores tax return data in duplicate, in a first table on the revenue services database and in a second table on the revenue services database;
    (c) extracting a portion of the tax return data from the revenue services database, such that the extracted tax return data is provided to a legacy processing system from the first table and the extracted tax return data is provided to a corporate information database from the second table independently from the extracted tax return data from the first table;
    (d) completing at least one of the tax-related forms, wherein a first set of fields from the plurality of fields are filled based on the tax return data, wherein the tax return data on which field filling is based is extracted from both the legacy processing system and a succeeding processing system, wherein a second set of fields from the plurality of fields is populated with results from calculations based on data entered into a first set of fields, and wherein the revenue services database mirrors data tables on the succeeding processing system;
    (e) submitting the tax-related forms to a governmental entity, wherein the tax-related forms are formatted based on rules associated with the governmental entity;
    (f) sending updates to the tax-related forms to a processor utilizing a network for processing and subsequent use; and
    (g) displaying an activities interface to the user, wherein the activities interface identifies activities for users to complete, and governs the data collection process for completing the identified activities.

2. A method as recited in claim 1, and further comprising the step of storing updates to the tax-related forms in the governmentally maintained forms database.

3. A method as recited in claim 1, and further comprising the step of submitting the completed tax-related forms to a processor utilizing a network for processing.

4. A method as recited in claim 3, wherein the processed tax-related forms are received utilizing the network for storage in the governmentally maintained forms database.

5. A method as recited in claim 1, wherein the network is the Internet.

6. A computer program embodied on a computer readable medium for providing a network-based tax service database interface comprising the steps of:
    (a) a code segment that accesses tax-related forms in a governmentally maintained forms database, wherein the tax-related forms include a plurality of fields;
    (b) a code segment that accesses a revenue services database, wherein the revenue services database stores tax return data in duplicate, in a first table on the revenue services database and in a second table on the revenue services database;
    (c) a code segment that extracts a portion of the tax return data from the revenue services database, such that the extracted tax return data is provided to a legacy processing system from the first table and the extracted tax return data is provided to a corporate information database from the second table independently from the extracted tax return data from the first table;
    (d) a code segment that completes at least one of the tax-related forms, wherein a first set of fields from the plurality of fields are filled based on the tax return data, the tax return data on which field filling is based is extracted from both the legacy processing system and a succeeding processing system, wherein a second set of fields from the plurality of fields is populated with results from calculations based on data entered into a first set of fields, and wherein the revenue services database mirrors data tables on the succeeding processing system;
    (e) a code segment that submits the tax-related forms to a governmental entity, wherein the tax-related forms are formatted based on rules associated with the governmental entity;
    (f) a code segment that sends updates to the tax-related forms to a processor utilizing a network for processing and subsequent use; and
    (g) a code segment that displays an activities interface to the user, wherein the activities interface identifies activities for users to complete, and governs the data collection process for completing the identified activities.

7. A computer program as recited in claim 6, and further comprising a code segment that stores the updates to the tax-related forms in the governmentally maintained forms database.

8. A computer program as recited in claim 6, and further comprising a code segment that submits the completed tax-related forms to a processor utilizing a network for processing.

9. A computer program as recited in claim 8, wherein the processed tax-related forms are received utilizing the network for storage in the governmentally maintained forms database.

10. A computer program as recited in claim 6, wherein the network is the Internet.

11. A system having a plurality of logic elements embodied on a computer readable medium, the system for providing a network-based tax service database interface comprising:
   (a) logic that accesses tax-related forms in a governmentally maintained forms database, wherein the tax-related forms include a plurality of fields;
   (b) logic that accesses a revenue services database, wherein the revenue services database stores tax return data in duplicate, in a first table on the revenue services database and in a second table on the revenue services database;
   (c) logic that extracts a portion of the tax return data from the revenue services database, such that the extracted tax return data is provided to a legacy processing system from the first table and the extracted tax return data is provided to a corporate information database from the second table independently from the extracted tax return data from the first table;
   (d) logic that completes at least one of the tax-related forms, wherein a first set of fields from the plurality of fields are filled based on the tax return data, the tax return data on which field filling is based is extracted from both the legacy processing system and a succeeding processing system, wherein a second set of fields from the plurality of fields is populated with results from calculations based on data entered into a first set of fields, and wherein the revenue services database mirrors data tables on the succeeding processing system;
   (e) logic that submits the tax-related forms to a governmental entity, wherein the tax-related forms are formatted based on rules associated with the governmental entity;
   (f) logic that sends updates to the tax-related forms to a processor utilizing a network for processing and subsequent use; and
   (g) logic that displays an activities interface to the user, wherein the activities interface identifies activities for users to complete, and governs the data collection process for completing the identified activities.

12. A system as recited in claim 11, and further comprising logic that stores updates to the tax-related forms in the governmentally maintained forms database.

13. A system as recited in claim 11, and further comprising logic that submits the completed tax-related forms to a processor utilizing a network for processing.

14. A system as recited in claim 13, wherein the processed tax-related forms are received utilizing the network for storage in the governmentally maintained forms database.

15. A system as recited in claim 11, wherein the network is the Internet.

\* \* \* \* \*